(12) United States Patent
Dai et al.

(10) Patent No.: US 12,517,524 B2
(45) Date of Patent: Jan. 6, 2026

(54) DATUM CONVERSION BETWEEN RECEIVER NAVIGATION MODES FOR GUIDANCE PLANNING

(71) Applicant: Deere & Company, Moline, IL (US)

(72) Inventors: Liwen Dai, Torrance, CA (US);
Yunfeng Shao, Torrance, CA (US);
Marlon W. Bright, West Des Moines, IA (US)

(73) Assignee: DEERE & COMPANY, Moline, IL (US)

( * ) Notice: Subject to any disclaimer, the term of this patent is extended or adjusted under 35 U.S.C. 154(b) by 247 days.

(21) Appl. No.: 18/363,274

(22) Filed: Aug. 1, 2023

(65) Prior Publication Data

US 2024/0255949 A1   Aug. 1, 2024

Related U.S. Application Data

(60) Provisional application No. 63/504,214, filed on May 25, 2023, provisional application No. 63/480,851, filed on Jan. 20, 2023.

(51) Int. Cl.
*G05D 1/248* (2024.01)
*G01S 19/42* (2010.01)
*G01S 19/43* (2010.01)
*G05D 1/648* (2024.01)

(52) U.S. Cl.
CPC ............ *G05D 1/248* (2024.01); *G01S 19/426* (2013.01); *G01S 19/43* (2013.01); *G05D 1/648* (2024.01)

(58) Field of Classification Search
None
See application file for complete search history.

(56) References Cited

U.S. PATENT DOCUMENTS

| | | |
|---|---|---|
| 10,481,275 B2 | 11/2019 | Chen et al. |
| 10,648,820 B2 | 5/2020 | Anderson |
| 10,802,159 B2 | 10/2020 | Chen et al. |
| RE48,527 E * | 4/2021 | Reeve .................. G05D 1/0272 |
| 11,047,692 B2 | 6/2021 | Anderson |
| 2017/0212247 A1 | 7/2017 | Chen et al. |
| 2017/0299728 A1 * | 10/2017 | Lie .......................... G01S 19/43 |
| 2018/0113473 A1 * | 4/2018 | Webber .................. G05D 1/027 |
| 2022/0244406 A1 | 8/2022 | Wang et al. |
| 2022/0373336 A1 * | 11/2022 | de Bakker ......... G01C 21/3859 |

OTHER PUBLICATIONS

EPOS GNSS, pp. 1-3, [online], [retrieved on Jan. 4, 2023]. Retrieved from the Internet <URL: https://gnss-epos.eu>.

(Continued)

*Primary Examiner* — Vivek D Koppikar
*Assistant Examiner* — David Ruben Pedersen

(57) ABSTRACT

An electronic data processor, a reference frame converter, or a transformer is configured to transform or converting the second position in the PPP reference frame into a transformed second position in a universal reference frame. The electronic data processor is configured to assign an identifier to the first position observation and the second position observation, where the identifier indicates whether the observations are associated with a guidance path or a boundary of a field or work area.

20 Claims, 25 Drawing Sheets

(56) References Cited

OTHER PUBLICATIONS

EUREF Permanent GNSS Network, pp. 1-2, [online], [retrieved on Jan. 4, 2023]. Retrieved from the Internet <URL: www.epncb.oma.be>.
RTKLIB ver. 2.4.2 Manual, Apr. 29, 2013, pp. 1-183.
RTKLIB: An Open Source Program Package for GNSS Positioning, pp. 1-3, [online], [retrieved on Jan. 18, 2023]. Retrieved from the Internet <URL: https://www.rtklib.com>.
McCarthy et al., IERS Technical Note 21, Central Bureau of IERS, Jul. 1996. Retrieved from the Internet <URL:https://d-nb.info/101338069X/34>.

\* cited by examiner

| Plate Name | $\Omega_x$, millirad/Myear | $\Omega_y$, millirad/Myear | $\Omega_z$, millirad/Myear |
|---|---|---|---|
| Africa | 0.891 | -3.099 | 3.922 |
| Antartica | -0.821 | -1.701 | 3.706 |
| Arabia | 6.685 | -0.521 | 6.76 |
| Australia | 7.839 | 5.124 | 6.282 |
| Carribean | -0.178 | -3.385 | 1.581 |
| Cocos | -10.425 | -21.605 | 10.925 |
| Eurasia | -0.981 | -2.395 | 3.153 |
| India | 6.67 | 0.04 | 6.79 |
| Juan de Fuca | 5.2 | 8.61 | -5.82 |
| Nazca | -1.532 | -8.577 | 9.609 |
| Pacific | -1.51 | 4.84 | -9.97 |
| Philippine | 10.09 | -7.16 | -9.67 |
| Rivera | -9.39 | -30.96 | 12.05 |
| Scotia | -0.41 | -2.66 | -1.27 |
| South America | -1.038 | -1.515 | -0.87 |

S302
AT A FIRST TIME, COLLECT INITIAL BOUNDARIES OF A FIELD OR WORK AREA OR ONE OR MORE INITIAL GUIDANCE LINES IN A PRIMARY FIRST MODE FOR STORAGE AS A FIRST FILE OR A FIRST DATA STRUCTURE IN A FIRST RTK REFERENCE FRAME ASSOCIATED WITH AN RTK REFERENCE STATION AT A FIRST POSITION, WHERE THE PRIMARY FIRST MODE COMPRISES A FIRST REAL-TIME KINEMATIC (RTK) MODE.

S304
UPLOAD OR STORE THE FIRST FILE OR THE FIRST DATA STRUCTURE IN ELECTRONIC DATA STORAGE DEVICE IN THE FIRST RTK REFERENCE FRAME.

S306
TRANSFORM OR CONVERT THE FIRST FILE OR FIRST DATA STRUCTURE TO CONVERTED FILE OR CONVERTED DATA STRUCTURE OF CONVERTED BOUNDARIES OR CONVERTED GUIDANCE LINES IN ACCORDANCE WITH A UNIVERSAL REFERENCE FRAME.

S307
DETERMINE A FIRST DATUM OFFSET BASED ON A DIFFERENCE IN THE FIRST POSITION AND A CORRESPONDING UNIVERSAL POSITION OF OR IN THE UNIVERSAL REFERENCE FRAME.

S308
PLAN ONE OR MORE PATHS FOR A NEXT WORK VEHICLE FOR THE FIELD OR WORK AREA BASED ON THE CONVERTED FILE OR THE CONVERTED DATA STRUCTURE IN ACCORDANCE WITH THE FIRST RTK REFERENCE FRAME OR THE UNIVERSAL REFERENCE FRAME, WHEREIN THE NEXT WORK VEHICLE COMPRISES THE FIRST WORK VEHICLE OR A SECOND WORK VEHICLE.

S311A
AT A SECOND TIME, NAVIGATE, TRACK OR OBSERVE, BY A LOCATION-DETERMINING RECEIVER, ASSOCIATED WITH A NEXT WORK VEHICLE THE FIELD OR WORK AREA, THE ONE OR MORE PLANNED PATHS IN A SECONDARY FIRST MODE IN A SECOND RTK REFERENCE FRAME ASSOCIATED WITH AN RTK REFERENCE STATION AT A SECOND POSITION, WHERE THE SECONDARY FIRST MODE COMPRISES A SECOND REAL-TIME KINEMATIC (RTK) MODE.

S402
AT A FIRST TIME, COLLECT INITIAL BOUNDARIES OF A FIELD OR WORK AREA OR ONE OR MORE INITIAL GUIDANCE LINES, OR BOTH, IN A PRIMARY (SECOND) MODE FOR STORAGE AS A FIRST FILE OR A FIRST DATA STRUCTURE IN A FIRST UNIVERSAL REFERENCE FRAME WITH A RESPECTIVE FIRST DATE AND AT A FIRST TIME (E.G., FIRST EPOCH) WITH A CORRESPONDING FIRST POSITION, WHERE A PRIMARY (SECOND) MODE COMPRISES A PPP MODE, PPP-RTK MODE, OR A DGNSS-RTK MODE.

S403
UPLOAD OR STORE THE FIRST FILE OR THE FIRST DATA STRUCTURE IN ELECTRONIC DATA STORAGE DEVICE IN THE FIRST UNIVERSAL REFERENCE FRAME.

S404
TRANSFORM OR CONVERT THE FIRST FILE OR FIRST DATA STRUCTURE TO A CONVERTED FILE OR CONVERTED DATA STRUCTURE OF CONVERTED BOUNDARIES OR CONVERTED GUIDANCE LINES, OR BOTH IN ACCORDANCE WITH A SECOND UNIVERSAL REFERENCE FRAME WITH A RESPECTIVE SECOND DATE AND AT A SECOND TIME (E.G., SECOND EPOCH) WITH A CORRESPONDING SECOND POSITION.

S406
DETERMINE AN AGGREGATE DATUM OFFSET VECTOR BASED ON A FIRST DATUM OFFSET VECTOR AND A SECOND DATUM OFFSET VECTOR, WHERE THE FIRST DATUM OFFSET VECTOR IS BETWEEN THE RESPECTIVE FIRST POSITION AND A FIRST REFERENCE POSITION, WHERE THE FIRST POSITION IS AT THE FIRST TIME (E.G., FIRST EPOCH) ON THE FIRST DATE IN A FIRST UNIVERSAL REFERENCE FRAME, WHERE THE FIRST REFERENCE POSITION IS AT A REFERENCE EPOCH ON A REFERENCE DATE IN A COMMON UNIVERSAL REFERENCE FRAME, WHERE THE SECOND DATUM IS BETWEEN THE RESPECTIVE SECOND POSITION AND A SECOND REFERENCE POSITION, WHERE THE SECOND POSITION IS AT THE SECOND TIME (E.G., SECOND EPOCH) ON THE SECOND DATE IN A SECOND UNIVERSAL REFERENCE FRAME, WHERE THE SECOND REFERENCE POSITION IS AT A SECOND REFERENCE EPOCH ON A SECOND REFERENCE DATE IN THE COMMON UNIVERSAL REFERENCE FRAME.

DATUM CONVERSION BETWEEN RECEIVER NAVIGATION MODES FOR GUIDANCE PLANNING

RELATED APPLICATIONS

This application claims priority to U.S. provisional application No. 63/480,851, filed Jan. 20, 2023, and U.S. provisional application No. 63/504,214, filed May 25, 2023, where the above applications are hereby incorporated by reference herein.

FIELD

This disclosure relates to a datum conversion between receiver navigation modes for guidance planning.

BACKGROUND

In some prior art, a mobile Global Navigation Satellite System (GNSS) receiver may operate in different modes. For example, in a real-time-kinematic (RTK) mode, a mobile GNSS receiver requires local reference GNSS receiver-base stations to provide correction data via a wireless channel. In a precise-point-positioning (PPP) mode or another differential correction mode, a mobile GNSS receiver may relay upon one or more central data processing hubs to process correction data from a network of stationary reference GNSS receivers distributed throughout the world. If the mobile GNSS receiver that is operating in a PPP mode seeks to reuse guidance lines or boundaries collected in an RTK mode, or vice versa, the guidance lines are not interchangeable or compatible. For example, an observed RTK position in the RTK mode does not necessarily align with the observed PPP position in the PPP mode; the positions tend to be susceptible to changes in the datum in which the observed positions are recorded. Accordingly, there is a need for data conversion between receiver navigation modes for guidance planning.

SUMMARY

In accordance with one embodiment, a method for supporting consistent alignment of position data collected during operations of a field or work site over time supports reliable and consistent operation of a location-determining receiver comprising a real-time kinematic (RTK) estimator and a precise point positioning (PPP) estimator. An RTK estimator is configured to determine a first position observation of the receiver in accordance with an RTK reference frame, which can be defined or referenced with respect to a local RTK base station or a regional RTK reference network of one or more RTK base stations. A PPP estimator is configured to determine a second position observation of the receiver in accordance with a PPP reference frame (e.g., WGS-84), where the first position observation and the second position observation are made substantially simultaneously (e.g., substantially made during the same epoch). An electronic data processor, a reference frame converter, or a transformer is configured to transform or converting the second position in the PPP reference frame into a transformed second position in a universal reference frame (e.g., International Terrestrial Reference Frame (ITRF, 20XX, where XX represents the last two digits of the year). The electronic data processor is configured to assign an identifier to the first position observation and the second position observation, where the identifier indicates whether the observations are associated with a guidance path (e.g., vehicle or implement guidance path) or a boundary of a field or work area.

In accordance with one aspect of the disclosure, the location-determining receiver, a wireless communications device is configured to transmit wirelessly to a central server the transformed second position and a respective assigned identifier for storage in a data storage device. In accordance with another aspect of the disclosure, the location-determining receiver, is configured to provide to an electronic data processing system (e.g., onboard a vehicle) the transformed second position and a respective assigned identifier for storage in a data storage device.

BRIEF DESCRIPTION OF THE DRAWINGS

FIG. 8B is a chart of the tectonic rotation vector for each major tectonic plate in three dimensions according to an illustrative kinematic plate model.

DETAILED DESCRIPTION OF PREFERRED EMBODIMENTS

Figure 1A:
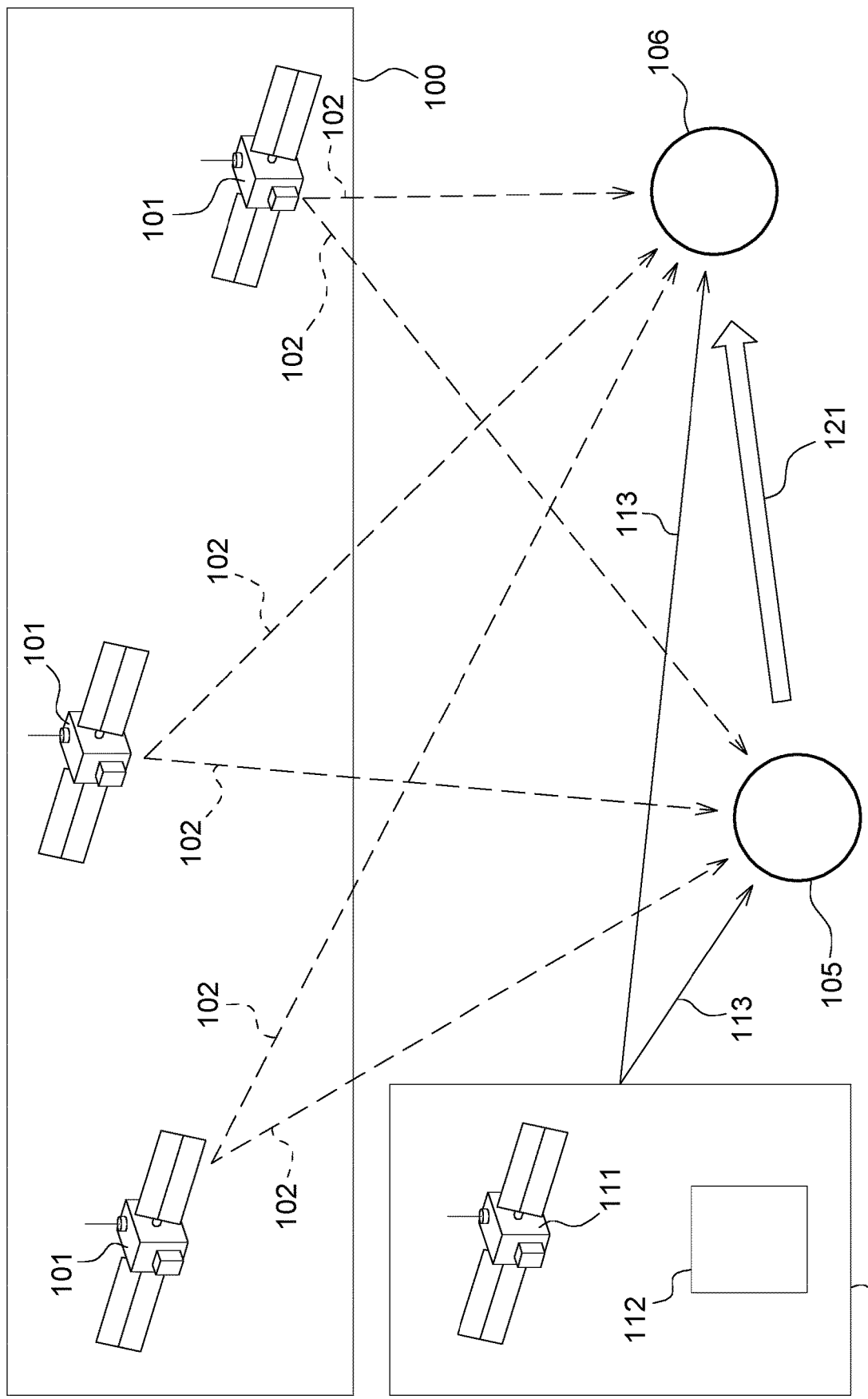
FIG. 1A is an illustrative block diagram of a first embodiment of a Real-Time-Kinematic (RTK) system with the aid of an augmentation system.

In any of the above referenced drawings of this document, any arrow or line that connects any blocks, components, modules, multiplexers, memory, data storage, accumulators, data processors, electronic components, oscillators, signal generators, or other electronic or software modules may comprise one or more of the following items: a physical path of electrical signals, a physical path of an electromagnetic signal, a logical path for data, one or more data buses, a circuit board trace, a transmission line; a link, call, communication, or data message between software modules, programs, data, or components; or transmission or reception of data messages, software instructions, modules, subroutines or components.

In one embodiment, the system, method and receiver disclosed in this document may comprise a computer-implemented system, method or receiver in which one or more data processors process, store, retrieve, and otherwise manipulate data via data buses and one or more data storage devices (e.g., accumulators or memory) as described in this document and the accompanying drawings. As used in this document, "configured to, adapted to, or arranged to" mean that the data processor or receiver is programmed with suitable software instructions, software modules, executable code, data libraries, and/or requisite data to execute any referenced functions, mathematical operations, logical operations, calculations, determinations, processes, methods, algorithms, subroutines, or programs that are associated with one or more blocks set forth in any other drawing in this disclosure. Alternately, separately from or cumulatively with the above definition, "configured to, adapted to, or arranged to" can mean that the receiver comprises one or more components described herein as software modules, equivalent electronic hardware modules, or both to execute any referenced functions, mathematical operations, calculations, determinations, processes, methods, algorithms, subroutine.

The global navigation satellite systems (GNSS) including GPS, GLONASS, BEIDOU, GALILEO, QZSS, IRNSS and SBAS, use satellites orbiting the Earth to locate the position (e.g., three dimensional coordinates) of GNSS receivers, or their antennas, on or above Earth. Typically, both pseudo-range and integrated carrier phase GNSS measurements are available within a civilian GNSS receiver for each carrier signal of each GNSS satellite that is being tracked. The pseudo-range measurement records the apparent time duration taken for the relevant code to travel from the satellite to the receiver. The time duration equals the time the signal arrives at the receiver according to the receiver clock minus the time the signal left the satellite according to the satellite clock.

In a GNSS receiver, the carrier phase measurement can be obtained by integrating a reconstructed carrier of the signal as it arrives at the receiver, or in accordance with other measurement techniques. The carrier phase measurement is a measure of a transit time difference as determined by the time the signal left the satellite according to the satellite clock and the time it arrives at the receiver according to the receiver clock. However, because the initial number of whole cycles in transit between the satellite and the receiver, when the receiver starts tracking the carrier phase of the signal, is not known, the transit time difference obtained from the carrier phase will typically be in error by a multiple (e.g., plus or minus one integer or its equivalent wavelength) carrier cycles. Accordingly, there is a whole-cycle ambiguity in the carrier phase measurement for the carrier phase between the receiver and each satellite, until it is resolved through various procedures.

The range or distance between a GNSS receiver and each of a multitude of observable satellites is calculated by multiplying each signal's travel time from the satellite to the GNSS receiver by the speed of light. These ranges are usually referred to as pseudo-ranges because the receiver clock generally has a significant time error which causes a common bias in the measured range with respect to each satellite in a set of satellite signals received by the receiver. By using differenced measurements, the common bias from receiver clock error is solved for along with the position coordinates of the receiver as part of the normal navigation computation. Various other factors can also lead to errors or noise in the calculated range, including ephemeris error, satellite clock timing error, atmospheric effects, receiver noise and multipath error. Throughout this document, the atmosphere refers to the troposphere or ionosphere, or both the troposphere and the ionosphere; similarly, atmospheric refers to tropospheric, ionospheric, or both tropospheric and ionospheric. In standalone GNSS navigation, where the receiver obtains code and/or carrier-phase ranges from multiple satellites without the benefit of corrections from any reference stations, the receiver is very limited in methods available to reduce the errors or noises in the ranges.

To eliminate or reduce systematic errors, differential operations are typically used in GNSS applications. Differential GNSS operations typically involve one or more reference receivers located at known sites (sometimes called base stations) together with a communication link between the user's mobile receiver and the reference receiver. The reference receivers generate correction data associated with some or all of the above errors and the correction data is sent to the user receiver over the communication link. The mobile receiver then applies the correction data to its own carrier phase measurements or position estimate and thereby obtains a more accurate computed position. The correction data from a respective reference receiver can be in the form of corrections to the reference receiver position determined at the reference site or in the form of corrections to the specific GNSS satellite clock and/or orbit data. Differential operations using carrier-phase measurements are often referred to as real-time kinematic (RTK) positioning/navigation operations.

The fundamental concept of Differential GNSS (DGNSS) is to take advantage of the spatial and temporal correlations of the errors inherent in the GNSS measurements. For short baseline or separation between the mobile receiver and the reference receiver, the mobile receiver can use the correction data to cancel or significantly mitigate most of the error sources in the pseudo-range and/or carrier phase measurements, such as GNSS orbit error, ionospheric delay, and tropospheric delay. The amount of mitigation depends upon the correlation between the error sources at the mobile receiver and reference receiver. While the GNSS satellite clock timing error, which appears as a bias on the pseudo-range or carrier phase measurement, is perfectly correlated between the reference receiver and the mobile receiver, most of the other error factors are either not correlated or the correlation diminishes as a function of distance between the mobile receiver and the reference receiver.

A number of different techniques have been developed to obtain high-accuracy differential navigation using the GPS carrier-phase measurements. The technique with the highest accuracy is the real-time kinematic (RTK) technique, which yields a typical accuracy of about one-centimeter. However, to obtain that accuracy, the mobile receiver needs to determine the whole-cycle ambiguity in the differential carrier-phase measurements. When the distance between the user's mobile receiver and the reference receiver (baseline distance) is short, the RTK technique is highly advantageous because in this case, the whole-cycle ambiguity can be resolved not only accurately but also quickly. On the other hand, when the baseline distance is more than a few tens of kilometers, it may become impossible to determine the whole-cycle ambiguity and the normal RTK accuracy cannot be achieved. Another limitation of the RTK technique is that it requires a local radio link to be maintained between the reference receiver and the navigation receiver to supply timely correction or measurement data.

To overcome the error sources within the DGNSS system in wide-area applications, various regional, wide-area, or global DGPS (sometimes referred to as Precise Point Positioning PPP) techniques have been developed. The typical PPP includes a network of multiple reference stations in communication with a computational center or hub. The computational center determines precise correction data based upon the known locations of the reference stations and the carrier phase measurements taken by them. The computed correction data are then transmitted to users via a communication link such as satellite, phone, or radio. By using multiple reference stations, PPP provides more accurate estimates of the precise correction data.

Precise positioning refers to precise point positioning (PPP) or similar forms of providing accurate position estimates based on differential correction data or correction data such as precise clock corrections, orbit corrections, and satellite bias information. Precise point positioning (PPP) means: (1) use precise satellite orbit corrections, precise clock corrections, and satellite bias information, rather than normal satellite broadcast information (ephemeris data), to determine a relative position or absolute position of a mobile user satellite navigation receiver without any local reference satellite stations to provide differential correction, or (2) use precise satellite orbit corrections, precise clock corrections, and satellite bias information; ordinary broadcast information (ephemeris data) and with differential correction data, measured range data, or carrier phase data from one or more local reference stations. Although the resulting positions can be accurate within a few centimeters using state-of-the-art algorithms, conventional precise point positioning can take a long convergence time of up to tens of minutes to determine the ambiguity integer or floating ambiguity value to achieve the advertised steady-state accuracy is typically a limiting factor in their applicability. Here, the method and receiver of this disclosure does not aim to improve the convergence time of the PPP or determination of an absolute position based PPP. However, when working in conjunction with a PPP system, the receiver or method of this disclosure provides the opportunity to achieve the steady-state level precision for relative position prior to complete convergence or determination of a ambiguity integer or floating ambiguity value.

The PPP techniques that employ a carrier-phase differential method can achieve extremely high navigational accuracy. At the location-determining receiver or GNSS receiver, a carrier phase measurement module can measure the carrier phase of one or more received carrier phase signals from satellites, where the measurement time or sampling interval of the location-determining receiver of carrier phase signal may be referred to as an epoch throughout this document. The PPP differential techniques are typically characterized by reliable long distance communication links or by reliable satellite communication links. Precise correction data can generally be communicated to navigation receivers without significant interruption. However, certain PPP techniques treat the whole-cycle ambiguities as a real-valued (non-integer) variable and solve for a "floating ambiguity," which is usually very poorly defined until measurement data covering a time interval of significant satellite geometry change have been obtained. Thus, in a PPP application without ambiguity resolution, a time interval as long as approximately thirty to approximately sixty minutes may be required to solve for the "floating ambiguity" with sufficient accuracy to yield a navigated position with a reliable accuracy of less than (i.e., better than) a few centimeters.

A Global Navigation Satellite System (GNSS) is based on simultaneously ranging from at least four satellites, with known satellite coordinates (e.g., versus GNSS system/constellation time). The GNSS receiver can estimate a three-dimensional coordinates and receiver clock bias based on simultaneously ranging from at least four satellites, with known satellite coordinates. GNSS constellations include Global Positioning System (GPS) controlled by the U.S., GLONASS controlled by Russia, GALILEO controlled by the Europe Union, and BEIDOU controlled by China, among others. The accuracy of GNSS positioning can depend on accuracy of the ranging measured between a satellite and a receiver, the motion and coordinate accuracy of the satellites, and the geometry of the measurements. For example, the ranging measurement accuracy can be determined by the satellite orbit error, clock stability, troposphere density, ionosphere activity level, and local interference and multi-path environment. To provide reliable and accurate GNSS positioning solutions, GNSS technology can use Precise Point Positioning (PPP) technology, Real Time Kinematic (RTK) technology, or both.

PPP technology comprises a global or regional GNSS reference station network and a data processing center for determining correction data that is wirelessly provided to a rover or mobile GNSS receiver. The rover or mobile GNSS receiver uses a rover positioning algorithm to estimate a rover position. Within the GNSS reference station network, the GNSS reference stations at fixed, known positions (e.g., known three-dimensional coordinates) track the GNSS satellites and provide ranging measurements between one or more satellites and each GNSS reference station. With these ranging measurements, the data processing center determines correction data based on satellite health conditions. For example, the PPP correction data comprises accurate satellite coordinates, satellite specific bias data, and clock parameters.

At the rover GNSS receiver, the rover positioning algorithm can achieve precise positioning (e.g., as accurate as three to ten centimeters, or even better accuracy with a corresponding reliability level) based on these accurate satellite orbit and clock parameters of the correction data and an ionosphere-free measurement combination, which are derived from carrier phase measurements and code phase measurements of the rover GNSS receiver. The main limitation or drawback of PPP technology tends to be the convergence time, which can generally take more than half an hour to converge on a resolution of integer ambiguities for carrier phase for a set of satellites within view or reception range of the GNSS receiver. To speed up the initialization and further improve the positioning accuracy, PPP Ambiguity Resolution (PPP-AR) technology has been invented. Beside satellite orbit and clock parameters (e.g., in the correction data), PPP-AR provides other aiding-parameters, such as satellite bias information, to help rover algorithm resolve integer carrier phase ambiguities. With PPP-AR technology, the initialization time can be improved (e.g., less than 20 minutes) and the accuracy can be approaching several centimeters (e.g., 2.54 centimeter or inch level).

RTK means real-time kinetic system that uses carrier phase measurements of base stations at known locations (e.g., fixed, known coordinates) and navigation data (e.g., on civilian available L1, L2 or L5 signals, like L1C/A, L1C, L2C or L5 for GPS) to determine a correction data or differential signal that is broadcast or transmitted via a wireless link or radio to rover receivers that can use the correction data. RTK can be used separately or collectively with PPP.

The distance or baseline between each base station and rover receiver may have a maximum baseline in which the correction data is reliable because of potential ionosphere variation that sometimes can affect the base station differently than the rover receiver and because of potential scintillation that again sometimes affect the base station differently than the rover receiver. RTK technology is based on the property that orbit errors, clock errors, and atmospheric delay from any given satellite are the same or similar for nearby receivers and the transmission ranging errors are highly correlated for nearby receivers.

An RTK pair consists of a GNSS base station receiver and a GNSS rover receiver. The base station receiver is mounted at a pre-surveyed location (e.g., fixed, known location) and the rover receiver stays at the vicinity of the base receiver, such as equal to or less than a baseline or distance of 20 kilometers between the base station receiver and a rover receiver. The ranging errors from base station receiver can be calculated with its known coordinate and sent to rover receiver. The rover receiver receives and applies the error corrections from base receiver to improve positioning accuracy.

RTK technology is well suited for fast initialization and high accuracy if the rover receiver is sufficiently close or nearby to the base station, such as less than 50 kilometer baseline or distance between the base station receiver and the rover receiver. However, the error correlation between base station receiver and rover receiver becomes weaker when the distance between base station receiver and rover receivers becomes longer; hence, generally the RTK positioning accuracy will become unreliable when the baseline is longer than about 50 kilometers. Long-baseline RTK configurations may be vulnerable to ionospheric variations, where long-baseline RTK may be generally applicable to a baseline distance between a rover GNSS receiver and a base-station receiver of fifty (50) kilometers or greater.

Further, long-baseline RTK tends to be susceptible to ionosphere scintillation. The ionosphere delay between base station receiver and rover receiver becomes less correlated during scintillation, which results in a poor RTK performance. Network RTK technology has been innovated to expand the RTK working range. However, the network RTK technology needs more base station receivers, where the rover receivers can only work well within the network.

FIG. 1A illustrates a representative GNSS system 100, which comprises multiple GNSS satellites 101. Each GNSS satellite 101 transmits satellite signal 102 (e.g., L1 signal and/or L2 signal for GPS) to GNSS base station receiver 105 (e.g., base receiver) and GNSS rover receiver 106. The signal 102 may include navigation data, such as ephemeris data, satellite almanac data, position data, orbit data and clock data of a corresponding GNSS satellite 101 that transmits satellite signal 102.

The GNSS satellite 101 may broadcast signal 102 on multi-frequencies. For example, if GNSS satellite 101 is from GPS system, it can broadcast signal 102 on more than one frequency, which includes L1, L2 and L5 frequencies used in GPS system. In one embodiment, GNSS system 100 can be from any of GPS, GLONASS, GALILEO, BEIDOU and other GNSS systems/constellations. In another embodiment, GNSS system 100 may include more than one GNSS constellation.

Augmentation system 110 broadcasts signal 113 to GNSS base receiver 105 and GNSS rover receiver 106. Signal 113 may include but not limited to any of the following: orbit correction data and clock correction data for respective GNSS satellite 101, phase bias information for respective GNSS satellite 101, and atmospheric (e.g., delay/advance) data for signal 102. In one embodiment, augmentation system 110 can broadcast aiding information 113 from augmentation satellite 111. In another embodiment, augmentation system 110 can broadcast aiding information 113 from computer server 112 through internet. In one embodiment, the augmentation system 110 can be a public augmentation system like Satellite Based Augmentation System including Wide Area Augmentation System (WAAS) from US, European Geostationary Navigation Overlay Service (EGNOS) from Europe, MTSAT Satellite Based Augmentation Navigation System (MSAS) from Japan, GPS-Aided GEO Augmented Navigation System (GAGAN) from India, System for Differential Corrections and Monitoring (SDCM) from Russia and other emerging SBAS systems. In another embodiment, augmentation system 110 can be a private augmentation system.

GNSS base receiver 105 is mounted at a pre-surveyed location. It tracks signals from GNSS system 100 and augmentation system 110, generates RTK corrections 121 for GNSS satellites 101 based on the pre-surveyed coordinate and augmentation corrections 113. The generated RTK corrections 121 are sent to GNSS rover receivers 106 through RTK correction data streams. In one embodiment, RTK corrections 121 only include range errors for each measurement from GNSS satellite 101. In another embodiment, RTK corrections 121 include range errors for each measurement from GNSS satellite 101 and atmosphere delay calculated in base receiver 105. In another embodiment, RTK corrections 121 include range error, atmosphere delay and ambiguity information calculated in base receiver 105. In another embodiment, raw measurements will be sent to rover instead of range errors in RTK corrections 121. In one embodiment, RTK corrections are calculated without the augmentation information 113. In another embodiment, RTK corrections are calculated with the augmentation information 113.

In one embodiment, tropospheric delay is in the form of a zenith delay with mapping function for each measurement. Zenith delay is the tropospheric delay experienced by a satellite signal that propagates in the zenith direction, which is a point vertically above a rover receiver or base station receiver; zenith delay may be characterized by a hydrostatic zenith delay component and a non-hydrostatic zenith component. In alternate embodiments, the elevation angle and the azimuth angle between the satellite and receiver are used to estimate tropospheric delay in the dual model. The elevation angle means the angle between a receiver-to-satellite geometric path and a horizontal line (e.g., or curved line along the Earth's surface). The azimuth is the direction of a satellite in the horizontal plane of the Earth with respect to a rover or base station receiver, which sometimes may be measured in degrees from North in a clockwise direction.

In another embodiment, atmospheric delay is in the form of a slant atmospheric delay for each measurement, where the slant atmospheric delay represents the total propagation delay in a GNSS signal between the satellite and a receiver antenna of the rover receiver of base station receiver. The slant atmospheric delay may have a hydrostatic slant delay component (e.g., arising from dry atmospheric constituents) and an non-hydrostatic slant delay component (e.g., arising from wet constituents or water vapor). The slant atmospheric delay may be used in conjunction with a mapping function to estimate zenith atmospheric or tropospheric delay. Further, the slant ionospheric delay can define an ionospheric delay component that impacts phase code measurements and carrier phase measurements and that is generally proportional to the slant total electron count (TEC) divided by the measurement frequency squared (e.g., carrier frequency of the satellite signal for carrier phase measurements of at least for the first order ionospheric delay components and possibly for the carrier frequency plus and minus the encoded signal peak frequency of phase code). In some embodiments, the slant total electronic count is estimated based on the vertical total electron count that is available for a propagation path of interest in conjunction with an appropriate mapping function. In one embodiment, RTK corrections are sent with public data format like radio technical commission for maritime services (RTCM). In another embodiment, RTK corrections are sent with an appropriated data format.

GNSS rover receiver 106 tracks signals 102 from GNSS system 100 and aiding information 113 from augmentation system 110, and receives RTK corrections 121 from base receiver 105. In one embodiment, GNSS rover receiver 106 applies a dual (e.g., two stage) RTK algorithm with all the information it received to achieve high position accuracy without a baseline length limit (e.g., such as long-baseline RTK exceeding 50 kilometers) and without atmospheric activity limit (e.g., Total Electron Count of ionosphere exceeding a certain threshold).

For example, the GNSS rover receiver 106 may be configured use the follow RTK techniques, separately or cumulatively. Under a first technique, the augmentation information 113 is applied within an RTK algorithm, such as a dual (e.g., two stage) RTK algorithm. Under a second technique, RTK corrections 121 are generated in base receiver 105 and transmitted wirelessly, by a wireless link, to the GNSS rover receiver from the RTK base station.

Under a third technique, the RTK corrections 121 are generated in a rover receiver 106 with the (raw) GNSS measurements and coordinates for base station receiver 105, where the (raw) GNSS measurements and coordinates for the base station receiver 105 are transmitted wirelessly, by a wireless link, to the GNSS rover receiver 106 from the RTK base station.

Under a fourth technique, GNSS rover receiver 106 does not use the augmentation information 113 in its RTK algorithm.

Figure 1B:
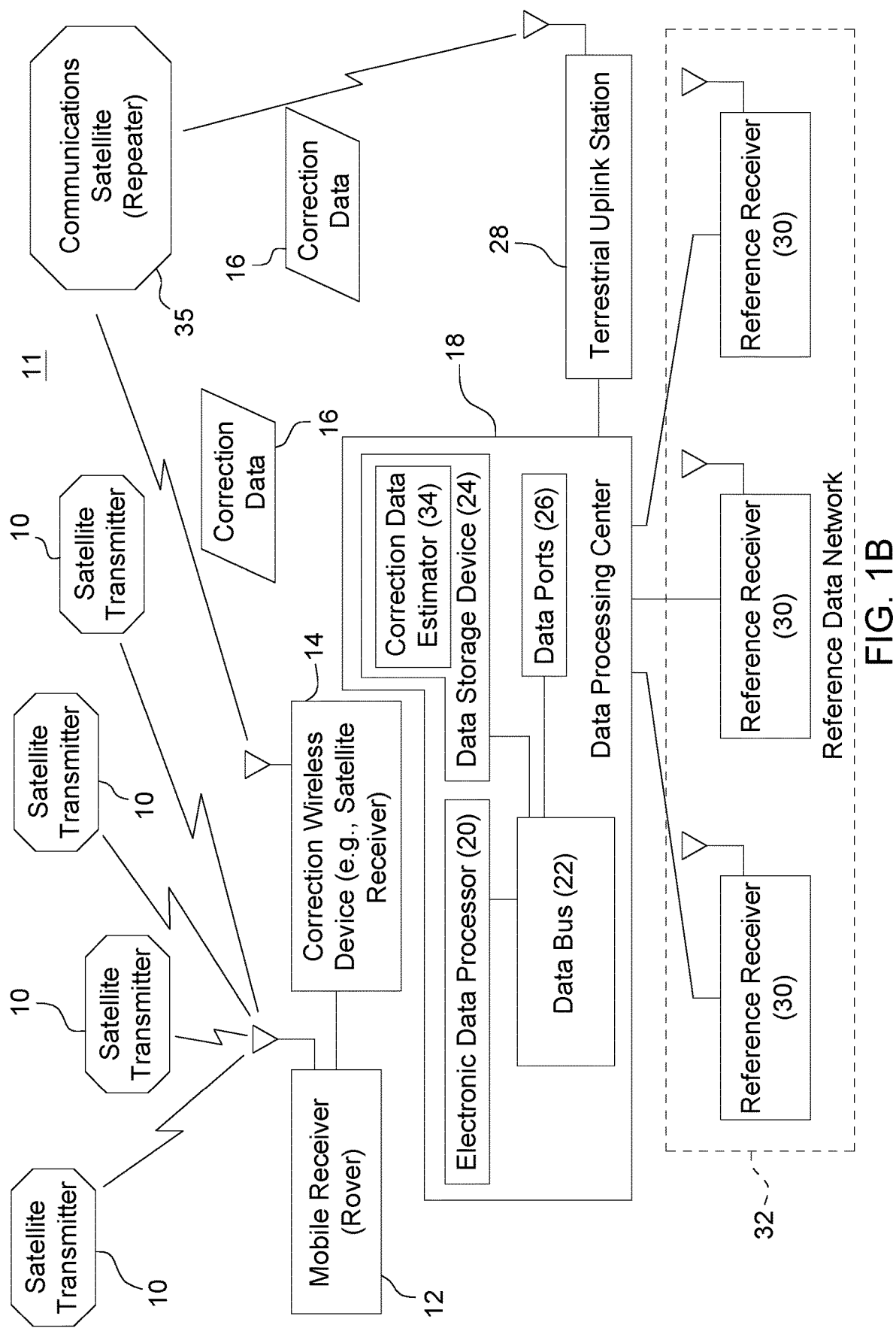
FIG. 1B is an illustrative block diagram of one embodiment of a GNSS system with the aid of a correction or augmentation system.

In FIG. 1B, a mobile receiver 12 and a reference receiver 30 each comprise a location-determining receiver or satellite receiver, such as a Global Navigation Satellite System (GNSS) receiver. The mobile receiver 12 and each reference receiver 30 are capable of making carrier phase measurements that are subject to ambiguities, such as integer ambiguities, in the cycles of each received satellite signal. The receiver (12, 30) determines or resolves ambiguities of carrier phase measurements of the respective received satellite signals to estimate accurately the precise position or coordinates of the receiver. Although the code phase or pseudo-range measurements of the receiver (12, 30) are not associated with integer ambiguities in the cycles of the received satellite, code phase measurements do not provide the centimeter level position accuracy required for certain applications (e.g., vehicle navigation).

As used throughout this document, ambiguities are often specific to the context of particular equations which relate to observations from one or more receivers of carrier phase signals from one or more satellites. Accordingly, it is possible to have wide-lane (WL) ambiguities, narrow-lane (NL) ambiguities, zero-difference (ZD) ambiguities, single-difference (SD) ambiguities, double-difference (DD) ambiguities, real-time-kinematic (RTK) ambiguities, and refraction-corrected (RC) ambiguities that relate to phase measurements from one or more receivers, or one or more satellites. In this document, any reference to ambiguity can refer to a singular ambiguity or plural ambiguities.

If the satellite navigation receiver (12, 30) can receive at least two frequencies, such as L1 and L2 frequencies, the difference of the L1 and L2 carrier phase measurements can be combined to form wide-lane (WL) measurement (e.g., with a wavelength of approximately 86.25 centimeters for Global Positioning System, GPS) and the sum of the L1 and L2 carrier phase measurements can be combined to form narrow-lane (NL) measurements (e.g., with a wavelength of approximately 10.7 centimeters). The wide-lane measurements facilitate quick and efficient resolution of wide-lane integer ambiguities, whereas the narrow-lane measurements facilitate precise and accurate resolution of narrow-lane ambiguities with minimal phase noise. The refraction-ambiguities compensate for atmospheric delay bias, such as ionospheric delay bias.

Single difference measurements (e.g., of carrier phase or code phase) are generally formed with respect to one satellite, a reference receiver 30 and a mobile receiver 12 (e.g., rover). In contrast, double difference measurements are generally formed with respect to two satellites, a reference receiver 30 and a mobile receiver 12, or by subtracting two single-difference measurements. However, certain double-difference measurements can be formed with two single-difference measurements from the same receiver at two different times and associated with a pair of satellites.

In FIG. 1B, the system comprises a constellation of satellites or satellite transmitters 10, including at least those satellites that are within view or reception range of one or more reference receivers 30 (e.g., reference GNSS receivers). In practice, reference receivers 30 (e.g., GNSS reference stations) are globally distributed at sites with good satellite geometry and visibility to a set of satellites or satellite transmitters 10. Each reference receiver 30 has a measurement module that measures observables, such as the carrier phase of one or more received satellite signals from each satellite. The reference receiver 30 may also measure the pseudo-range or code phase of a pseudo-random noise code that is encoded on one or more of the carrier signals. The reference receivers 30 receive and send measurements, ephemeris data, other observables and any information derived from the deliverables to an electronic data processing center 18 (e.g., hub). In one embodiment, each reference receiver 30 transmits (e.g., via a communications link, a communications network, a wireless channel, a communications channel, communications line, a transmission line, or otherwise) a set of carrier phase measurements of received satellite signals, and associated satellite identifiers, and ephemeris data to an electronic data processing center 18 (e.g., reference data processing hub).

The data processing center 18 or its correction data estimator 34 determines correction data in real time based on the measurements, ephemeris data, other observables and any derived information received from one or more reference receivers 30. In one embodiment, the data processing center 18 comprises an electronic data processor 20, a data storage device 24, and one or more data ports 26 that are coupled to a data bus 22. The data processor 20, the data storage device 24 and the one or more data ports 26 may communicate with each other via the data bus 22.

Software instructions and data that are stored in the data storage device 24 may be executed by the data processor 20 to implement any of the blocks, components or modules (e.g., electronic modules, software modules, or both) described in this disclosure document. The data processor 20 may comprise a microcontroller, a microprocessor, a programmable logic array, an application specific integrated circuit (ASIC), a digital signal processor, or another device for processing data, manipulating, accessing, retrieving, and storing data. A data storage device 24 may comprise electronic member, non-volatile electronic memory, an optical storage device, a magnetic storage device, or another device for storing digital or analog data on a tangible storage medium, such as an optical disk, a magnetic disk, or electronic memory. Each data port 26 may comprise a buffer memory, a transceiver or both for interfacing with other network elements, such as a reference receiver 30 or a terrestrial satellite uplink station 28.

In one embodiment, the data processing center 18 or data processor 20 or correction data estimator 34 receives the phase measurements and corresponding satellite identifiers from the reference receivers 30, reference receiver identifiers (or corresponding coordinates) and processes the phase measurements to estimate a clock bias for each satellite, or rather each satellite signal, or a corresponding clock solution for incorporation into correction data 16. As illustrated in FIG. 1B, the clock solution, clock bias or correction data 16 is provided to a terrestrial uplink station 28 or another communications link. For example, the terrestrial uplink station 28 communicates or transmits the clock solution, clock biases or correction data 16 to a communications satellite 35 (e.g., repeater).

In turn, the communications satellite 35 transmits the correction data 16 to a correction wireless device 14 (e.g., a satellite receiver or L-band satellite receiver). The correction wireless device 14 is coupled to a mobile receiver 12 (e.g., mobile GNSS receiver) or rover. The mobile receiver 12 also receives satellite signals from one or more GNSS satellites and measures the carrier phase (and code phase) of the received satellite signals. In conjunction with the phase measurements, the precise clock solutions or clock biases in the correction data 16 can be used to estimate the precise position, attitude, or velocity (e.g., solution) of the mobile receiver 12. For example, the mobile receiver 12 may employ a precise point positioning (PPP) estimate using precise clock and orbital solutions for the received signals of the satellites.

Figure 1C:
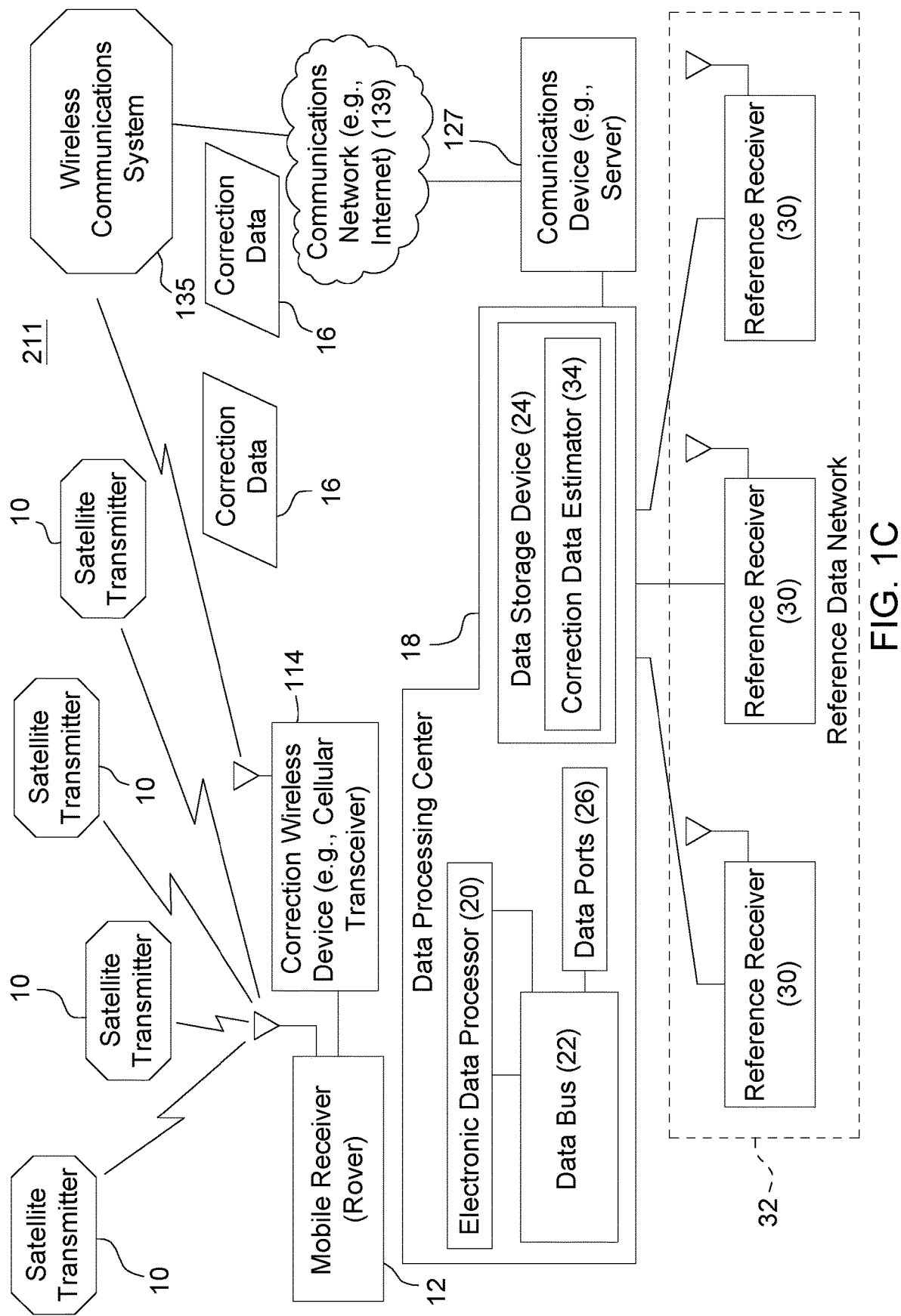
FIG. 1C is an illustrative block diagram of a second embodiment of a GNSS system with the aid of a correction or augmentation system.

The system 211 of FIG. 1C is similar to the system 11 of FIG. 1B except the system of FIG. 1C replaces the communications satellite 35 and the terrestrial uplink station 28 with a communications device 127 (e.g., server), a communications network 139 (e.g., Internet or communications link), and a wireless communications system 135. In one embodiment, the wireless communications system 135 may comprise a cellular communications system, a trunking system, a WiFi communications system, or another communications system. For example, the cellular communications system may comprise cell sites or base stations in communication with a base station controller, a router, or another mobile telephone switching office (MTSO), where the MTSO interfaces with a communications network 139, such as the Internet.

The communications network 139 may comprise microwave links, fiber optical links, the public switched telephone network (PSTN), the Internet, or another electronic communications network. In one embodiment, the communications device 127 comprises a server that formats, organizes or transmits the correction data in data packets (e.g., data packets compatible with TCP/IP Transmission Control Protocol/Internet Protocol) for transmission over the communications network 139. The communications network 139 communicates with the correction wireless device 114 (e.g., cellular transceiver) that is associated with or coupled to the mobile receiver 12.

In this document, under the precise positioning mode of FIG. 1B or FIG. 1C, the mobile receiver 12 can achieve centimeter-level accuracy positioning, by using the real-time global differential correction data 16. This correction data 16 is available and valid globally through either over satellite communications (e.g., L-Band geostationary communication satellite) in FIG. 1B or wireless communications system (e.g., cellular wireless system) in FIG. 1C. The global differential correction under a precise positioning mode, illustrated in the example of FIG. 1B, eliminates the need for local reference stations and radio communication that would otherwise be used to establish short baselines (e.g., less than approximately 20 kilometers to approximately 30 kilometers) between a reference receiver 30 and a mobile receiver 12 for precise position accuracy.

Figure 2:
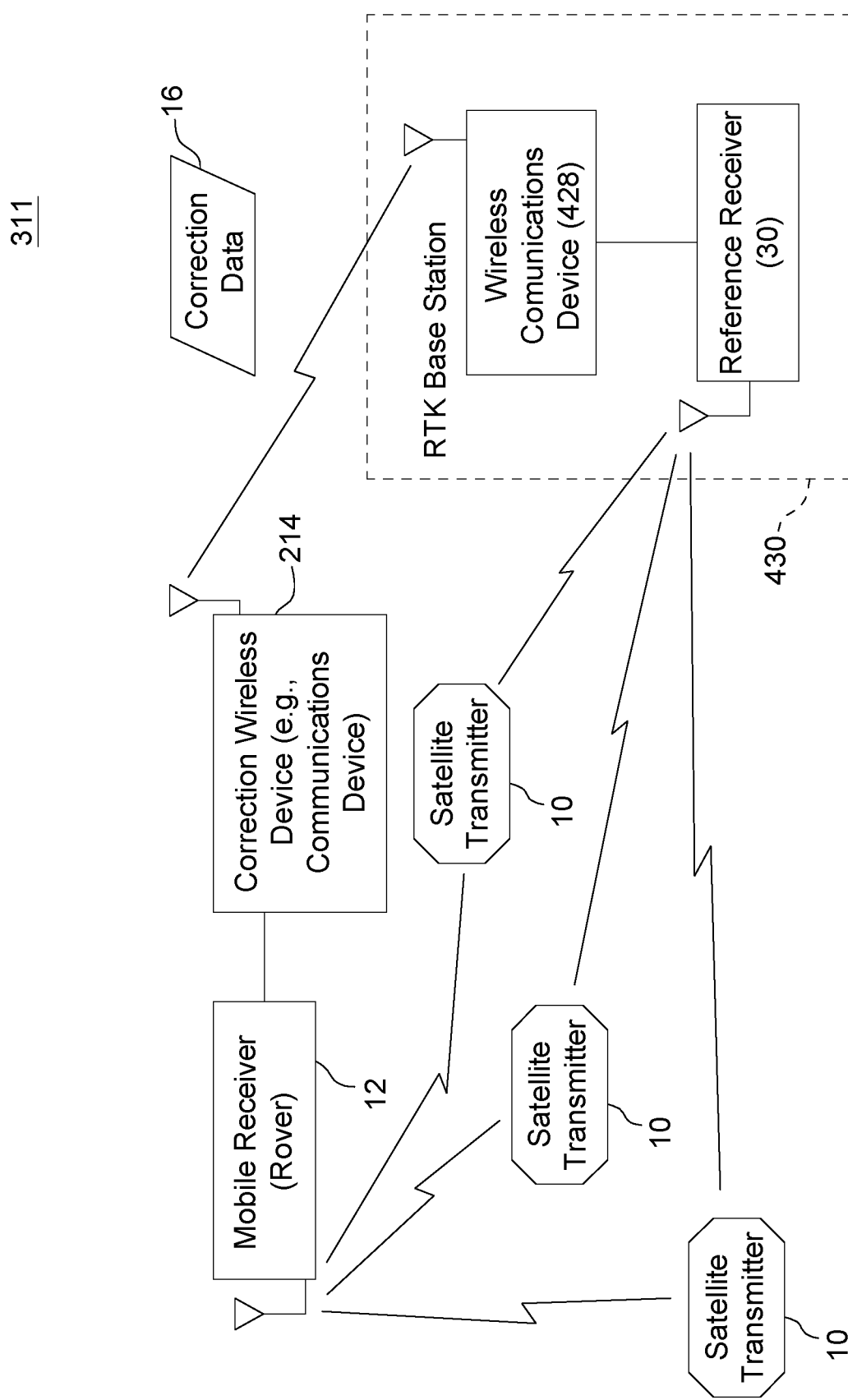
FIG. 2 is a second embodiment of an illustrative block diagram of an RTK base station receiver and rover receiver.

In comparison to FIG. 1B and FIG. 1C, FIG. 2 shows a mobile receiver 12 that operates in the real-time kinematic mode with the provisions of correction data (e.g., local RTK correction data) from a real-time kinematic (RTK) base station 430. Like reference numbers in FIG. 1B, FIG. 1C and FIG. 2 indicate like elements.

In the RTK mode, the accuracy requires visibility of the same set of satellites by the mobile receiver 12 and the reference receiver 30. Moreover, the baseline or separation distance between the mobile receiver 12 and the reference receiver 30 (or RTK base station 430) is limited to short baselines (e.g., less than 20 approximately kilometers to approximately 30 kilometers) for target accuracy as the decimeter or centimeter level.

In contrast, the extended RTK mode (RTKX mode) refers to any mode of operation of the mobile receiver 12 after the RTK correction signal (e.g., between devices 128, 214) is lost, interrupted or corrupted at the mobile receiver 12, as indicated by a correction wireless device 214 (e.g., wireless communications device) or the navigation positioning estimator or the RTKX module. The extended RTK mode may comprise any of the following modes: converged precise positioning mode (e.g., PPP mode), relative positioning mode, and/or float ambiguity resolution in the precise positioning mode, among other possibilities.

Here, in FIG. 2 the RTK base station 430 comprises a reference receiver 30 (e.g., GNNS navigation receiver) and a wireless communications device 428, such as a wireless transceiver or transmitter. The RTK base station 430 or the reference receiver 30 determines RTK correction data, such as an offset vector (e.g., base offset vector) or difference between an observed position of the reference station based on measured carrier phase of the satellite signals and known position or coordinates of the reference receiver 30. The RTK base station 430 or the wireless communications device 428 forwards or transmits the RTK correction data to the mobile receiver 12 via the correction wireless device 214 in real time to support precise position determination and navigation at the mobile receiver.

The wireless communications device 428 (e.g., wireless communications device) may communicate directly with the correction wireless device 214, or via a wireless communications system (e.g., repeater). The correction wireless device 214 may comprise a transceiver or wireless receiver.

In one embodiment in accordance with one possible configuration, an RTK base station 430 or a local reference receiver 30 determines a precise point positioning estimate based on received satellite signals and a precise correction signal. Moreover, the RTK base station 430 or reference receiver 30 can determine the offset vector between the determined precise point positioning estimate and the known reference position (e.g., fixed coordinates of the RTK base station). The offset vector determined by a base station or reference receiver is referred to as a base offset vector or RTK offset bias. The offset vector can be transmitted from the RTK base station 430 to the mobile receiver 12 in real time via the wireless communications device 428 and the correction wireless device 214. Accordingly, in certain configurations, the mobile receiver 12 does not need to determine the offset vector because the RTK base station 430 or reference receiver 12 does.

The advantage of the above configuration is a high quality offset because of the known reference position of the reference receiver 12, but a precise correction signal (e.g., PPP correction data) is required at the reference receiver 12. In other configurations disclosed in this document, the mobile receiver 12 simultaneously determines an RTK solution and a precise position solution and computes an offset vector (e.g., mobile offset vector) between the RTK solution and the precise position solution. The offset vector determined by a mobile receiver or rover is referred to as a mobile offset vector, a rover offset vector or a learned offset vector.

Although one RTK base station 430 is shown in FIG. 2, in alternate embodiments it is possible to use multiple RTK base stations, or even a network of RTK base stations and data processing center that serves a geographic region.

Figure 3:
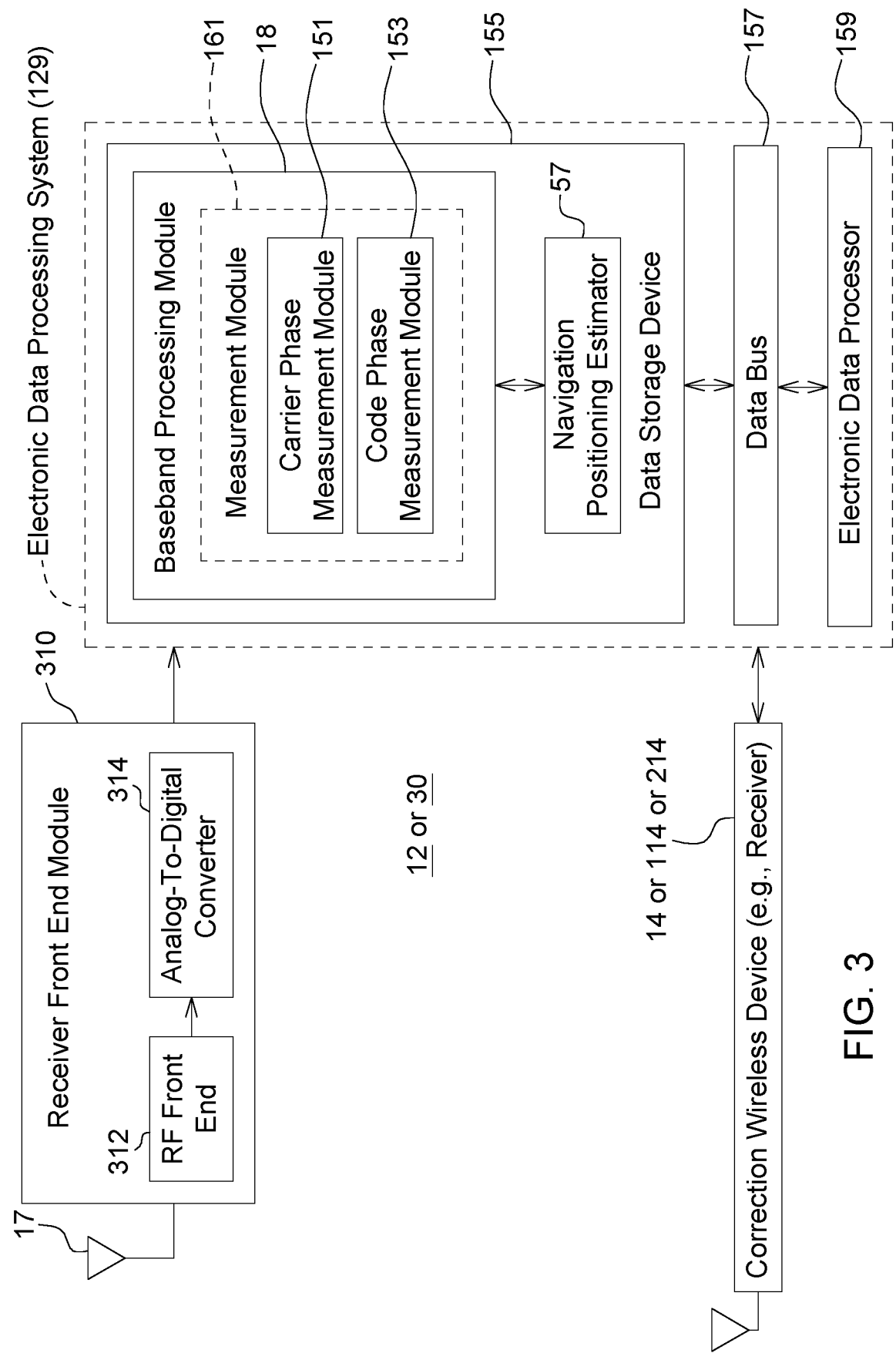
FIG. 3 is a block diagram of one embodiment of rover receiver or base station receiver (e.g., reference receiver as part of a correction-service network).

In accordance with one embodiment, FIG. 3 discloses a system or receiver (12 or 30) (e.g., satellite navigation receiver) capable of reception of received signals that comprise one or more carrier signals (e.g., a first carrier (L1), a second carrier (L2) and a third carrier (L5) of Global Positioning System (GPS)) transmitted by satellites. The received signal is transmitted from a satellite transmitter 10 of one or more satellites, such as a navigation satellite, or such as a Galileo-compatible navigation satellite, (Global Navigation Satellite System) GLONASS or Global Positioning System (GPS) satellite. The satellites have known orbital positions versus time that can be used to estimate the relative position between an antenna 17 of the receiver and each satellite based on the propagation time of one or more received signals between the three or more satellites and the antenna 17 of the receiver.

As used in this document, "CD" shall refer to code and "CR" shall refer to the carrier of the received signal or a digital representation of one or more samples of the received signal. The code comprises a modulating code (e.g., pseudo-random noise code modulated with information) that modulates the carrier.

In accordance with one embodiment FIG. 3 illustrates a receiver (12 or 30) that comprises a receiver front end module 310 coupled to an electronic data processing system 129. The receiver (12 or 30) receives a received signal that comprises one or more carrier signals from a set of satellite transmitters 10. The receiver (12 or 30) may comprise a location-determining receiver for: (a) determining a location of a receiver antenna 17, (b) a range-determining receiver for determining a range or distance between the receiver antenna 17 and a satellite (e.g., satellite antenna 17) or (c) determining ranges between the receiver antenna 17 and one or more satellites, or (d) determining position, velocity, acceleration, and/or attitude (e.g., tilt, roll, yaw) of the antenna 17.

A real-time kinematic base station 430 (in FIG. 2) or reference receiver 30 may provide or transmit wirelessly RTK correction data to the correction wireless device 214. The correction data may comprise position data, phase data, a position offset or phase offset. In one embodiment, the real-time kinematic base station 130 comprises a reference receiver 30 that is the same or similar to the mobile receiver 12, except that the (RTK) reference receiver 30 is located at a known reference position. Accordingly, the RTK reference receiver 30 can have the same blocks and modules as the mobile receiver 12.

In one embodiment, in FIG. 3 a receiver front end module 310 and the radio frequency (RF) front end 312 receive one or more received satellite signals (e.g., of one or more GNSS satellite constellations) at antenna 17. In one embodiment, the RF front end 312 comprises an amplifier, a down-conversion mixer, and a local oscillator. For example, the amplifier comprises radio frequency (RF) or microwave amplifier (e.g., low noise amplifier) that is coupled to the antenna 17 for receiving the received signal that is transmitted from one or more satellites. The amplifier provides an amplified signal to the down-conversion mixer as a first input. The local oscillator provides a signal to the down-conversion mixer as a second input. The down-conversion mixer moves or lowers the signal spectrum of the received signal from RF to an intermediate frequency (IF) or baseband frequency. The down-conversion system may include one or more mixing, amplifying, and filtering stages.

The output of the RF front end 312 is coupled to an analog-to-digital converter 314 (ADC). The ADC 314 converts the analog intermediate frequency signal or analog baseband signal to a digital signal. The digital signal comprises one or more digital samples that are available at a sampling rate. Each sample has a finite quantization level and each sample is capable of being processed by an electronic data processing system 129.

In one embodiment, the electronic data processing system 129 comprises a digital receiver portion. The electronic data processing system 129 can comprise an electronic data processor 159, a data storage device 155 (e.g., electronic memory) and a data bus 157 for communication between the electronic data processor 159 and the data storage device 155, where software instructions and data are stored in the data storage device and executed by the data processor 159 to implement any of the blocks, components or modules (e.g., electronic modules, software modules, or both) illustrated in FIG. 3.

The digital signal outputted by the ADC 314 is fed into the baseband processing module 118. In one embodiment, the baseband processing module 118 comprises a carrier wipe-off module, a local carrier signal generator, a code wipe-off module, a local code generator, correlators, and a data demodulator to process the baseband signals properly.

The data demodulator (e.g., discriminator) provides satellite navigation data (e.g., where publicly accessible to civilians) for estimating a range (e.g., distance between a satellite and the antenna 17) or a position (e.g., in two or three dimensional coordinates) of phase center of the antenna 17. The satellite navigation data or other signal information may comprise one or more of the following information that modulates the baseband waveform of the received signal: date, satellite navigation system time, satellite status, orbital data, ephemeris data, almanac, satellite location, and satellite identifier. The data demodulator may use phase shift keying, phase demodulation, pulse width demodulation, amplitude demodulation, quadrature amplitude demodulation, or other demodulation technique that is consistent with the modulation by the modulator at the satellite transmitter. Further, in certain embodiments, the measurement module 161, the baseband processing module 118, or the electronic data processor 159 may further comprise a atmospheric modeling module 405 (e.g., ionospheric modeling module) that supports one or more ionospheric or atmospheric models for estimating ionospheric error and correction data for one or more carrier phase measurements and/or code phase measurements of corresponding GNSS signals or one or more GNSS satellite channels (e.g., L1, L2 and L5).

Figure 4:
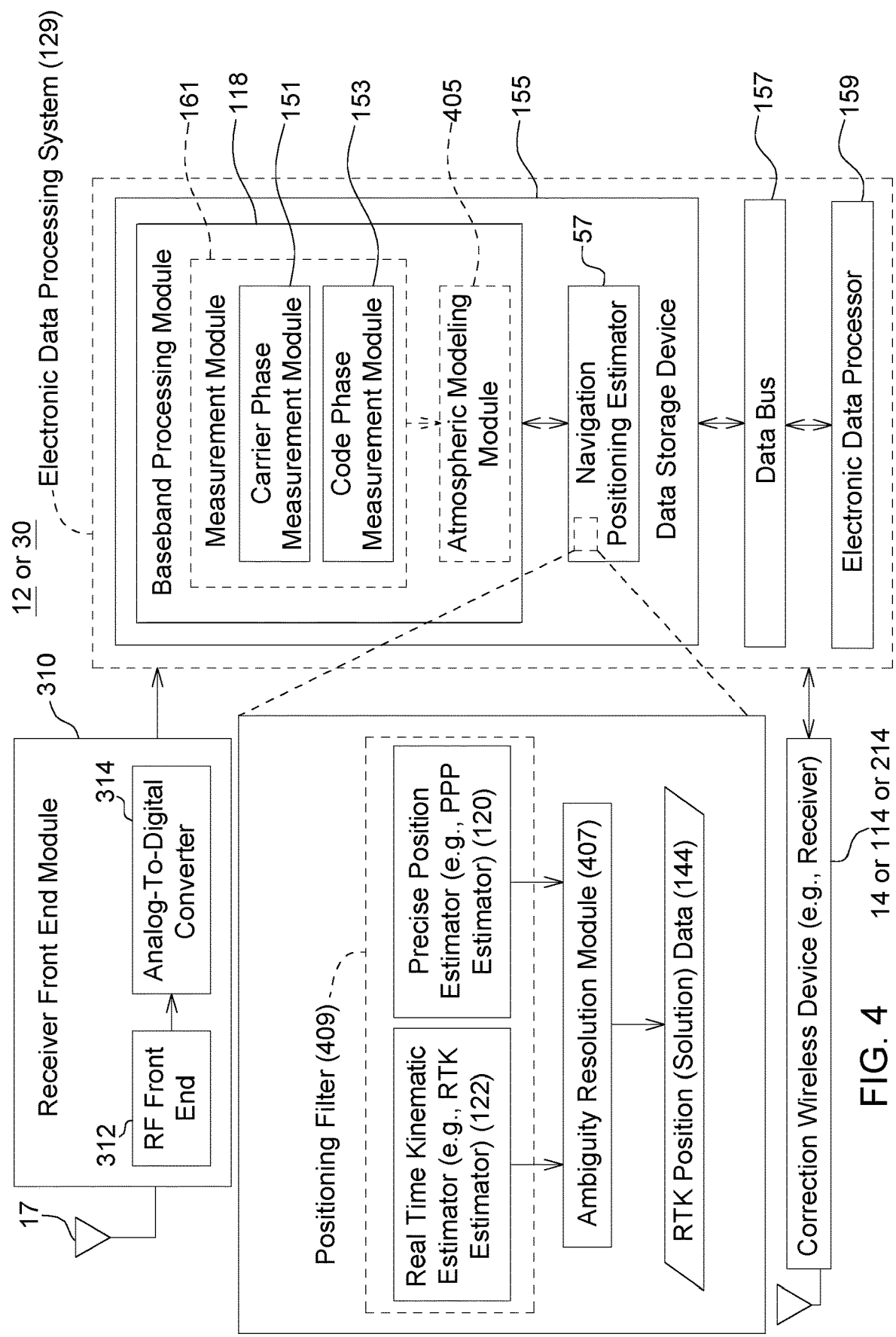
FIG. 4 is a block diagram of one embodiment of a rover receiver or base station receiver in greater detail than FIG. 3.

In one embodiment, the measurement module 161 comprises a carrier phase measurement module 151 and a code phase measurement module 153. The code phase measurement module 153 measures the code phase of one or more received signals, or rather the phase of the pseudo random noise code encoded on one or more received signals. The code phase is not ambiguous in the number of cycles of at the wavelength of the code signal. The carrier phase measurement module 151 measures the carrier phase of one or more received signals. The measured carrier phase is ambiguous as to the integer number of cycles at the receiver (12 or 30). Accordingly, as illustrated in FIG. 4, the navigation positioning estimator 57 may comprise an ambiguity resolution module 407, unless the measurement module 161 is configured to support an ambiguity resolution module.

The navigation positioning estimator 57 determines the position estimate of the receiver antenna 17 based on the measured carrier phases, estimated ranges of the measurement generation module 39 and demodulated data. For example, the navigation positioning estimator 57 or the positioning engine may use ranges from four or more satellites to determine the position, velocity, or acceleration of the antenna 17 of the receiver in two or three dimensions.

In one embodiment, the navigation positioning estimator 57 estimates the propagation time between transmission of a satellite signal from a certain satellite to the receiver antenna 17 and converts the propagation time into a distance or range proportional to the speed of light. In the digital receiver portion, the receiver (12 or 30) or its data processing system 129 may comprise hardware and software instructions. For example, in one illustrative embodiment the hardware comprises a data processor 159 that communicates to a data storage device 155, which stores software instructions, via one or more data buses 157.

In the data processing system 129, the data processor 159 may comprise one or more of the following: an electronic data processor, a microprocessor, a microcontroller, an application specific integrated circuit (ASIC), digital signal processor (DSP), a programmable logic device, an arithmetic logic unit, or another electronic data processing device. The data storage device 155 may comprise electronic memory, registers, shift registers, volatile electronic memory, nonvolatile random access memory, a magnetic storage device, an optical storage device, or any other device for storing data. The data processor 159 may be coupled to the data storage device 155 via one or more data buses, which support communication between the data processor 159 and the data storage device 155.

In general, the electronic data processing system 129 comprises an electronic data processor, digital logic circuits, multiplexers, multipliers, digital filters, integrators, delay circuits, oscillator, signal generator, pseudo-noise (PN) code sequence generator, registers, shift registers, logic gates, or other hardware. The electronic data processing system 129 may support storage, retrieval and execution of software instructions stored in a data storage device.

In one embodiment, the navigation positioning estimator 57 estimates a position of the receiver antenna 17 based on the measured carrier phase and the correction data received via the correction wireless device (14, 114, 214) (e.g., satellite receiver, such as an L-band satellite receiver). In one embodiment, the navigation positioning estimator 57 comprises one or more of the following: a real-time kinematic position estimator 122 and a precise position estimator 120 (e.g., PPP estimator), and an ambiguity resolution module 407 consistent with FIG. 4.

FIG. 4 is a block diagram of another embodiment of a receiver for switching between real-time kinematic mode and precise positioning mode; FIG. 4 shows the navigation positioning estimator 57 in greater detail than FIG. 3. Like reference numbers in FIG. 3 and FIG. 4 indicate like elements, modules or features.

Figure 5:
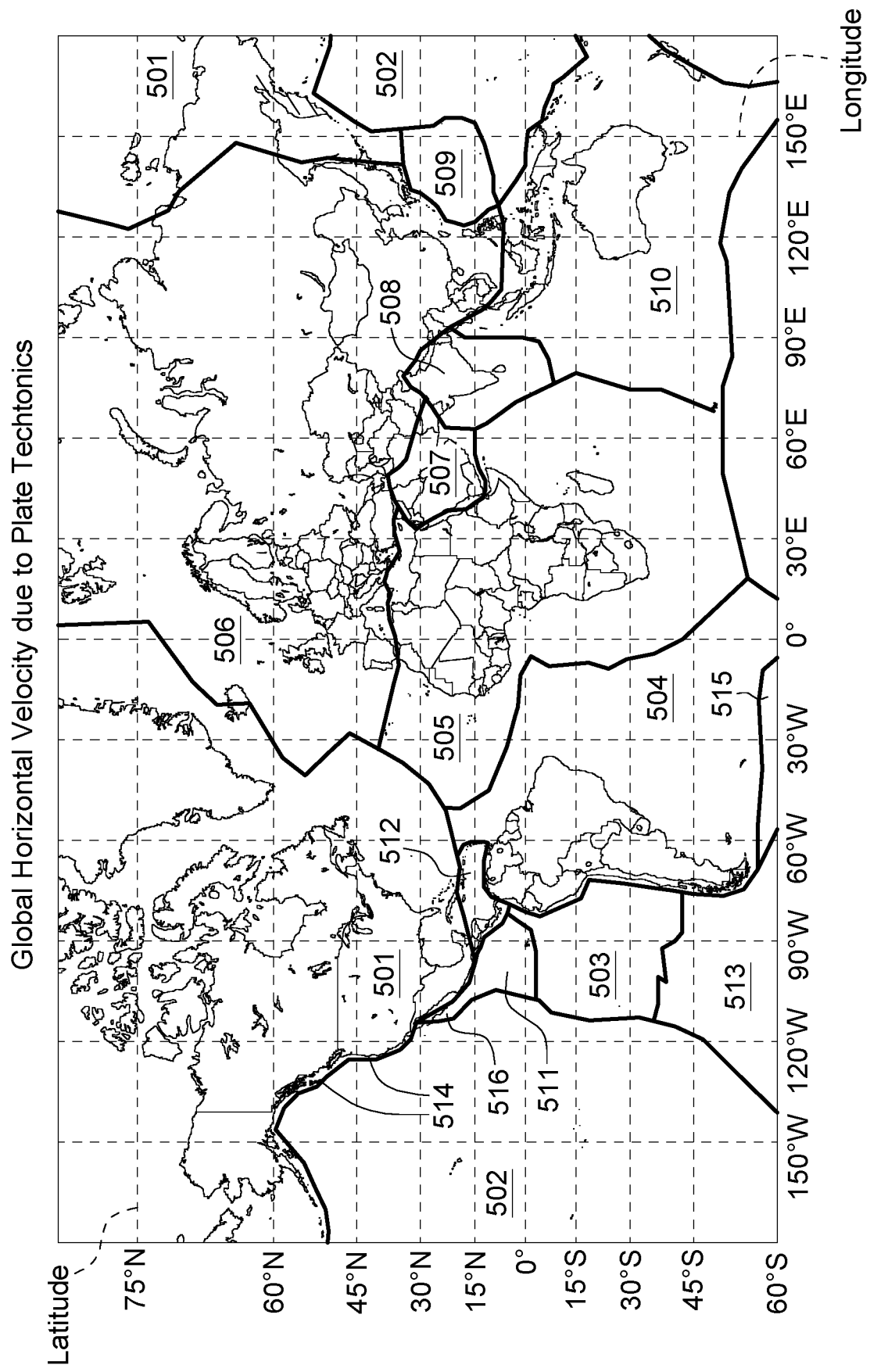
FIG. 5 is a geographical map that illustrates the general boundaries and corresponding names of major plates throughout the globe.
Figure 6:
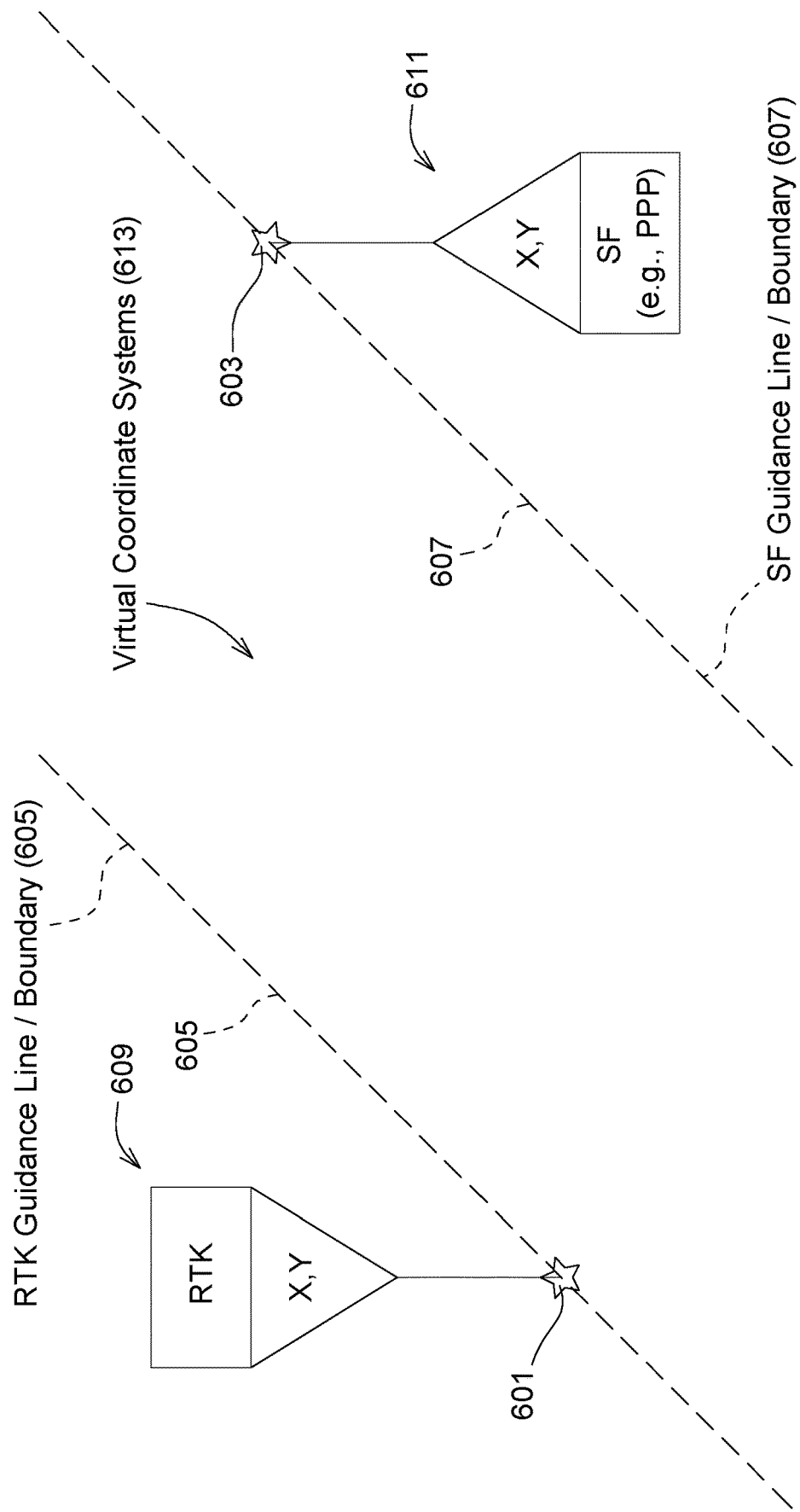
FIG. 6 is a block diagram of one possible example of a datum offset between an RTK guidance line or boundary and a PPP, PPP-RTK, DGNSS, or DGNSS-RTK guidance line or boundary.
Figure 7:
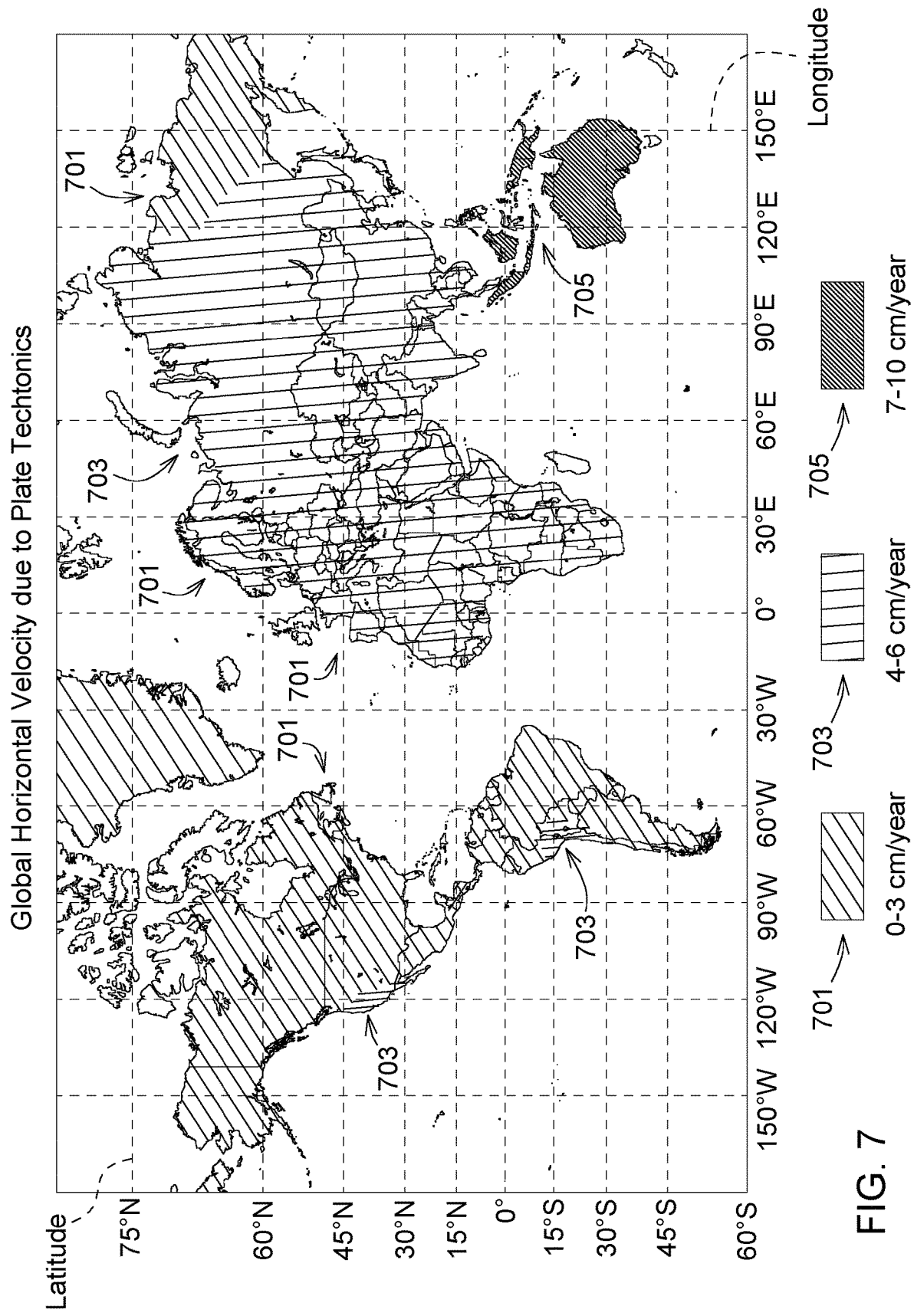
FIG. 7 is a geographical map that illustrates the global horizontal velocity of tectonic plates throughout regions of the globe (e.g., in units of centimeters per year).

As illustrated in FIG. 4, the navigation positioning estimator 57 comprises a real-time kinematic (RTK) estimator 122, a precise position estimator 120 (e.g., PPP estimator), and the ambiguity resolution module 407, which can support any of the following: step S207 in FIG. 5A, step S301 in FIG. 6, and step S207 in FIG. 7. The precise position estimator 120 and the RTK estimator 122 may output any of the following output data: position estimates (alone or along with corresponding variance estimates), velocity estimates, motion estimates or heading estimates. In one embodiment, the precise position estimator 120 and the RTK estimator 122 provide output data to the RTK extend module 409.

Repeatability is the ability of a GNSS receiver or GNSS guidance system to bring the user, vehicle or its implement back to the same spot within certain accuracy in the field reliably each time. This is critical for precision farming applications such as automated steering, automated guidance, navigation, autonomous guidance, and boundary mapping.

A plate refers to a portion of Earth's upper surface or crust. Plate tectonics is the process that one or more plates move with respect to the mantle. Sixteen major plates are identified globally and tend to move at different speeds. For example, the North America (NA) moves about 2 cm/year while the Australia plate moves at about 8 cm/year.

FIG. 5 illustrates the major tectonic plates with the names and boundaries. The major tectonic plates include the following: Africa 505, Antarctica 513, Arabia 507, Australia 510, Caribbean 512, Cocos 511, Eurasia 506, India 508, Juan de Fuca 514, Nazca 503, North America 501, Pacific 502, Philippine 509, Rivera, Scotia 515, and South America 504.

A GNSS receiver can estimate the GNSS position for navigation in differential mode or absolute mode. The differential mode includes DGPS (Differential GPS) and RTK (Real Time Kinematic). Conventionally DGPS hints that code pseudo-range measurements are being used and in RTK carrier phase measurements determine the quality of positioning and navigation. The absolute mode includes SPP (standard Point Positioning) and PPP (Precise Point Positioning). Compared to SPP, PPP relies on phase measurements and the corrections of satellite orbit and clock broadcasted from geo-stationary satellites or from internet.

For RTK or mRTK applications, the RTK rover coordinates are precisely derived relatively from local RTK base station or an RTK reference station of an RTK network. When RTK base station coordinates are changed because of movement of the tectonic plates over time, RTK rover coordinates will change too.

In the context of plate tectonics for RTK or mRTK, it is easier to achieve good repeatability of position, attitude and motion estimates for differential mode due to the fact that usually the (RTK) base station moves together with the rover on the same tectonic plate (e.g., for baseline of typical distance, such as 25 Km or less) between the rover receiver and base station receiver). However, repeatable position, attitude and motion estimates are refined for the absolute mode since the rover's coordinates are referenced to a global reference frame instead of referenced to a real base station with known, fixed coordinates (e.g., in two or three dimensions).

The PPP mode may provide in-season repeatability of positions with precision of up to plus or minus 1.2 inches (or approximately 3.048 centimeters) pass-to-pass accuracy, subject to the availability of the correction signal via a wireless communications device or satellite receiver. In one embodiment, the PPP mode relies upon a correction signal that incorporates precise satellite and precise orbit corrections for one or more GNSS constellations, which can be used to provide globally valid correction signals. A rover or mobile receiver processes the correction signal to estimate positions or solutions based on carrier phase estimations of received GNSS signals from one or more constellations.

In some applications and throughout this document, wide-area differential GNSS correction mode (DGNSS), such as differential Global Positioning System (DGPS), may be used as an alternative to PPP mode, although DGPS (mode) tends to provide less accurate or precise position estimates and less repeatable position estimates than certain PPP (mode) configurations. The GNSS receiver operating in the differential DGNSS mode requires a correction signal. In some configurations, for example the DGNSS mode can provide pass-to-pass accuracy of about plus or minus 6 inches (e.g., 15.24 centimeters), which requires reliable reception of a correction signal by a satellite receiver or wireless communications device. For potentially enhanced in-season repeatability, in practice, the differential GNSS mode is often combined with some form of RTK, such as local or regional RTK or mRTK, where the local or regional RTK may be available from a service provider that operates a local or regional RTK network of RTK base stations. The combination of DGNSS and RTK may be described as DGNSS-RTK (mode), whereas the combination of PPP and RTK may be referred to as PPP-RTK (mode). In some applications and throughout this document, DGNSS-RTK (mode) may be used as an alternative to PPP-RTK (mode), although DGPS-RTK (mode) tends to provide less accurate or precise position estimates and sometimes less repeatable position estimates than certain PPP-RTK (mode) configurations In practice if a GNSS receiver 512 estimates coordinates for a certain position on the ground in different operational modes, the observed coordinates may differ between an RTK mode 609 and precise point positioning mode (PPP) mode, a PPP-RTK mode, a DGNSS mode, or a DGNSS-RTK mode (e.g., SF mode 611), as illustrated by the reference to "SF" in FIG. 6. For example, the observed RTK coordinates 601 (e.g., virtual RTK x, y coordinates for latitude and longitude excluding height z) in an RTK (RTK and/or MRTK) reference frame may not align (e.g., on the ground) with the observed PPP coordinates 603 (e.g., virtual PPP x, y coordinates for latitude and longitude excluding height z) in a PPP reference frame (e.g., StarFire™ SF3 correction signal or StarFire™-RTK correction signal), unless the reference frames are aligned by one or more offsets (e.g., a position offset vector, a position offset, or an equivalent carrier phase offset which may vary with time). Further, the datum offset between the RTK mode 609 and the PPP or PPP-RTK mode (e.g., 611) may result in a virtual RTK guidance component 605 (e.g., RTK guidance lines or boundary) that is shifted with respect to a virtual PPP or RTK guidance component 607 (e.g., PPP or RTK guidance line or boundary). In virtual coordinate systems 613, each guidance line or boundary (605, 607) is defined by one or more points (e.g., waypoints or end points) that are separated by an offset datum or offset vector. The points on the RTK guidance lines (e.g., 605) and the PPP or PPP-RTK guidance lines (e.g., 607) that represent the same real world coordinates are actually separated by the offset datum or offset vector.

In the RTK mode, the base station GNSS receiver may output RTK coordinates or correction data in the RTCM-3 compatible data format, whereas, in the PPP mode or other precise differential correction mode, one or more reference stations may output a proprietary data format or a standard format like RTCM SSR, IGS SSR, and/or CSSR data formats. Accordingly, for a later task in a field, an operator may not rely upon guidance lines for an earlier task in the same field (e.g., during the current or previous growing season) if the GNSS receiver operates in different modes during the earlier task and later task. Guidance lines and boundaries created with a vehicle with an RTK system generally cannot be used interchangeably in vehicle with a PPP (e.g., SF system), and vice versa) because of the position error, difference or offset between the GGNSS receiver that operates in different modes. Although the operator can keep records of the operational modes of the receiver, the operational mode of the receiver may change unexpectedly or automatically for recovery, reliability or redundancy. When RTK/mRTK base station coordinates are upgraded/changed or when an RTK base station is switched to different RTK base site (without proper leveled, installing or commissioning), it tends to introduce an offset in RTK rover coordinate. It means the offset is also changed. It should be noted that when a PPP data format is upgraded between ITRF formats (e.g., from ITRF2008 data format to ITRF2014 data format or from ITRF2014 to ITRF2020), a small offset (e.g., a few millimeters) could be introduced into the upgraded data set, such as an A-B guidance line, a contour guidance line or a boundary of a field or a work area. International Terrestrial Reference Frame (ITRF) is a geocentric reference system with an origin defined at the center of mass of the entire earth, which includes the oceans and atmosphere, where the reference system has defined orientation of the axes of the Earth and with reference to particular reference time (e.g., epoch or measurement unit). ITRF coordinates are obtained by combination of individual terrestrial reference frame solutions computed by International Earth Rotation and Reference Systems Service (IERS) centers using the observations or measurements of space geodesy techniques, such as the Global Positioning System (GPS), Very Long Baseline Interferometry (VLBI), Satellite Laser Ranging (SLR), Lunar Laser Ranging (LLR) and Doppler Orbitography and Radiopositioning Integrated by Satellite (DORIS). As of the drafting date of this document, the ITRF reference frames and the ITRF transformation parameters between any two ITRF reference frames are indexed to a common reference epoch, which is currently "2015.0." They all use networks of stations located on sites covering the whole Earth. The ITRF may include measurements of the position of reference stations (e.g., GPS reference stations) and the velocity of the stations, which can be used to derive velocity vectors for tectonic plates associated with the reference stations. Most importantly, when reference epoch is changed during operation of the GNSS receiver in the PPP mode for prior and later measurements or mixed PPP/RTK mode for the prior and later measurements, a significant datum offset (e.g., an offset vector, alone or together with rotation of the offset vector) could be introduced due to Plate tectonics movement.

FIG. 7 illustrates the magnitude of annual movement due to plate tectonics. The annual horizontal movement due to tectonic plates can be grouped into low annual tectonic plate movement (e.g., velocity of 0-3 centimeters per year), medium annual tectonic plate movement (e.g., velocity of 3 to 6 centimeters per year) and high annual tectonic plate movement (e.g., velocity of 5-9 centimeters per year).

Some limited regions of the West coast of the United States, Central America, Bolivia and Peru have medium annual tectonic plate movement or medium horizontal velocity. However, North America and South America generally have low annual tectonic plate movement. India, Tibet areas of China, Pakistan, Iran, Eastern Saudi Arabia, and Oman ten to have medium annual tectonic plate movement. Some portions of Europe, Asia and Africa tend to have low annual tectonic annual plate movement or low-to-medium annual tectonic plate movement, while other portions of Europe, Asia and Africa have medium annual tectonic plate movement. At least some portions of Australia, Indonesia and Papua New Guinea tend to have high annual tectonic plate movement.

In this disclosure, an innovative technique, called datum conversion, allows one or more GNSS receivers: (a) to store in a data storage device (e.g., buffer memory, an electronic memory device, or a data transceiver) a dual output (e.g., simultaneously) as an RTK mode data stream and a PPP mode data stream (e.g., or an alternate, such as DGNSS or DGNSS/RTK) to support real-time (e.g., instantaneous or immediately on demand) datum conversion information between receiver navigation modes; (b) to provide or output (e.g., at one or more data ports) a dual output (e.g., simultaneously) as: (1) an RTK mode data stream and (2) a datum offset vector or datum offset vector stream (associated with or paired with the RTK data stream) to support real-time (e.g., instantaneous or immediately on demand) datum conversion information between receiver navigation modes; (c) to publish the dual output (e.g., simultaneously) as: (1) the RTK mode data stream and one or more corresponding datum offset vectors, and/or (2) an RTK mode data stream and a PPP mode data stream (e.g., by conversion of RTK mode data stream to PPP mode data stream based on the datum offset vectors) support real-time (e.g., instantaneous or immediately on demand) datum conversion information between receiver navigation modes; and/or (d) to wireless transmit or wireless communicate via a communications network to a central server 518 or cloud data storage as an RTK mode data stream, a PPP mode data stream, or dual mode stream to support real-time (e.g., instantaneous or immediately on demand) datum conversion information between receiver navigation modes; and/or (e) the location-determining receiver (e.g., GNSS receiver 512) is configured to transmit or provide to an electronic data processing system 535 (e.g., onboard a vehicle) the transformed second position and a respective assigned identifier for storage in a data storage device 525. For example, the transformed second position and respective assigned identifiers generally represent any storable data (e.g., for storage in the data storage device 525) related to guidance or navigation of the vehicle, such as any of the following: boundary lines of a field or work site; one or more guidance line, points or geographic coordinates on boundary lines of field or work site; and points or geographic coordinates of one or more guidance lines; alone or together with meta data, for later reference by the electronic data processing system 535 of the vehicle.

Datum conversion information can be published (e.g., by an electronic data processing system 535 of a vehicle or retrieved from electronic data storage 525 for communication) on controller area network (CAN) data bus, an ethernet data bus, or another vehicle data bus, or retrieved wirelessly from a central server 518 or the cloud for precise guidance, mapping, and documentation applications to apply for this information to achieve interoperability when receiver navigation mode or datum is changed as FIG. 8. In one example, the datum offset vector can be based on a vector difference between an RTK solution and a PPP mode solution associated with the RTK mode data stream for the same epoch or successive data streams of RTK solutions and corresponding datum offset vectors for a series of successive epochs. An epoch is a measurement unit of the GNSS receiver in which one or more carrier phase measurements are observable in the received satellite signals from a set of GNSS satellites (e.g., at least four satellites from the same constellation of GNSS satellites).

In one embodiment, the RTK base station may be associated with a wireless communications device (e.g., transmitter or transceiver) that determines, outputs, transmits or broadcasts a correction signal to rover GNSS receivers (e.g., operating in an RTK mode, a PPP-RTK mode, or a DGNSS-RTK mode) in a standard format, such as the RTCM data message (e.g., RTCM SC-104 data message), or another standard or proprietary data format for the correction message, which can incorporate any of the datum offset vectors datum offset (e.g., $$\vec{B}_{SF(t_0)}^{Mode}),$$

disclosed in this document, in a reserved or dedicated data block, reserved word, or reserved frame of a data message. In an alternate embodiment, the RTK base station may transmit a separate datum offset vectors (e.g., $$\vec{B}_{SF(t_0)}^{Mode})$$

to the local RTK or regional RTK rovers in the reception range. Regardless of whether the rover GNSS receiver generates the data offset vector or the base station GNSS receiver generates the datum offset vector, an electronic data processing system can store in a data storage device, RTK positions along with corresponding datum offset vectors referenced to a reference frame (e.g., ITRF2014).

Figure 8A:
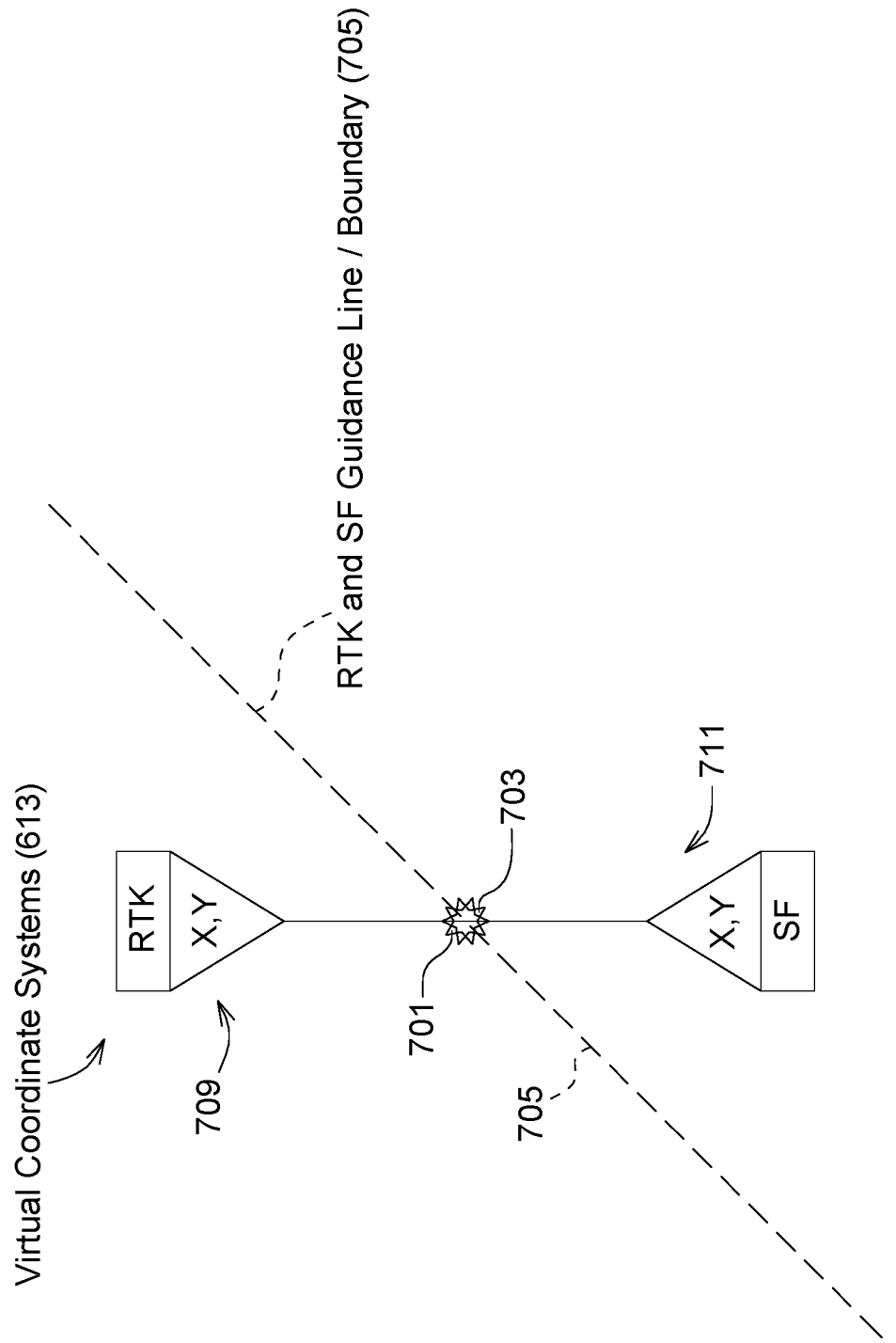
FIG. 8A is a block diagram of one possible example of no datum offset (or a consistent datum offset that is corrected or compensated for) between an RTK guidance line or boundary and a PPP, PPP-RTK, DGNSS, or DGNSS-RTK guidance line or boundary.

FIG. 8A illustrates a virtual coordinate system 613 in which there is no datum offset in the RTK position 701 (e.g., RTK geographic coordinates on the ground) and the SF position 703, such as a precise point position (e.g., PPP with PPP geographic coordinates on the ground), or any position estimated in a PPP, PPP-RTK, DGNSS, and DGNSS-RTK mode of a location-determining receiver (e.g., GNSS receiver 512). Here, in FIG. 8 there is no datum offset or a miniscule consistent datum offset between RTK mode 709 and the SF mode 711, where the SF mode 711 refers to one or more of the following: PPP, PPP-RTK, DGNSS, and DGNSS-RTK mode of a location-determining receiver (e.g., GNSS receiver 512). Both the RTK position and SF position 703 are intercepted by, coextensive with or lie on the RTK component and SF component (705), where the RTK component is the RTK guidance line, or RTK boundary for a work area or field, or both, and where the SF component is the SF guidance line, or SF boundary for the work area or field, or both.

Global Kinematic Plate Model

The global tectonic plates are moving continuously with relatively stable velocity even over millions of years. This characteristic enables the modeling of the movements by the evidence from geology, geophysics, and geodesy.

FIG. 8B illustrates a table that provides the Cartesian rotation vector for an illustrative set of major tectonic plates. In particular, the table discloses the Cartesian rotation vector for each plate using the NNR-NUVEL1A kinematic plate model (IERS TN21, Myr means millions of years).

The linear velocity vector $\vec{v}$ due to plate tectonics can be calculated for a given location $\vec{R}$ based on the rotation rate as in the following equation:

$$\vec{v} = \vec{\Omega} \times \vec{R}, \quad (1)$$

where rotation rate $\vec{\Omega}=[\Omega_x \Omega_y \Omega_z]'$ which can be found from the table of FIG. 8B. Thus, the displacement for a point is:

$$\vec{R} = R_0 + \vec{v} \cdot (t - t_0) \quad (2)$$

where $\vec{R}$ is a given location or position, $\vec{R}_0$ is the position at the starting epoch to and t is the current epoch for a given reference frame such as ITRF2014 or ITRF2020 $\vec{v}$ is the linear velocity vector.

Additional details about the above computation are explained in U.S. Pat. No. 10,481,275 B2, entitled LONG TERM REPEATABILITY OF DETERMINED POSITION IN GNSS NAVIGATION SYSTEM, and U.S. Pat. No. 10,802,159 B2, entitled LONG TERM REPEATABILITY OF DETERMINED POSITION IN GNSS NAVIGATION SYSTEM which are hereby incorporated herein by reference.

Datum Offset Learning

In a GNSS receiver with the PPP mode or RTK-PPP mode (e.g., StarFire™ GNSS receiver), a precise PPP or PPP-RTK solution $\vec{R}$ for any given time t, can be determined with reference to solution $\vec{R}_{SF}(t_0)$ with ITRF 2014 and epoch Jan. 1, 2018 (or a later ITRF reference frame or another suitable reference frame), and used as golden truth of XYZ coordinate using Equation 2. Precise solution for navigation mode $\vec{R}_{Mode}$ such as RTK solution, mRTK solution, a PPP-RTK solution or PPP solution with different ITRF datum such as ITRF2020, or different epoch time, can be subtracted from the solution associated with the true reference frame or baseline reference frame to learn the datum offset $$\vec{B}_{SF(t_0)}^{Mode}$$

in real-time as Equation 3. It should be noted that the above algorithm can be applied to either static receivers like RTK base or dynamic receivers in real-time. This offset information can be smoothed over time to improve accuracy and consistency.

$$\vec{B}_{SF(t_0)}^{Mode} = \vec{R}_{Mode} - \vec{R}_{SF}(t_0), \quad (3)$$

where $$\vec{B}_{SF(t_0)}^{Mode}$$

is the datum offset vector for a given navigation mode (such as RTK, mRTK, a precise point positioning (PPP) mode, or PPP-RTK or DGNSS-RTK) with reference to a reference frame (e.g., ITRF2014) at epoch $t_0$; $\vec{R}_{Mode}$ is an RTK solution vector (e.g., RTK position relative to an RTK base station or the rover) in the RTK mode (e.g., which is not time dependent); alternately, $\vec{R}_{Mode}$ is a PPP solution vector or PPP-RTK solution vector, at the $t_0$ epoch or any later epoch that aligns with the corresponding epoch of solution $\vec{R}_{SF}$ and the corresponding epoch of the datum offset vector; $\vec{R}_{SF}(t_0)$ is a PPP solution vector (e.g., PPP position relative to the RTK base station or the rover) in the precise point positioning mode with reference to epoch $t_0$, at the $t_0$ epoch or any later epoch.

In an alternate embodiment, in the above equation the $\vec{R}_{SF}(t_0)$ may comprise a DGNSS solution vector (e.g., DGNSS position or DGNSS-RTK position relative to the RTK base station or the rover) in the precise point positioning mode with reference to epoch $t_0$, at the $t_0$ epoch or any later epoch.

As used throughout this document and equations, the subscript SF and superscript SF is a function of epoch/time and SF means any of the following: PPP, PPP-RTK, or DGNSS-RTK, (or in alternate embodiments DGNSS that meets certain target technical specifications for accuracy and repeatability of estimated solutions or estimated positions).

Datum Conversion

The precise navigation solution or precise point position solution (e.g., PPP solution) should be always paired with their datum information (e.g., a respective datum offset vector per epoch for a corresponding RTK solution or a corresponding PPP solution) accordingly. In general, a guidance line, or boundary map can be created in navigation mode 1, which uses navigation solution $\vec{R}_{Model}$. Navigation mode 1 of the GNSS receiver may refer to one or more of the following parameters: (1) an RTK or mRTK navigation mode (e.g., which is not time dependent), (2) a PPP mode, precise navigation mode, or PPP-RTK mode, or DGNSS-RTK at the $t_0$ epoch or any later epoch that aligns with the corresponding epoch of solution $\vec{R}_{SF}$ and the datum offset vector, (3) a particular GNSS receiver with GNSS constellation channels, hardware specifications, software limitations, and/or other technical limitations (4) a respective level of (preciseness) of correction service available to the GNSS receiver, (5) access level, processing or reference frame of one or more GNSS satellite constellations that the end user subscribes to, such as GPS, GLONASS, and GALILEO, or others, and (6) applicable reference frame (e.g., ITRF) and epoch. Their datum offset $$\vec{B}_{SF(t_0)}^{Model}$$

information can be computed using Equation 4:

$$\vec{B}_{SF(t_0)}^{Model} = \vec{R}_{Model} - \vec{R}_{SF}(t_0) \quad (4)$$

where $$\vec{B}_{SF(t_0)}^{Model}$$

is the datum offset vector (e.g., temporal PPP datum offset vector between two PPP solutions or between a PPP solution and an RTK solution) in navigation mode 1 with reference to epoch $t_0$, $\vec{R}_{Model}$ is an RTK solution vector (e.g., RTK position relative to an RTK base station or the rover) in the RTK mode (e.g., which is not time dependent); alternately, $\vec{R}_{Model}$ is a PPP solution vector or PPP-RTK solution vector or DGNSS-RTK solution vector, at the $t_0$ epoch or any later epoch that aligns with the corresponding epoch of solution $\vec{R}_{SF}$ and the corresponding epoch of the datum offset vector; $\vec{R}_{SF}(t_0)$ is a PPP solution vector (e.g., PPP position relative to the RTK base station or the rover) in the precise point positioning mode with reference to epoch $t_0$, at the $t_0$ epoch or any later epoch.

In an alternate embodiment, in the above equation $\vec{R}_{SF}(t_0)$ is a PPP-RTK solution vector or DGNSS-RTK solution with reference to epoch $t_0$, at the $t_0$ epoch or any later epoch.

In some embodiments, $\vec{R}_{SF}(t_0)$ may comprise a time-varying PPP solution vector that can change because of the movement (e.g., rotation and vector displacement) of the tectonic plates over time. Meanwhile, if $\vec{R}_{Model}$ represents an RTK solution vector, it can be static over time to the extent that the RTK base station receiver remains fixed on the tectonic plate and merely moves with the tectonic plate over time.

Navigation mode 2 of the GNSS receiver may refer to one or more of the following parameters: (1) an RTK or mRTK navigation mode (e.g., which is not time dependent), (2) PPP mode, precise navigation mode, or PPP-RTK mode, or DGNSS-RTK mode at the to epoch or any later epoch that aligns with the corresponding epoch of solution $\vec{R}^{SF}$ and the datum offset vector, (3) a particular GNSS receiver with GNSS constellation channels, hardware specifications, software limitations, and/or other technical limitations (4) a respective level of (preciseness) of correction service available to the GNSS receiver, (5) access level, processing or reference frame of one or more GNSS satellite constellations that the end user subscribes to, such as GPS, GLONASS, and GALILEO, or others, and (6) applicable reference frame (e.g., ITRF) and epoch. When user changes navigation mode 2, their datum offset $$\vec{B}_{SF(t_0)}^{Mode2}$$

information should be collected with solution $\vec{R}_{Mode2}$ using Equation 5:

$$\vec{B}_{SF(t_0)}^{Mode2} = \vec{R}_{Mode2} - \vec{R}_{SF}(t_0) \quad (5)$$

where $$\vec{B}_{SF(t_0)}^{Mode2}$$

is the datum offset vector (e.g., temporal PPP datum offset vector between two PPP solutions or between an RTK solution and PPP solution) in navigation mode 2 at epoch t with reference to epoch $t_0$, where epoch t is any epoch equal to or following epoch $t_0$; $\vec{R}_{Mode2}$ is an RTK solution vector (e.g., RTK position relative to an RTK base station or the rover) in the RTK mode (e.g., which is not time dependent).

Alternately, in the above equation, $\vec{R}_{Mode2}$ is a PPP solution vector or PPP-RTK solution vector or DGNSS-RTK solution vector, at the $t_0$ epoch or any later epoch that aligns with the corresponding epoch of solution $\vec{R}_{SF}$ and the corresponding epoch of the datum offset vector; $\vec{R}_{SF}(t_0)$ is a PPP solution vector (e.g., PPP position relative to the RTK base station or the rover) in the precise point positioning mode with reference to epoch $t_0$, at the $t_0$ epoch or any later epoch. In an alternate embodiment, $\vec{R}_{SF}(t_0)$ is a PPP-RTK solution vector or DGNSS-RTK solution with reference to epoch $t_0$, at the $t_0$ epoch or any later epoch.

If the datum change is detected between navigation mode 1 and navigation mode 2 by comparison to the reference frame (e.g., ITRF2014), the GNSS receiver, or a data processing system in communication with the GNSS receiver, is triggered or configured to execute a datum conversion. For example, if the stored or collected data offset vectors are substantially equal for the same epochs of the respective RTK data stream or the respective PPP data stream, the stored or collected data offset vectors cancel out and the position solutions are aligned to the same reference frame, which means that a data stream of PPP position solutions or RTK position solutions over an earlier set of epochs and a later set of epochs are substantially aligned or within a suitable tolerance for repeatability (e.g., within a season).

For example, the GNSS receiver, or a data processing system in communication with the GNSS receiver, is configured to apply or execute Equation 6. The converted solution $\vec{R}_{Model}$ incorporates one or more datum offset vectors (e.g., $$\vec{B}_{SF(t_0)}^{Model}, \vec{B}_{SF(t_0)}^{Mode2});$$

hence, the converted solution $\vec{R}_{Model}$ is well-suited to work with, or support an initial guidance line or initial boundary map without guidance line shift or jump in estimated position, attitude (e.g., roll angle, pitch angle, yaw angle or heading) or motion data outputted by the GNSS receiver. Accordingly, the $\vec{R}_{Mode2}$ is a navigation solution vector (e.g., RTK position or PPP relative to an RTK base station or the rover), which is adjusted by subtracting the second mode offset vector, $$\vec{B}_{SF(t_0)}^{Mode2},$$

and adding the first mode offset vector, $$\vec{B}_{SF(t_0)}^{Model},$$

as follows:

$$\vec{R}_{Model} = \vec{R}_{Mode2} - \vec{B}_{SF(t_0)}^{Mode2} + \vec{B}_{SF(t_0)}^{Model} \qquad (6)$$

In general, four use scenarios or use cases for the GNSS receiver are considered for the data conversion, by applying datum offset vectors, where Long-Term Repeatability (LTR) is applicable. The scenarios include one or more of the following: (a) RTK switch to PPP-RTK or PPP (e.g., StarFire™ PPP mode or Starfire™ PPP-RTK mode), (b) PPP-RTK or PPP switch to RTK, (c) RTK change base site or coordinate, and (d) SF-RTK either datum or reference epoch time is changed, respectively.

Use Case 1: RTK Rover Switches to PPP, PPP-RTK, or DGNSS-RTK

In one example, the guidance line, boundary map was created using RTK solution of proprietary RTK rover receiver, alone or together with a proprietary RTK base station receiver or a third-party RTK base station receiver. The datum offset $$\vec{B}_{SF(t_0)}^{RTK},$$

information can be computed using Equation 7 as follows:

$$\vec{B}_{SF(t_0)}^{RTK} = \vec{R}_{RTK} - \vec{R}_{SF}(t_0) \qquad (7)$$

where $$\vec{B}_{SF(t_0)}^{RTK},$$

is a datum offset vector between: (a) an RTK solution and (b) a PPP solution, PPP-RTK solution or DGNSS-RTK solution, where the RTK solution comprises any of the following: a first solution or specialized solution determined by a proprietary RTK GNSS receiver (e.g., StarFire™ GNSS rover receiver or GNSS base station receiver); where the second solution, such as a PPP solution, PPP-RTK, or DGNSS-RTK solution is determined by proprietary GNSS receiver (e.g., StarFire™ GNSS rover receiver or GNSS base station receiver);

$\vec{R}_{RTK}$ is a first solution, such as an RTK mode or mRTK mode (e.g., for a given RTK base station with fixed coordinates or specified coordinate set, or rover);

$\vec{R}_{SF}(t_0)$ is a proprietary PPP or PPP-RTK solution (e.g., StarFire™-RTK solution), or DGNSS-RTK solution by a proprietary GNSS receiver operating in a PPP, PPP-RTK mode, or DGNSS-RTK mode (e.g., having long-term repeatability feature on, for example, referring to ITRF2014, epoch $t_0$ Jan. 1, 2018).

In one embodiment, a proprietary base station RTK GNSS receiver can optionally estimate the first solution and an associated datum offset vector for each successive epoch, which is incorporated into a correction signal that is transmitted, via a wireless communications link, to the rover RTK GNSS receiver. However, in an alternate embodiment, the proprietary base station RTK GNSS receiver is replaced by a third-party manufactured GNSS receiver which provides a correction signal in a standard format (e.g., RTCM), via a wireless communications link to the rover RTK GNSS receiver, such that the rover GNSS receiver needs to estimate the first solution and an associated datum offset vector for each successive epoch.

The term mRTK refers to mobile real-time kinematic positioning in which a rover or mobile receiver receives correction data (e.g., differential carrier phase-based correction data) from a fixed reference receiver via a packet switched network, like the Internet, in conjunction with a wireless communications network (e.g., cellular, Group Special Mobile (GSM), time-division multiple access (TDMA), code division multiple access (CDMA) network). Throughout this document, solution comprises an estimated position, attitude or motion of the GNSS receiver or its antenna.

The datum offset $$\vec{B}_{SF(t_0)}^{RTK},$$

can be smoothed to improve reliability and accuracy over time if base station site and their coordinate values do not change. The datum offset can be computed at, in, or by either base station GNSS receiver or a rover GNSS receiver. The user-inputted, self-surveyed or input coordinate can be replaced current, proprietary RTK solution in RTK base station to compute the datum offset. Because signal quality from base station GNSS receiver could be better and coordinates of the base station GNSS receiver are fixed, the quality of datum offset tends to be, or can be, better for the RTK base station GNSS receiver than for a datum offset computed from RTK rover GNSS receiver. In certain configurations, a proprietary RTK base station (e.g., as opposed to third-party-manufactured RTK base station) is configured to transmit or broadcast such datum offset vector (or a series of datum offset vectors for each epoch corresponding to a respective RTK solution for the same epoch or a PPP solution for the same epoch) from an RTK base station along with RTK correction data (e.g., RTCM correction messages in correction signal) to the rover receiver. However, RTK corrections from mobile RTK or third-party-manufactured base station (e.g., without compatible technical standards or interoperability), the datum offset might only be available for computation from mobile GNSS receiver or rover receiver.

In certain embodiments, if or when guidance lines and/or boundary maps was created, the GNSS receiver, or an electronic data processing system in communication with the GNSS receiver, is configured to collect datum offset vectors or information (e.g., as illustrated in Equations 4 and/or 5) to be stored together with guidance lines and boundary maps. If a GNSS receiver changes navigation mode from: (a) a RTK mode (e.g., from a proprietary RTK mode, StarFire™RTK mode) to (b) a PPP mode, PPP-RTK navigation mode, or DGNSS-RTK mode, a datum offset vector is generally required for accurate positioning. In the proprietary PPP, PPP-RTK mode (e.g., StarFire™RTK mode), or DGNSS-RTK mode the proprietary GNSS receiver, or in the associated electronic data processing system, is configured to apply the datum offset (vector) collected before (e.g., during prior operation of the proprietary GNSS receiver in the RTK mode) to convert an RTK solution or RTK-like solution using Equation 8. The converted solution is well-suited to work properly with old guidance line or boundary map (e.g., collected in RTK mode) without guidance line shift or jump in estimated position, attitude or motion data outputted by the GNSS receiver. It should be noted that the datum offset should be zero for $\vec{R}_{SF(t_0)}$, which may comprise any of the following: a PPP solution (vector), the PPP-RTK solution (vector), or the DGNSS-RTK solution (vector). Equation 8 is as follows:

$$\vec{R}_{RTK} = \vec{B}_{SF(t_0)}^{RTK} + \vec{R}_{SF}(t_0) \quad (8)$$

where, $$\vec{B}_{SF(t_0)}^{RTK}$$

is the datum offset vector between the RTK solution and the PPP where, solution, PPP-RTK solution, or DGNSS solution at epoch $t_0$; $\vec{R}_{RTK}$ is a first RTK vector solution (e.g., proprietary RTK solution determined by the proprietary GNSS receiver, or StarFire™ GNSS receiver in the RTK mode); $\vec{R}_{SF}(t_0)$ is the PPP solution, PPP-RTK solution, or DGNSS solution determined by the proprietary GNSS receiver.

$\vec{R}_{RTK}$ can be determined with reference to the RTK base station GNSS receiver or the rover GNSS receiver. The conversion between the RTK mode (e.g., generic RTK mode or proprietary RTK mode) to proprietary PPP mode, PPP-RTK mode, or DGNSS-RTK mode can be done seamlessly. Here, an illustrative procedure and steps for the first use of case RTK rover switches from a first mode or RTK mode (e.g., generic RTK mode or proprietary RTK mode) to the second mode, such as a PPP mode, PPP-RTK mode (e.g., StarFire™PPP mode or PPP-RTK mode, determined by a proprietary RTK GNSS receiver), or DGNSS-RTK mode.

In one embodiment, the electronic data processing system 535 may comprise a user interface, such as an electronic display, a touchscreen display, a keypad, a keyboard, switches, a pointing device (e.g., electronic mouse), or other input/output devices; further, the electronic data processing system 535 is capable of communicating with a central server 518 or cloud service via a wireless communications network 135, which in turn, is coupled to a packet switched network 139 or the Internet. The electronic data processing system 535 that comprises the user interface and the central server 518 or cloud service may be referred to as (Display/Operations Center System or D/OSC).

Figure 15:
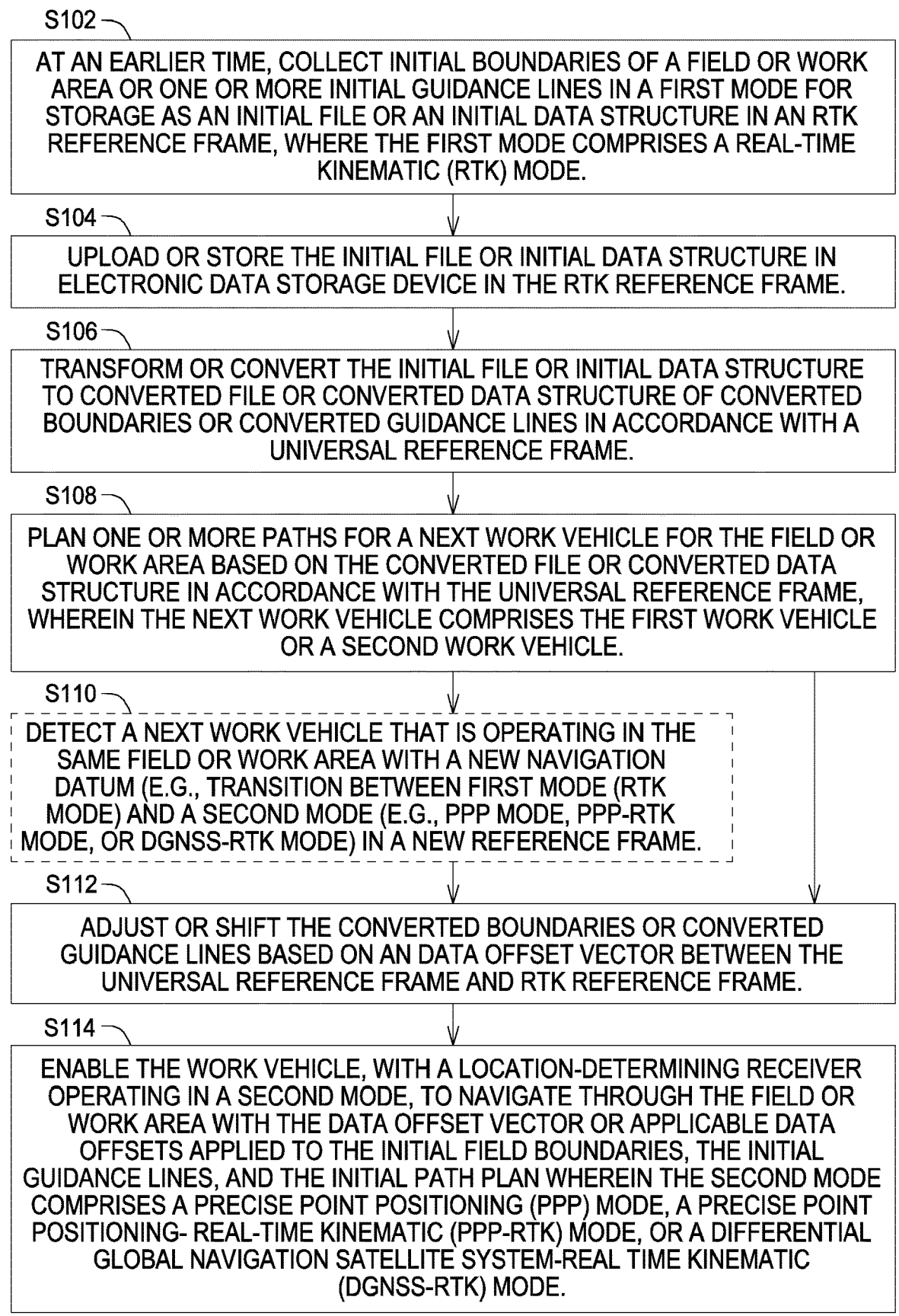
FIG. 15 is a flow chart of one embodiment of a method of datum conversion between receiver navigation modes for guidance planning, such as one or more mobile GNSS receivers that are initially operated in an RTK mode and that switch to or later operate in a PPP, PPP-RTK or DGNSS-RTK mode.

FIG. 15 discloses a flow chart for one embodiment of a method of datum conversion between receiver navigation modes for guidance planning, such as one or more GNSS receivers 512 that are initially operated in an RTK mode and that switch to or later operate in a PPP, PPP-RTK or DGNSS-RTK mode. For example, an end user may replace or upgrade a (first) GNSS receiver, which operates in an RTK or a mobile RTK (mRTK) mode, with a new (second) GNSS receiver, which operates in a PPP, PPP-RTK or DGNSS-RTK mode for the same field or work site (e.g., albeit at a later measurement time or epoch of the GNSS receiver). The new or second GNSS receiver is able to use or leverage the guidance lines and boundaries that the first GNSS receiver collected in the RTK mode or mRTK mode and stored in a suitable data storage device 525, even if the second receiver later operates in the PPP, PPP-RTK or DGNSS-RTK mode. The method begins in step S102 of FIG. 15.

In step S102, at an earlier time or first time, the rover or mobile location-determining receiver (e.g., generic GNSS receiver or first GNSS receiver) is configured to collect one or more of the following in a first mode: (a) initial boundaries of field (or work area), (b) one or more initial guidance lines (e.g. A-B guidance lines, (c) reference contour guidance lines, or other guidance lines for point-to-point movement of a work vehicle or field coverage of a work vehicle) for storage in an electronic file or other data structure. The first mode refers to a real-time kinematic (RTK) mode, such as a generic RTK mode, a proprietary RTK mode, or a mobile RTK mode, in which one or more local reference location-determining receivers (e.g., RTK base stations) provide a correctional signal (e.g., differential correction signal) to a rover or mobile location-determining receiver in the field or work area.

In this document, guidance lines shall include one or more off the following: linear segments, curved segments, contours, spirals, waypoints or other points incepting guidance lines, or other geometric representations of a path of a work vehicle, its implement or both. Typically, the longitudinal centerline, a center point or reference point of the vehicle, or its implement is aligned (e.g., by automated steering system (such as electrohydraulic steering system or electrically driven steering system) responsive to the guidance system, path plan and location-determining receiver) to travel directly above the guidance lines of a planned path or path plan of a vehicle, which can be tracked with coordinates provided by a location-determining receiver, such as a GNSS receiver. For example, the initial guidance lines or guidance lines may be used as a reference for an initial pass or path of the work vehicle, or its implements, and for a path plan to cover an area of a field or work site with additional or later passes or paths of the work vehicle that track a parallel guidance line that is offset by an amount proportional to the implement width of an implement or the vehicle width of the work vehicle.

In step S104, the initial file or other initial electronic data structure, which was collected in the first mode (e.g., RTK mode), is uploaded, stored, imported or entered into an electronic data processing system (e.g., 535) that is coupled to or in communication with the rover or mobile location-determining receiver (e.g., GNSS receiver 512 which can operate in an RTK mode, a proprietary RTK mode, or an mRTK mode). For example, the rover or mobile location-determining receiver (e.g., GNSS receiver 512): (a) determines and provides RTK-related data for the initial guidance lines, initial boundaries and other features that is placed or stored in the initial file or initial data structure, and (b) the data processing system (e.g., 535) coupled to the GNSS receiver (e.g., 512) records or stores the provided RTK data, such as the initial file or initial data structure, for the initial guidance lines, initial boundaries and other features in a data storage device 525 of the data processing system 535, or in the data storage device 525 at central server 518, or on the cloud (e.g., via wireless communications to the Internet or another available communications network).

In step S106, the rover or mobile location-determining receiver, alone or together with the electronic data processing system (e.g., 535, D/OC, Display/Ops Center System), transforms or converts the initial file or initial data structure to a converted file or converted data structure of converted boundaries or converted guidance lines in accordance with a universal reference frame; where the universal reference frame means an International Terrestrial Reference Frame (ITRF) or comparable standard reference frame with a corresponding date and corresponding epoch. Step S106 may be conducted in accordance with various techniques, which may be applied separately or cumulatively as follows.

Under a first technique, the location-determining receiver (e.g., GNSS receiver 512), the reference frame offset module 534, or the reference frame converter/transformer 513 is configured to transform, convert or process the initial boundaries, one or more initial guidance lines (of the initial file or initial data structure), or both, created in first mode (e.g., RTK mode, such as a generic or proprietary RTK mode) by applying datum conversion information to the universal reference frame associated with the PPP mode, PPP-RTK mode, a DGNSS mode, or DGNSS-RTK mode (e.g., or possibly the DGNSS mode in an alternate embodiment that meets certain target specifications for estimated position accuracy and repeatability of estimated positions).

Under a second technique for executing step S106, the GNSS receiver 512, the reference frame offset module 534 or the reference frame converter/transformer 513 is configured to determine and provide datum conversion information (e.g., one or more datum offset vectors, such as one datum offset vector per epoch that is associated with a corresponding RTK data solution (e.g., position in two or three dimensions, over the same epoch) with respect to, or with reference to the recorded RTK data in the RTK mode (e.g., generic RTK mode, proprietary RTK mode, or mobile RTK mode (mRTK)) with respect to a reference frame and its corresponding date and corresponding epoch (e.g., PPP datum ITRF 2014 and epoch Jan. 1, 2018).

Under a third technique for executing step S106, in one embodiment, the data processing system (e.g., 535) coupled to the GNSS receiver 512 records or stores: (a) the provided datum conversion information (for, or along with, or in conjunction with, the initial guidance lines, initial boundaries and other features in a local data storage device 525, or in a remote data storage device at the central server 518, or in the cloud, or in a distributed manner in multiple data storage devices, and/or (b) the converted guidance lines, converted boundaries or converted other features in the universal reference frame.

Under a fourth technique, the location-determining receiver 512 or the data processor 535 is configured to determine a first datum offset based on a difference in the first position in the first mode (e.g., RTK mode) and a corresponding universal position for or in the universal reference frame. For example, in step S106 based on one or more datum offset vectors, the electronic data processor 50 or data processing system 535 (e.g., D/OCS) is configured to convert the initial boundaries and one or more initial guidance lines created in RTK mode (e.g., generic or proprietary RTK mode) and datum conversion information to PPP, PPP-RTK, DGNSS, or DGNSS-RTK datum, such as converted boundaries and one or more converted guidance lines that are compatible with the GNSS receiver 512 operating in the PPP mode, PPP-RTK mode, DGNSS mode, and DGNSS-RTK mode.

The location-determining receiver 512 or the electronic data processing system 535 determines the converted boundaries and converted guidance lines in a converted file or other electronic data structure. Further, the electronic data processing system 535 may transmit or store the converted file (e.g., in the data storage device 525) for later reference the electronic data processing system for later operations in the same field, work area or geographic zone, as indicated by the GNSS receiver.

In an alternate configuration, the datum offset vector comprises an additional RTK receiver datum offset vector between a third-party manufactured GNSS receiver (e.g., 512) in RTK mode (e.g., generic RTK mode) and a proprietary GNSS receiver (e.g., 512) in RTK mode (e.g., proprietary RTK mode), where this datum offset vector is licensed or provided by subscription service from the third-party manufacturer (or an authorized party) or as part of a standard format of a data correction service.

In step S108, for the field or work area, the electronic data processor 530, the data processing system 535, or D/OCS plans one or more paths for next work vehicle (e.g., machine) that is equipped with the rover or mobile location-determining receiver (e.g., GNSS receiver 512 or a proprietary GNSS receiver) based on the converted file or its converted files, the converted boundaries, among other possible parameters, such as machine width, implement width, wheelbase, minimum turning radius, wheel or track configuration, and row width spacing for plant rows, technical specifications (individually and collectively "machine parameters and/or implement parameters"). For example, an electronic data processor 530, electronic data processing system 535, or path planner (associated with the electronic data processing system 535 or vehicle electronics) may reference any of the following: (a) the converted boundaries (e.g., in converted file or converted data structure), (b) the converted guidance lines (e.g., in converted file or converted data structure), and/or (c) the datum conversion information (e.g., one or more datum offset vectors associated with a corresponding epoch) to convert initial guidance lines and other guidance lines (e.g., segments or sections) of the paths from an RTK datum/data, which is compatible to the RTK mode of the mobile location-determining receiver (e.g., GNSS receiver 512), to the PPP, PPP-RTK, or DGNSS-RTK datum/data (e.g., referenced to the universal reference frame), which is compatible to a second mode, such as the PPP, PPP-RTK, DGNSS, or DGNSS-RTK mode of the location-determining receiver (e.g., GNSS receiver 512).

The data processing system 535 can store the planned paths (e.g., converted path plans in the data storage device 525 or elsewhere) for future reference or retrieval, such as retrieval by the next work vehicle via a wireless communications network and Internet network 139 to the cloud or central server 518. The next work vehicle comprises the first work vehicle or the second work vehicle, where at an earlier time or at a first time, the first work vehicle collected initial boundaries or a filed or work area or one or more initial guidance lines in step S102. Further, the second work vehicle comprises the first work vehicle or another work vehicle that is configured to receive, access and apply the planned paths of step S108 to guide the second work vehicle.

In optional step S110, the data processing system 535 or the D/OCS is configured to detect a next machine or work vehicle (e.g., second work vehicle) that is operating in the same field or work area with a new navigation datum (e.g., transition or switch between first mode (RTK mode) and a second mode (PPP mode or PPP-RTK mode) of the rover or mobile location-determining receiver, such as GNSS receiver 512 or its replacement, substitute, or proxy) or in a new reference frame (e.g., ITRF 2014, or ITRF2020, or any later ITRF version). For example, at a later time after the earlier time the data processing system 535 or D/OCS is configured to detect the next machine operating in the same work area or field at the later time by comparison of: one or more then-current navigation solutions (e.g., of a present observed data stream of positions for a guidance line) to a known reference frame (e.g., ITRF2014) (of a reference data stream of stored positions for the same guidance line from the data storage device 525) per the equations discussed in the disclosure. Further, alone or together with the above comparison, if the stored or collected data offset vectors, $$\vec{B}^{RTK}_{SF(t_0)},$$

are substantially equal for the present observed PPP data stream and the same epochs (e.g., year and epochs) of reference PPP data stream referenced to the reference frame (e.g., ITRF2014), then the stored or previously collected data offset vectors from the earlier time cancel out with the then-current observed data offset vectors for the later time; hence, the position solutions are aligned to the same reference frame, which means that a data stream of PPP position solutions or RTK position solutions (e.g., for the same guidance line, such as an A-B linear segment or curved guidance line) over an earlier set of (seasonal) epochs and a later set of (seasonal) epochs are substantially aligned (e.g. by a known data offset vector, such as, $$\vec{B}^{RTK}_{SF(t_0)})$$

or within a suitable tolerance for repeatability (e.g., within a season or between the earlier time and a later time that may even go beyond a season or growing season). Accordingly, if the next machine were configured with the same or substantially similar GNSS receiver (e.g., a replacement GNSS receiver, a substitute GNSS receiver, a proxy GNSS receiver of the same or different model of the receiver manufacturer or possibly with a different brand of receiver manufacturer, with the same or substantially similar correction service), the electronic data processing system 535 can detect a transition between different navigation modes such as a transition between RTK mode and PPP mode or PPP-RTK mode, where the detection reviews the recorded RTK data and associated datum offset vector (for each corresponding epoch of the RTK data and associated datum offset vector, possibly over a series of epochs) for the same field or work area.

In some embodiments, the detection of the new navigation datum may require normalization of or an accounting for, or manual commissioning/installation entries for: (a) any changes (e.g., ancillary changes) in or to GNSS receiver specifications (e.g., differences in hardware, antenna, software processing version, user-definable receiver settings, receiver brands, correction service, compatible data standards, or other configurations), or (b) any different machine parameters (e.g., minimum turning radius constraints of the vehicle or its implement, vehicle width constraints, and/or implement width constraints on path plans or tracking previous guidance lines or keeping vehicle or implement confined within previous field boundaries), where the initial guidance lines of the vehicle require further adjustment than mere application of the datum offset vectors for possible tracking or proper tracking and coverage of a field per a path plan.

In optional step S110, cumulatively with the detection process, the electronic data processor may optionally further detect whether the conversion from RTK to PPP, PPP-RTK or DGNSS-RTK has been completed for all guidance lines and boundaries required for the complete path plan and complete any further guidance lines and boundaries to the PPP, PPP-RTK or DGNSS-RTK reference frame that are required.

In step S112, to the extent applicable on the next machine and the new or different datum, new or different reference frame, and new or different machine parameters and/or implement parameters are detected by the electronic data processing system 535 or the datum reference manager 532, the D/OCS: (a) automatically adjusts or shifts the converted boundaries or converted guidance lines, from the universal reference frame (e.g., ITRF2008 or ITRF2014 or the universal reference frame of step S106) with a first corresponding date and corresponding epoch to a revised universal reference frame (e.g., ITRF2020) with a second corresponding date and epoch, (b) automatically adjusts or shifts the converted boundaries or converted guidance lines in the universal reference frame based on a data offset vector between the universal reference frame and an RTK reference frame of the rover or mobile location-determining receiver operating in the first mode at a later time following the earlier time. Here, for above item b at the later time that follows the earlier time, the guidance lines, curves, and boundaries from a later-time RTK solution (e.g., generic RTK solution or proprietary RTK solution) may not align with the earlier-time RTK solution; hence, in the second mode an additional datum offset between the earlier-time RTK datum and the later-time RTK datum is incorporated into the universal reference frame. The second mode refers to the PPP solution, PPP-RTK solution, DGNSS solution, or DGNSS-RTK solution based on application of one or more datum offsets set forth the accompanying equations. Further, in the second mode, the data processing system 535 is configured to retrieve or accesses the converted file or its converted files, the converted boundaries, or converted path plan, which is usually expressed in the universal reference frame, for any modification for datum offset and for guidance of the next machine or work vehicle.

In step S114, the data processing system 535 or the D/OCS enables machine or work vehicle, equipped with a rover or mobile location-determining receiver (e.g., proprietary GNSS receiver 512) operating in the second mode (e.g., proprietary PPP mode, PPP-RTK mode, DGNSS mode or DGNSS-RTK mode) to accurately navigate through field by reference to any of the following: (a) converted field boundaries, converted guidance lines and converted path plans and/or (b) a data offset vector between the universal reference frame an and an RTK reference frame, or one or more other applicable data offsets applied to the initial field boundaries, the initial guidance lines and the initial path plan. Further, in some embodiments, the converted field boundaries, converted guidance lines and converted path plans for navigation in the PPP mode, PPP-RTK mode, or DGNSS-RTK mode are based on available original, RTK data (e.g., generic RTK data or proprietary RTK data) with the one or more applicable data offsets applied to initial field boundaries, the initial guidance lines, and any initial path plan of a vehicle based on the initial field boundaries, the initial guidance lines and any initial path.

Use Case 2: SF-RTK Rover Switches to RTK

In one example a preliminary guidance line, or preliminary boundary map was created using a proprietary precise point position (PPP) solution or PPP-RTK solution (e.g., StarFire™ PPP-RTK solution), provided by a proprietary GNSS receiver operating in the proprietary PPP mode, the PPP-RTK mode, the DGNSS mode or the DGNSS-RTK mode (e.g., in second mode). For example, in the PPP-RTK mode, the GNSS receiver may switch between the PPP mode and the RTK mode, based upon one or more of the following: (a) availability, (b) reliability, and (c) target precision of the PPP modes and/or RTK modes, among other hand-off factors. In the PPP-RTK mode, or in the PPP mode, the RTK estimator 122 and the PPP estimator 120 can sometimes be run in parallel and simultaneously by a rover or mobile receiver.

The datum offset $$\vec{B}^{SF}_{SF(t_0)}$$

information can be computed in Equation 9 as follows:

$$\vec{B}^{SF}_{SF(t_0)} = \vec{v} \cdot (t_0 - t_0) = 0, \qquad (9)$$

where $$\vec{B}^{SF}_{SF(t_0)}$$

is the datum offset vector between a pair of proprietary PPP solutions or a pair of PPP-RTK solutions during the same epoch. Here, it is assumed the same default proprietary datum (e.g., StarFire™ PPP datum or StarFire™ PPP-RTK datum) and default epoch time ($t_0$) are used for solutions estimated by the GNSS receiver on different frequency bands (e.g., L1 and L2), or simultaneously by a rover GNSS receiver and reference GNSS receiver.

Because the proprietary offset datum (e.g., StarFire™ PPP datum or PPP-RTK datum) and epoch time remain the same or are substantially equal, the above datum offset will be constant as zero. If the user or work vehicle controller changes navigation mode, for example, switch to a generic RTK solution, both the generic RTK solution and new datum offset, which is computed using Equation 8, should be collected. The Equation 10 can be used to convert generic RTK back to PPP or PPP-RTK-like solution (e.g., StarFire™ PPP datum or PPP-RTK solution). The converted generic RTK solution should work well with an offset datum with respect to the old, preliminary guidance line or preliminary boundary map from SF-RTK PP or PPP-RTK-like solution (e.g., StarFire™ PPP datum or PPP-RTK solution) without line shift or jump in estimated position, attitude or motion data of the GNSS receiver in accordance with the following Equation 10:

$$\vec{R}_{SF}(t_0) = \vec{R}_{RTK} - \vec{B}^{RTK}_{SF(t_0)} \qquad (10)$$

Figure 16:
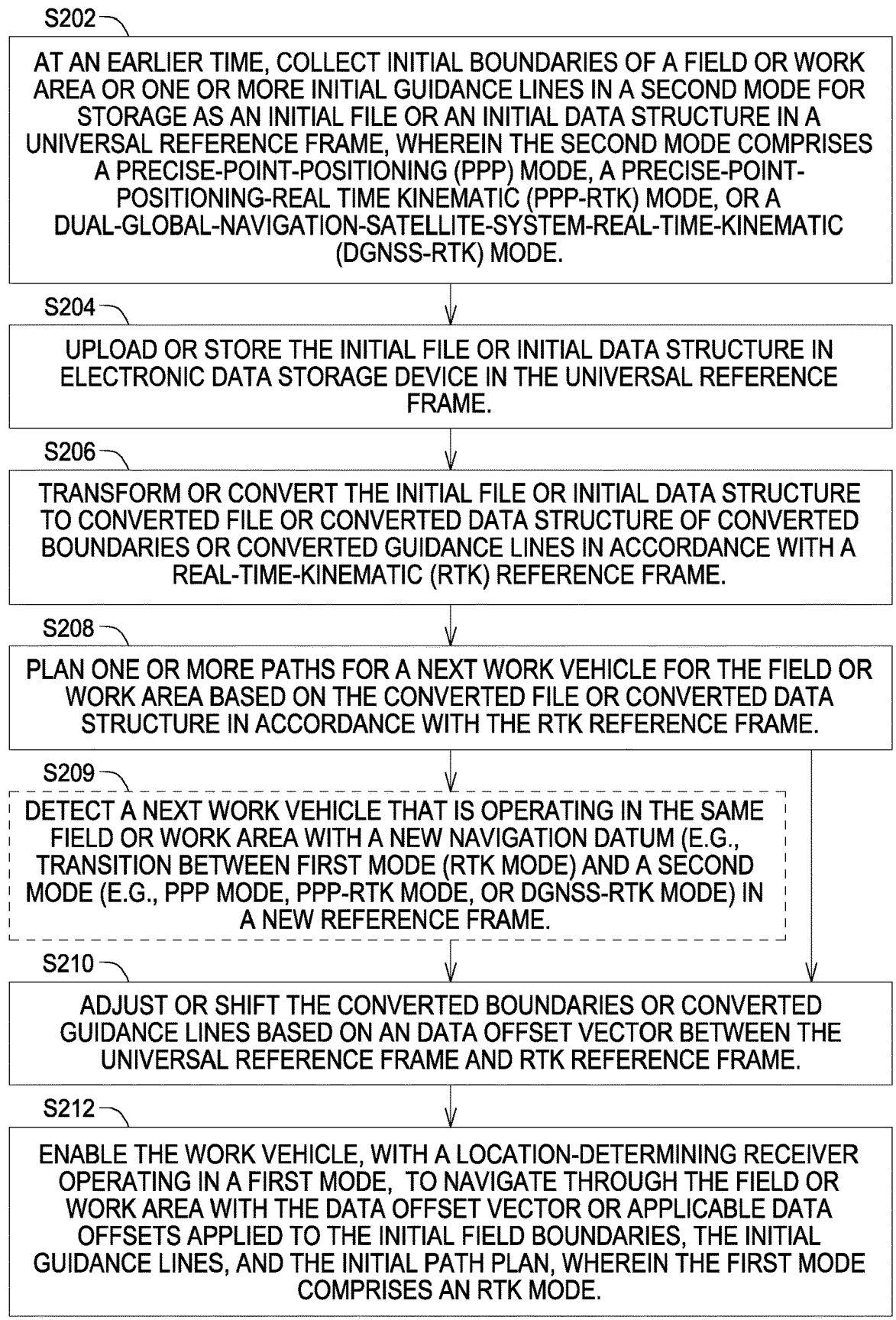
FIG. 16 discloses flow chart of one embodiment of a method for of a mobile or rover GNSS receiver that switches from PPP, PPP-RTK or DGNSS-RTK mode to an RTK mode.

FIG. 16 discloses flow chart of one embodiment of a method (e.g., for the second use case) of a rover GNSS receiver (e.g., 512) that switches from PPP, PPP-RTK or DGNSS-RTK mode to an RTK mode. The method of FIG. 16 begins in step S202.

In step S202, at an earlier time or first time, the rover or mobile location-determining receiver 512 (e.g., generic GNSS receiver) is configured to collect in a second mode one or more of the following: initial boundaries of a field (or work area), and/or one or more initial guidance lines of the field or work area (e.g., for storage in an initial file, an initial data structure, an electronic file, or other data structure). Further, the second mode (e.g., SF-RTK) comprises a PPP mode, a PPP-RTK mode or a DGNSS-RTK mode (or in alternate embodiments, possibly a DGNSS mode that meets target specifications for accuracy of position estimates and repeatability of position estimates).

In this document, guidance lines shall include one or more off the following: linear segments, curved segments, contours, spirals, waypoints or other points incepting guidance lines, or other geometric representations of a path of a work vehicle, its implement or both. For example, as used in this document, guidance lines may comprise A-B guidance lines (e.g., from point A to point B defined by two or three dimensional coordinates), or reference contour guidance lines, or other guidance lines for point-to-point movement of a work vehicle or field coverage of a work vehicle).

Typically, the longitudinal centerline, a center point, or reference point of the vehicle, or its implement is aligned (e.g., by automated steering system (such as electrohydraulic steering system or electrically driven steering system) responsive to the guidance system, path plan and location-determining receiver (e.g., GNSS receiver 512) to travel directly above the guidance lines of a planned path or path plan of a vehicle, which can be tracked with coordinates provided by a location-determining receiver, such as a GNSS receiver 512. For example, the initial guidance lines or guidance lines may be uses a reference for an initial pass or path of the work vehicle, or its implements, and for a path plan to cover an area of a field or work site with additional or later passes or paths of the work vehicle that track a parallel guidance line that is offset by an amount proportional to the implement width of an implement or the vehicle width of the work vehicle.

In step S204, the initial file, initial data structure, or other electronic data structure, which was collected in the second mode and which is consistent with the universal reference frame (e.g., ITRF defined by a corresponding date and a corresponding epoch), is uploaded, stored, imported, entered in a data storage device 525 of electronic data processing system 535 that is coupled to or in communication with a GNSS receiver 512 or in a data storage device 545 associated with the central server 518, or in the cloud, or in any combination of the foregoing data storage resources. The second mode may comprise any of the following: a PPP mode, a PPP-RTK mode, or a DGNSS-RTK mode (or in alternate embodiments, possibly a DGNSS mode that meets target specifications for accuracy of position estimates and repeatability of position estimates. For example, in step S204: (a) the mobile location determining receiver, such as a (proprietary) GNSS receiver 512, determines and provides PPP data, PPP-RTK data, or DGNSS-RTK data (e.g., PPP, PPP-RTK or DGNSS-RTK solutions of position, attitude, or motion) for the initial guidance lines, initial boundaries and other features in the universal reference frame; (b) the data processing system 535, which is coupled to the GNSS receiver 512, records or stores the provided PPP data, PPP-RTK data, or DGNSS-RTK data in the universal reference frame for the initial guidance lines, initial boundaries and other features in data storage locally in the data storage device 525 (e.g., by the electronic data processing system 535), on the data storage device 545 at central server 518, or on the cloud, (c) the GNSS receiver 512 determines and provides accompanying datum conversion information (e.g., one or more datum offset vectors, or an offset datum stream of datum offset vectors in real time), such as one datum offset vector per epoch from the universal reference frame to the RTK reference frame.

In one embodiment, each datum offset datum or data offset vector is associated with corresponding PPP data, PPP-RTK data, or DGNSS-RTK data solution in the universal reference frame with corresponding date and epoch with respect to, or with reference to the recorded data in the RTK reference frame. The GNSS receiver 512 comprises: (1) a PPP estimator 120 that is configured to determine PPP data in a first mode, such as a PPP mode, a PPP-RTK mode or DGNSS-RTK mode and (2) an RTK estimator 122 that is configured to determine GNSS-RTK data in a second mode, such as an RTK mode or mobile RTK (mRTK) mode; (2) a PPP estimator 120 and a an RTK estimator 122 that operate simultaneously in the first mode and the second mode simultaneously, with respect to a reference frame (e.g., PPP, PPP-RTK, DGNSS-RTK datum ITRF 2014 and epoch Jan. 1, 2018). The data processing system 535 coupled to the GNSS receiver 512 records or stores the provided datum conversion information for, or along with, or in conjunction with, the initial guidance lines, initial boundaries and other features in data storage locally, in the cloud or at central server 518.

In step S206, based on the uploaded and stored initial file or initial data structure, alone, or together with one or more datum offset vectors, the electronic data processing system 535 (e.g., D/OCS) is configured to transform or convert the initial boundaries and/or one or more initial guidance lines, which are created in the second mode (e.g., PPP mode, PPP-RTK mode or DGNSS-RTK mode), to RTK data, such as converted boundaries and one or more converted guidance lines that are compatible with the proprietary GNSS receiver operating in the first mode (e.g., RTK mode or mobile RTK mode consistent with an RTK reference frame). The datum offset or data offset vectors can be stored as conversion information that are recorded or stored in step S204, for example.

For example, in step S206 the electronic data processing system 535 determines the converted boundaries and converted guidance lines in a converted file or other electronic data structure in accordance with a real-time kinematic (RTK) reference frame. Further, the electronic data processing system 535 may transmit or store the converted file (e.g., in data storage device 525) for later reference the electronic data processing system 535 for later operations in the same field, work area or geographic zone, as indicated by the GNSS receiver 512.

In an alternate configuration (e.g., in step S206), the datum offset vector comprises an additional RTK receiver datum offset vector between a third-party-manufactured GNSS receiver (e.g., by a second manufacturer) in an RTK mode (e.g., generic RTK mode) and a proprietary (e.g., by a first manufacturer) GNSS receiver in an RTK mode (e.g., proprietary RTK mode), where this datum offset vector is licensed or provided by subscription service from the third-party manufacturer (or an authorized party) or as part of a standard format of a data correction service (e.g., for a mixed network of GNSS receivers made by different manufacturers).

In step S208, the central server 518 or data processing system 535 (individually or collectively data operations center system (D/OCS)) plans one or more paths for next work vehicle (e.g., machine) that is equipped with the GNSS receiver 512 based on the converted file or converted data structure in accordance with the RTK reference frame. Throughout this document, the next work vehicle may comprise the first work vehicle or same work vehicle that collected initial boundaries of a field or work area or one or more initial guidance lines (e.g., in step S202). Alternately, the next work vehicle may be a second vehicle that is different than the first work vehicle that collected initial boundaries of a field or work area or one or more initial guidance lines (e.g., in step S202).

In one embodiment, the path plans may consider or depend on the converted boundaries of the field or work area, among other possible parameters, such as machine width, implement width, wheelbase, minimum turning radius, wheel or track configuration, and row width spacing for plant rows, technical specifications (individually and collectively "machine parameters and/or implement parameters"). For example, an electronic data processor 530, electronic data processing system 535 or path planner (e.g., a software module within the data storage device 525) may reference the datum conversion information (e.g., one or more datum offset vectors) to convert initial guidance lines and other guidance lines (e.g., segments or sections) of the paths from the PPP, PPP-RTK, or DGNSS-RTK datum/data (e.g., in a universal reference frame) to an RTK datum/data (e.g., in an RTK reference frame), which is compatible to the RTK mode of the GNSS receiver 512. The data processing system 535 can store the planned paths (e.g., converted path plans) for future reference or retrieval, such as retrieval by the next work vehicle via a wireless communications device 517 that operates over a wireless communications system 135; where the wireless communication system 135 is configured to communicate the planned paths or other data messages via the communications network 139 (e.g., Internet network) to and from the cloud or central server 518.

In optional step S209, the D/OCS is configured to detect a next machine or work vehicle that is operating in the same field or work area with a new navigation datum (e.g., transition or switch between the second mode (PPP mode or PPP-RTK mode) and first mode (RTK mode)) or in a new reference frame (e.g., ITRF version) by comparison of the navigation solutions to a known reference frame (e.g., ITRF2014, or ITRF2020, or any later ITRF version) per the equations discussed in the disclosure. For example, if the stored or collected data offset vectors, $$\vec{B}_{SF(t_0)}^{RTK},$$

are substantially equal for the observed PPP data stream and the same epochs of reference PPP data stream referenced to the reference frame (e.g., ITRF2014), then the stored or collected data offset vectors cancel out and the position solutions are aligned to the same reference frame, which means that a data stream of PPP position solutions or RTK position solutions over an earlier set of (seasonal) epochs and a later set of (seasonal) epochs are substantially aligned (e.g. by a known data offset vector, such as, $$\vec{B}_{SF(t_0)}^{RTK})$$

or within a suitable tolerance for repeatability (e.g., within a season). Accordingly, if the next machine were configured with the same or substantially similar GNSS receiver 512 (e.g., with the same or substantially similar correction service), the electronic data processing system 535 or datum reference manager 532 can detect a transition between different navigation modes such as a transition between: (a) PPP mode or PPP-RTK mode or DGNSS-RTK mode and (b) RTK mode (e.g., RTK or mRTK mode), where the detection reviews the recorded PPP, PPP-RTK, or DGNSS-RTK data and associated data/datum offset vector (for each corresponding epoch of the RTK data and associated datum offset vector, possibly over a series of epochs) for the same field or work area.

In some embodiments, the detection of the new navigation datum may require normalization of or an accounting for, or manual commissioning/installation entries for: (a) any changes (e.g., ancillary changes) in or to GNSS receiver specifications (e.g., differences in hardware, antenna, software processing version, user-definable receiver settings, receiver brands, correction service, compatible data standards, or other configurations), or (b) any different machine parameters between the first vehicle and the next vehicle (e.g., minimum turning radius constraints of the vehicle or its implement, vehicle width constraints, and/or implement width constraints on path plans or tracking previous guidance lines or keeping vehicle or implement confined within previous field boundaries), where the initial guidance lines of the vehicle require further adjustment than mere application of the datum offset vectors for possible tracking or proper tracking and coverage of a field per a path plan.

In step S209, cumulatively with or separately from the detection process, the electronic data processor may optionally detect whether the conversion from PPP, PPP-RTK or DGNSS-RTK to RTK has been completed for all guidance lines and boundaries required for the complete path plan and complete any further versions to the RTK reference frame that are required.

In step S210, to the extent applicable and detected by, or inputted into a user interface of, the electronic data processing system 535: (a) on the next machine (e.g., for new or different machine parameters and/or for implement parameters), and/or (b) for a GNSS receiver 512 that has different hardware, software, or is operating with an offset RTK reference frame (e.g., mobile RTK reference frame) with a new or different datum, new or different reference frame with respect to the RTK reference frame derived from or transformed from the universal reference frame; the D/OCS or the electronic data processing system 535 is configured to automatically adjust or shift any of the following: (a) the planned paths based on new or different machine parameters (e.g., work vehicle width or implement width of the next work vehicle that differ from the first work vehicle of step S202 by a vehicle width offset, a vehicle turning radius offset, an implement turning radius offset, vehicle offset equations, implement offset equations, or other parameters); (b) the guidance lines, curves, based on new or different machine parameters (e.g., work vehicle width or implement width of the next work vehicle that differ from the first work vehicle of step S202), and (c) planned paths, guidance lines, guidance curves and boundaries of the work area or field within the RTK reference frame, such as an RTK reference frame derived from or transformed from the universal reference frame or a mobile RTK reference frame, based on an datum offset (e.g., RTK-to-RTK reference frame offset or offset vector).

The data processing system 535 or its data processor 530 may execute step S210 in accordance with various examples, which can be applied separately or cumulatively. In a first example, the data processing system 535, the data processor 530 or the datum reference manager 532 is configured to base a datum offset between a PPP, PPP-RTK or DGNSS-RTK solution and the RTK (e.g., RTK or mRTK) solution on application of one or more datum offsets set forth the accompanying equations.

In a second example, the data processing system 535, the data processor 530 or the datum reference manager 532 is configured to retrieve or access the converted file or its converted files, the converted boundaries, or converted path plan for the next machine or work vehicle. For example, the electronic data processing system 535 or the central server 518 adjusts or shifts the converted boundaries or converted guidance lines based on: (a) a first data offset vector between the universal reference frame and an RTK reference frame, and (b) a second data offset vector between a first RTK reference frame derived or transformed from the universal reference frame and a second RTK reference frame (e.g., mobile RTK reference frame) or an offset RTK reference frame (e.g., associated with different receiver hardware, different software, different RTK base station configurations, different RTK reference GNSS receiver hardware, and different formats or configurations of RTK correction data).

In step S212, the D/OCS or the data processing system 535 enables machine or work vehicle, which is equipped with a (proprietary) GNSS receiver 512, to operate in the first mode, such as the RTK mode (e.g., RTK or mRTK), to accurately navigate through the field or work area with the data offset vector (or data offset vectors, if applicable) by reference to any of the following: converted field boundaries, converted guidance lines and converted path plans (e.g., converted planned paths). Further, the converted field boundaries, converted guidance lines and converted path plans for navigation in the RTK mode are based on available original, PPP, PPP-RTK or DGNSS-RTK data with the one or more applicable data offset vectors applied to initial field boundaries, the initial guidance lines and any initial path plan of a vehicle based on the initial field boundaries, the initial guidance lines and any initial path.

Use Case 3: RTK Base Station Receiver Switch (not Leveled) or Base Coordinate Change The guidance line, boundary map was created using RTK solution. The datum offset $$\vec{B}_{SF(t_0)}^{RTK(1)}$$

information can be computed in Equation 11:

$$\vec{B}_{SF(t_0)}^{RTK(1)} = \vec{R}_{RTK(1)} - \vec{R}_{SF}(t_0) \quad (11)$$

where $\vec{R}_{SF}(t_0)$ is SF-RTK coordinate with long-term repeatability feature on, for example, referring to ITRF2014, epoch $t_0$ Jan. 1, 2018; $\vec{R}_{RTK(1)}$ is current RTK or mRTK fixed solution coordinate for a given base station site with a specified coordinate XZY set.

When RTK changes base site without leveling or base coordinate is changed for some reasons, new RTK datum should be computed using Equation 12 as follows:

$$\vec{B}_{SF(t_0)}^{RTK(2)} = \vec{R}_{RTK(2)} - \vec{R}_{SF}(t_0) \quad (12)$$

The new RTK datum is collected or stored in one or more data storage devices. The new RTK solution with different datum should apply difference of the datum offsets collected before and after to convert new RTK solution using Equation 13. In Equation 13, the converted solution should work well with old RTK guidance line or boundary map without line shift or jump:

$$\vec{R}_{RTK(1)} = \vec{R}_{RTK(2)} - \vec{B}_{SF(t_0)}^{RTK(2)} + \vec{B}_{SF(t_0)}^{RTK(1)} \quad (13)$$

Figure 17B:
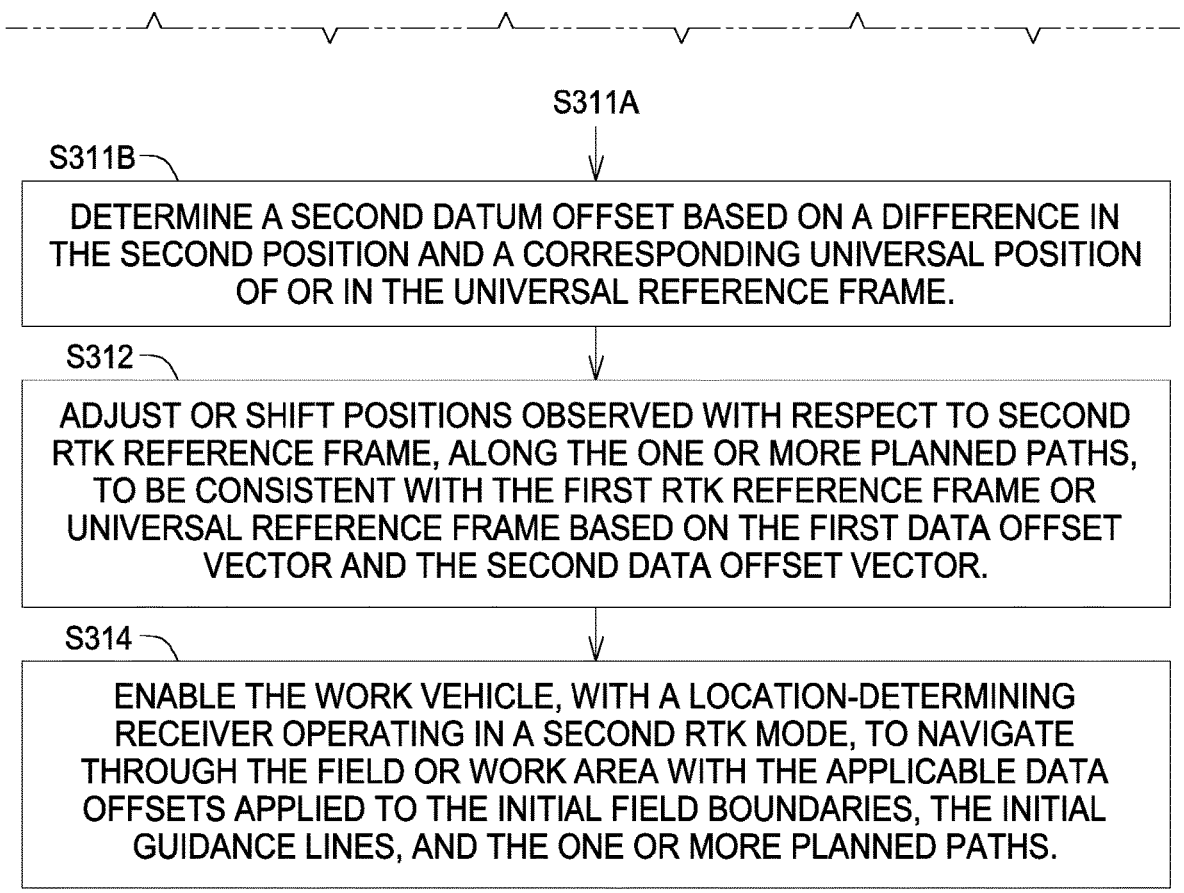
FIG. 17, which comprises FIG. 17A and FIG. 17B collectively, is a flow chart of one embodiment of a method (e.g., for the third use case) of a change (non-leveled) of or to a RTK base-station (GNSS) receiver or base coordinate change of an RTK base station position.

It should be mentioned that such conversion can be done seamlessly. FIG. 17 is a flow chart of one embodiment of a method (e.g., for the third use case) of RTK base station receiver change (not leveled) or base coordinate change of an RTK base station position or coordinates. The method of FIG. 17 begins in step S302.

In step S302, at a first time the GNSS receiver 512 establishes, creates or collects initial boundaries for a field or work area, or initial guidance lines for a field or work area (or both the initial boundaries and initial guidance lines) as RTK data (e.g., RTK solutions or RTK position data per epoch) in primary first mode (e.g., a first real-time kinematic (RTK) mode). For example, at a first time the GNSS receiver 512 establishes, creates or collects initial boundaries and initial guidance lines for a field or work area, as RTK data (e.g., RTK solutions or RTK position data per epoch) in primary first mode (e.g., a first RTK mode) for storage as a first file or a first data structure in a first RTK reference frame, where the first RTK reference frame is associated with: (1) a respective RTK reference station or a respective RTK base-station (GNSS receiver) at a first position (e.g. at first known coordinates in two or three dimensions) or a respective set of RTK reference stations at a first set of corresponding first positions (e.g., known coordinates in two or three dimensions). Each RTK reference station may be stationary or fixed for a period of time, such as stationary for one or more growing seasons.

In step S304, the data processing system 535 uploads or stores the first file or the first data structure in an electronic data storage device 525 in the first RTK reference frame. For example, the first file or the first data structure, which was collected in the primary first mode (e.g., RTK mode), is uploaded, stored, imported or entered into an electronic data processing system (e.g., 535) that is coupled to or in communication with the rover or mobile location-determining receiver (e.g., GNSS receiver 512 which can operate in an RTK mode, a proprietary RTK mode, or a mobile RTK (mRTK) mode).

Further, the rover or mobile location-determining receiver (e.g., GNSS receiver 512): (a) determines and provides RTK-related data for the initial guidance lines, initial boundaries and other features (in step S302) that is placed or stored in the first file or first data structure (in step S304), and (b) in step S304 the data processing system (e.g., 535) coupled to the GNSS receiver (e.g., 512) records or stores the provided RTK data, such as the first file or first data structure, for the initial guidance lines, initial boundaries and other features in a data storage device 525 of the data processing system 535, or in the data storage device 545 at central server 518, or on the cloud (e.g., via wireless communications to the Internet or another available communications network).

In step S306, the GNSS receiver 512 (e.g., reference frame converter/transformer 513 or reference frame offset module 534), alone, or in combination with the data processing system 535, is configured to transform or convert the first file or first data structure to a converted file or converted data structure of converted boundaries or converted guidance lines, or both, in accordance with a universal reference frame (e.g., ITRF reference frame), such as first universal reference frame with a respective first date and at a first epoch with a corresponding first position or set of first positions of the RTK reference receivers or RTK base station receivers.

For example, accompanying the created RTK data in the primary first RTK mode, the GNSS receiver 512 provides datum conversion information (e.g., a datum offset vector) referenced to a first universal reference frame, such as an ITRF reference frame associated with a corresponding first date and a corresponding first epoch (e.g., PPP datum ITRF 2014 or DGNSS datum ITRF 2014 and epoch Jan. 1, 2018). Accordingly, the mobile location-determining receiver or GNSS receiver 512 can output one or more of the following data streams simultaneously: (a) an RTK data stream of solutions, such as estimated position, attitude and/or motion data per successive series of epochs in the first RTK reference frame, (b) a PPP data stream, a PPP-RTK data stream, or a DGNSS-RTK data stream of solutions, such as estimated position, attitude or motion data per successive series of epochs, and (c) wherein the RTK data stream, the PPP data stream, the PPP-RTK data stream, and/or the DGNSS-RTK data stream can be referenced to or indexed to a first universal reference frame (e.g., ITRF) of a corresponding date and corresponding epoch, and (d) one or more data streams, among the RTK data stream, the PPP data stream, the PPP-RTK data stream, and/or the DGNSS-RTK data stream, are referenced or indexed to an associated datum offset vector, such as a known reference frame or universal reference frame (e.g., ITRF 2014) for the same temporally aligned series of epochs.

In one embodiment of step S306, D/OCS or data processing system 535 records or stores in a data storage device (e.g., 525, 545; at a remote central server 518, at a local electronic data processing system 535 or in the cloud), the collected initial boundaries and initial guidance lines created in the first RTK mode and datum conversion information to PPP, PPP-RTK, or DGNSS-RTK datum in a universal reference frame, such as the first universal reference frame. In one embodiment, D/OCS may have to wait for conversion parameters to be published or collected.

In step S307, the reference frame converter transformer 513, the reference frame offset module 534, or GNSS receiver 512, or the data processing system 535 is configured to determine a first datum offset based on a difference in the first position in the first RTK reference frame and a corresponding universal position of or in the universal reference frame (e.g., ITRF or first universal reference frame). In some embodiments, a first universal reference frame (e.g., ITRF) with a respective first date and at a first epoch with a corresponding first position or first set of positions.

The first universal reference frame may support operation of the GNSS receiver 512 in a PPP mode, a PPP-RTK mode, or a DGNSS-RTK mode. For example, the reference frame converter transformer 513, the reference frame offset module 534, or GNSS receiver 512 transforms, converters or derives the first universal reference frame with respect to observed carrier phase measurements the first RTK reference frame (e.g., by the RTK reference receiver or an RTK reference base station receiver that has a respective first position, such as two or three dimensional coordinates). In another embodiment, the reference frame converter transformer 513, the reference frame offset module 534, or GNSS receiver 512 transforms, converts or derives the first universal reference frame with respect to a set of RTK reference base stations that have a first set of first positions, which is generally fixed or stationary; can be adjusted if the base stations are moved or if the software, hardware or antenna of the RTK reference base stations are changed.

In step S308, D/OCS, data processing system 535 or central server 518 is configured to plan one or more paths or path plans for a next work vehicle for the field or work area based on the converted file or the converted data structure in accordance with the first RTK reference frame or the universal reference frame (e.g., first universal reference frame), wherein the next work vehicle comprises the first work vehicle of step S302 or a second work vehicle that is different the work vehicle that traverses the field or work area, or its boundaries in step S302.

In optional step S310, D/OCS or the data processing system 535 is configured to detect next work vehicle operating in new datum or reference frame, such as an RTK base site change, base coordinate change, or antenna change, or shift in antenna position of the GNSS RTK base station receiver from the respective first position (e.g., first RTK base coordinates of RTK(1)) or set of first positions. For example, during a first set of epochs (e.g., associated with a first RTK base coordinates of RTK(1)), if the stored or collected data offset vectors, $$\vec{B}_{SF(t_0)}^{RTK},$$

are substantially equal for the observed PPP data stream and the same epochs of reference PPP data stream referenced to the reference frame (e.g., ITRF2014), then the stored or collected data offset vectors cancel out and the position solutions are aligned to the same reference frame, which means that a data stream of PPP position solutions or RTK position solutions over an earlier set of (seasonal) epochs and a later set of (seasonal) epochs are substantially aligned (e.g. by a known data offset vector, such as, $$\vec{B}_{SF(t_0)}^{RTK})$$

or within a suitable tolerance for repeatability (e.g., within a season).

However, during a second set of epochs following the first set of epochs (e.g., if the second set of epochs is associated with second RTK base coordinates of RTK(2)), a prior datum offset vector, $$\vec{B}_{SF(t_0)}^{RTK},$$

no longer substantially equals a later datum offset vector, $$\vec{B}_{SF(t_0+1)}^{RTK}.$$

In other words, $$\vec{B}_{RTK(2)}^{RTK(1)},$$

by a constant or fixed offset, is indicative of a potential or actual shift or change in the previous coordinates of the GNSS RTK base station receiver from a first position to a second position.

In step S311A, at a second time a location-determining receiver (GNSS receiver 512), which is associated with the next work vehicle, is configured to navigate, track or observe one or more planned paths (e.g., from a step S108) in a secondary first mode in a second RTK reference frame associated with an RTK reference station at a second position, where the secondary first mode comprises a second real-time kinematic (RTK) mode associated with the second time that occurs after the first time. For example, the first RTK reference frame corresponds to a first position observed by the location-determining receiver at a respective first time (e.g., first epoch or first series of epochs), whereas the second RTK reference frame corresponds to a second position observed by the location-determining receiver at a respective second time (e.g., second epoch or second series of epochs), where the first time and second time may be within the same growing season or an earlier growing season and a later growing season, respectively.

In some embodiments, it is possible that there is a second datum offset that occurs between the observed first position and the observed second position at the different measurement times because of changes in the RTK base station, its software, its hardware, its antenna, or its location, or changes in the RTK mobile receiver or rover, its software, its hardware, its antenna, or its mounting position on the same or different vehicle.

In step S311B, the electronic data processor 530, the reference frame offset module 534, the reference frame converter or transformer 513 is configured to determine a second datum offset based on a difference in the second position (of the respective RTK base station receiver) and a corresponding universal position of or in the universal reference frame, such an ITRF reference frame having a corresponding date, a corresponding year, and a corresponding epoch.

In step S312, D/OCS, the reference frame converter/transformer 513, the reference frame offset module 534, data processing system 535 or datum reference manager 532 automatically adjusts or shifts positions observed by the GNSS receiver 512 with respect to the second RTK reference frame, along the one or more planned paths to be consistent with the first RTK reference frame or universal reference frame (e.g., first universal reference frame) based on the first data offset vector $$(\vec{B}_{SF(t_0)}^{RTK})$$

and the second data offset vector $$(\vec{B}_{SF(t_0+1)}^{RTK}).$$

For example, the data processing system 535 or datum reference manager 532 may adjust or shift the initial guidance lines and initial boundaries, by an appropriate datum offset vector, $$\vec{B}_{SF(t_0+1)}^{RTK}$$

or $$\vec{B}_{RTK(2)}^{RTK(1)},$$

corresponding converted guidance lines and converted boundaries consistent with new RTK datum, where $$\vec{B}_{RTK(2)}^{RTK(1)} = -\vec{B}_{SF(t_0)}^{RTK(2)} + \vec{B}_{SF(t_0)}^{RTK(1)}.$$

In step S314, D/OCS enables work vehicle with a location-determining receiver (e.g., GNSS RTK receiver 512), operating in a second RTK mode in the second RTK reference frame to navigate accurately through field based on original RTK lines (in the first RTK reference frame) with the appropriate datum offset vector(s), applied to the initial field boundaries, the initial guidance lines and the one or more planned paths or path plans. For example, the datum offsets or appropriate datum offset vectors for the second RTK mode in the second RTK reference frame, or its equivalent second universal reference frame, are applied directly to the converted guidance lines, converted boundaries and/or converted path plans for the first RTK mode, or its equivalent first universal reference frame.

Use Case 4: PPP-RTK LTR Datum and/or Reference Epoch Change

The guidance line, boundary map was created using PPP, PPP-RTK, or DGNSS-RTK solution using $t_1$ epoch. The datum offset $$\vec{B}_{SF(t_0)}^{SF(t_1)}$$

information can be directly computed in Equation 14:

$$\vec{B}_{SF(t_0)}^{SF(t_1)} = \vec{v} \cdot (t_1 - t_0) \tag{14}$$

where assume the different PPP, PPP-RTK, or DGNSS-RTK datum and/or epoch time $t_1$ is used.

As used throughout this document and equations, the subscript SF and superscript SF is a function of epoch/time and SF means any of the following: PPP, PPP-RTK, or DGNSS-RTK, (or in alternate embodiments DGNSS that meets certain target technical specifications for accuracy and repeatability of estimated solutions or estimated positions).

If the GNSS receiver changes PPP, PPP-RTK, or DGNSS-RTK reference datum or reference epoch for example switch from SF ITRF 2014, $t_1$ epoch Jan. 1, 2018 to ITRF 2020, $t_2$ epoch Jan., 1, 2028. New datum offset, which is computed using Equation 15, should be collected and stored in a data storage device, such as cloud data storage or local data storage of an on board data storage device of the electronic data processing system of the work vehicle. Equation 15 is as follows:

$$\vec{B}_{SF(t_0)}^{SF(t_2)} = \vec{v} \cdot (t_2 - t_0) \tag{15}$$

The Equation 16 can be used to convert new PPP, PPP-RTK, or DGNSS-RTK solution with new datum (referenced to the new reference frame of SF(2)) and epoch $t_2$ back to original solution (referenced to the original reference frame of SF(1)). The converted SF-RTK solution is well-suited to operate with old guidance line or boundary map that was recorded with reference to the SF(1) reference frame of ITRF 2014 without any line shift or jump in estimated solution of the GNSS receiver.

$$\vec{R}_{SF(1)} = \vec{R}_{SF(2)} - \vec{B}_{SF(t_0)}^{SF(2)} + \vec{B}_{SF(t_0)}^{SF(1)} \qquad (16)$$

Figure 18B:
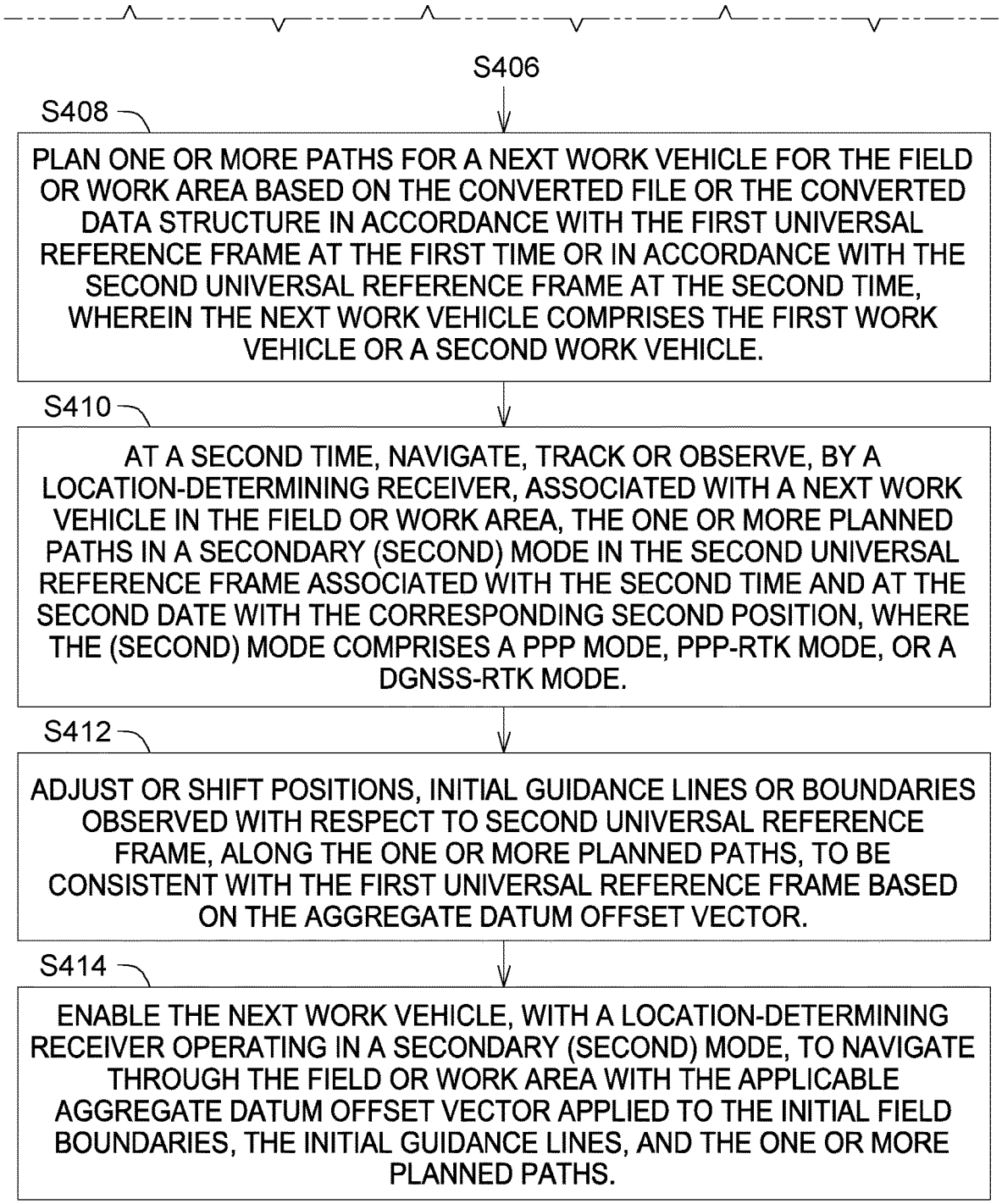
FIG. 18, which comprises FIG. 18A and FIG. 18B collectively, illustrates one embodiment of a method for (another use case) of transitions between PPP, PPP-RTK or DGNSS-RTK modes associated with different epochs or different positions, or both different epochs and different positions over time (e.g., such as the same growing season or over multiple growing seasons).

FIG. 18 illustrates one embodiment of a method for (another use case) of transitions between PPP, PPP-RTK or DGNSS-RTK modes associated with different epochs or different positions, or both different epochs and different positions over time (e.g., such as the same growing season or over multiple growing seasons).

In step S402, for a respective field or work area, the GNSS receiver 512 collects, establishes or creates initial boundaries, or initial guidance lines, or both in PPP, PPP-RTK or DGNSS-RTK mode at a first time (e.g., with a first epoch $t_1$ or with a first series of successive first epochs) which is designed as $\vec{R}_{SF(1)}$, which is in or indexed to a first universal reference frame, which is associated with a corresponding first position of the GNSS receiver 512, and which is storable or formatted as a first file or first data structure. The GNSS receiver 512, the PPP estimator 120, or the reference frame offset module 534 can execute step S402 in accordance with one or more techniques, which may be applied separately or cumulatively.

Under a first technique, at a first time or first epoch the GNSS receiver 512 establishes, creates or collects initial boundaries of a field or work area, or initial guidance lines for a field or work area (or both the initial boundaries and initial guidance lines) as PPP, PPP-RTK or DGNSS-RTK data in a primary second mode (e.g., a PPP, PPP-RTK or DGNSS-RTK data mode) in a first universal reference frame (e.g., ITRF, ITRF2014, or any later version of ITRF) with a respective first date and at the first epoch.

Under a second technique, at a first time or first epoch the GNSS receiver 512 establishes, creates or collects initial boundaries of a field or work area, or initial guidance lines for a field or work area in a primary second mode (e.g., a PPP, PPP-RTK or DGNSS-RTK data mode) for storage as a first file or a first data structure in a first universal reference frame (e.g., ITRF, ITRF2014 or an later version of ITRF) with a respective first date and at a first epoch with a corresponding first position (of mobile or rover location-determining receiver, such as the GNSS receiver 512), where a primary mode comprises a PPP mode, a PPP-RTK mode, or a DGNSS-RTK mode.

Under a third technique, at a first time or first epoch the GNSS receiver 512 establishes, creates or collects initial boundaries of a field or work area, or initial guidance lines for a field or work area in a primary second mode (e.g., a PPP, PPP-RTK or DGNSS-RTK data mode) for storage as a first file or a first data structure in a first universal reference frame (e.g., ITRF, ITRF2014 or an later version of ITRF) with a respective first date and at a first time (e.g., first epoch) with a corresponding first position (of mobile or rover location-determining receiver, such as the GNSS receiver 512), where the first position (or a first set of first positions, such as two or three dimensional geographic coordinates) intercepts, is coextensive with, or lies on the initial boundaries, or initial guidance lines (e.g., initial guidance line segments or curved segments).

In step S403, the D/OCS or the data processing system 535 is configured to upload or store the first file or first data structure in an electronic data storage device 525 in the first universal reference frame (e.g., ITRF, ITRF2014, or an later version of ITRF).

In step S404, D/OCS, the reference frame converter/transformer 513, the reference frame offset module 534, the data processing system 535, or the datum reference manager 532 is configured to transform or convert the first file or first data structure to a converted file or converted data structure of converted boundaries of converted guidance lines in accordance with a second universal reference frame with a respective second date at a second epoch with a corresponding second position. For example, the reference frame converter/transformer 513 or the reference frame offset module 534, the data processing system 535, or the datum reference manager 532 is configured to denote boundaries/lines created in the first universal reference frame at the first time (e.g., first epoch or first successive series of epochs) in the primary second mode (e.g., SF, PPP, PPP-RTK or DGNSS-RTK mode) as converted boundaries/lines in the second universal reference frame at the second time (e.g., a second epoch or a second successive series of epochs after the first time). In some illustrative examples of step S404, the second position (or a set of second positions, such as two or three dimensional geographic coordinates) is offset by an offset vector (e.g., for each epoch) from intercepting, being coextensive with, or lying on the initial boundaries, or initial guidance lines (e.g., initial guidance line segments or curved segments).

In step S406, the reference frame converter/transformer 513, the reference frame offset module 534, D/OC or the data processing system 535 determines or records the datum offset information (e.g., one or more datum offset vectors) for PPP, PPP-RTK or DGNSS-RTK mode at a first time (e.g., first epoch or first series of first epochs), a second time (e.g., second epoch or second series of second epochs), or both, referenced to one or more of the following: (a) a known reference frame or universal reference frame with a corresponding date and epoch (e.g., ITRF2014), (b) first universal reference frame for a corresponding date and corresponding epoch, and (c) a second universal reference frame for a corresponding date and corresponding epoch. The method of step S406 may be executed in accordance with various techniques, which may be executed separately or cumulatively.

Under a first technique, in step S406 the D/OCS or data processing system 535, the reference frame converter/transformer 513, the reference frame offset module 534, or the datum reference manager 532 is configured to determine an aggregate datum offset vector based on a first datum offset vector and a second datum offset vector, where the first datum offset vector is between the respective first position and a first reference position.

Under a second technique, in step S406 the D/OCS or data processing system 535, the reference frame converter/transformer 513, the reference frame offset module 534, or the datum reference manager 532 is configured to determine an aggregate datum offset vector based on a first datum offset vector and a second datum offset vector, where the first datum offset vector is between the respective first position and a first reference position, and where the first reference position is at a respective first time (e.g., first epoch or first series of first epochs) in a first universal reference frame (e.g., ITRF) with a corresponding date and corresponding epoch, and where the first reference position is at a respective first reference time (e.g., first reference epoch or first reference series of first reference epochs) in a common universal reference frame (e.g., ITRF) with a corresponding date and corresponding epoch.

Under a third technique, in step S406 the D/OCS or data processing system 535, the reference frame converter/transformer 513, the reference frame offset module 534, or the datum reference manager 532 is configured to determine an aggregate datum offset vector based on a first datum offset vector and a second datum offset vector, where the second datum is between the respective second position and a second reference position is at the second time (e.g., second epoch or series of second epochs) in a second universal reference frame (e.g., ITRF) with a corresponding date and corresponding epoch, and wherein the second reference position is at a second reference time (e.g., second reference epoch or series of second reference epochs) in the common universal reference frame (e.g., ITRF) with a corresponding date and corresponding epoch.

Under a fourth technique, in step S406 the GNSS receiver 512, (on a work vehicle or its implement), the D/OCS, the data processing system 535, the reference frame converter/transformer 513, the reference frame offset module 534, or the datum reference manager 532 is configured to determine provides datum conversion information from PPP, PPP-RTK or DGNSS-RTK datum (e.g., for epoch $t_1$) to a first universal reference frame with a corresponding date and a corresponding epoch, to common universal reference frame (e.g., ITRF) with a corresponding date and corresponding epoch, or both.

Under a fifth technique, in step S406 the GNSS receiver 512, (on a work vehicle or its implement), the D/OCS, the data processing system 535, the reference frame converter/transformer 513, the reference frame offset module 534, or the datum reference manager 532 is configured to determine or provide datum conversion information from PPP, PPP-RTK or DGNSS-RTK datum (e.g., for epoch $t_2$) to a first universal reference frame with a corresponding date and a corresponding epoch, to common universal reference frame (e.g., ITRF) with a corresponding date and corresponding epoch, or both.

Under a sixth technique, in step S406 the data processing system 535 or the D/OS
  can ask operator to wait until the complete datum conversion information is available or until the conversion parameter estimation completes prior to traversing the field or work site, or directing the work vehicle to traverse the field or work site in accordance with any path plan or planned path.

In step S408, D/OCS, the data processing system 535, and the datum reference manager 532 is configured to plan or more paths for a next work vehicle for the field or work area based on the converted file or converted data structure in accordance with the first universal reference frame at the first epoch or in accordance with the second universal reference frame at the second epoch, where the next work vehicle comprises the first work vehicle or the second work vehicle. Further, in step S402 the first work vehicle has a location-determining receiver (GNSS receiver 512) that is configured to collect or establish initial boundaries, or initial guidance lines, or both in PPP, PPP-RTK or DGNSS-RTK mode at a first time (e.g., with a first epoch $t_1$ or with a first series of successive first epochs.) At the first epoch and first position of the GNSS receiver 512, the first universal reference frame comprises a universal reference frame at a corresponding date and epoch; at the second epoch and second position of the GNSS receiver 512, the second universal reference frame comprises a second universal reference frame a corresponding date and epoch, where the second epoch is after the first epoch, for example.

In step S410, at a second time (e.g., second epoch), the location-determining receiver (e.g., GNSS receiver 512), which is associated with a next work vehicle in the field or work area, is configured to navigate, track or observe the one or more planned paths (e.g. of step S408) in a secondary second mode in the second universal reference frame associated with the second time (e.g. second epoch or series of second epochs) and at a second date with the corresponding second position, where the secondary mode comprises a PPP mode, a PPP-RTK mode, or a DGNSS-RTK mode, for example.

In step S412, D/OCS or data processing system 535, or datum reference manager 532 automatically shifts positions, guidance lines, and boundaries observed with respect to the second universal reference frame, along the one or more planned paths, to be consistent with the first universal reference frame based on the aggregate datum offset vector (e.g., and/or the common universal reference frame). For example, the D/OCS or data processing system 535, or datum reference manager 532 adjusts or shifts positions, guidance lines and boundaries from the second universal reference frame of the GNSS receiver 512 (e.g., from new PPP, PPP-RTK or DGNSS-RTK datum and epoch $t_2$ (e.g., collectively called SF(2)) to the first reference frame of the GNSS receiver (e.g., old PPP, PPP-RTK or DGNSS-RTK datum and epoch $t_1$ (e.g., collectively called SF(1))) by applying two datum offset vectors:

$$\vec{B}_{SF(t_0)}^{SF(2)}; \vec{B}_{SF(t_0)}^{SF(1)}.$$

In one embodiment, the datum offset vectors can be related to a common universal reference frame (e.g., ITRF) that is associated with a respective common epoch and a respective common date.

In step S414, D/OCS enables a next work vehicle, with a location-determining receive (e.g., GNSS receiver 512) SF machine operating in a secondary second mode to navigate through the field or work area with the applicable aggregate datum offset vector (or underlying data offset vectors) applied to the initial field boundaries, the initial guidance lines and the one or more planned paths. For example, in new datum and epoch (in SF(2) reference frame at the second time (e.g., second epoch or series of second epochs, $t_2$, or second universal reference frame of a corresponding date and corresponding epoch) to accurately navigate through the field or work area based on original or initial guidance lines, boundaries and positions (in SF(1) reference frame at the first time (e.g., first epoch or series of first epochs, $t_1$) or first universal reference frame of corresponding date and corresponding epoch) by applying the above datum offset vectors, or by converting the initial guidance lines, boundaries and positions to converted guidance lines via the above datum offset vectors in conjunction with the old PPP, PPP-RTK or DGNSS-RTK datum and first time (e.g., epoch $t_1$; the old PPP, PPP-RTK, or DGNSS datum and the respective first time collectively called SF(1)).

In general, in the method of FIG. 18, the precise navigation-solution paired with datum information can be freely switched between them if the datum information is available, back and forth, repeatedly or again and again.

Figure 9:
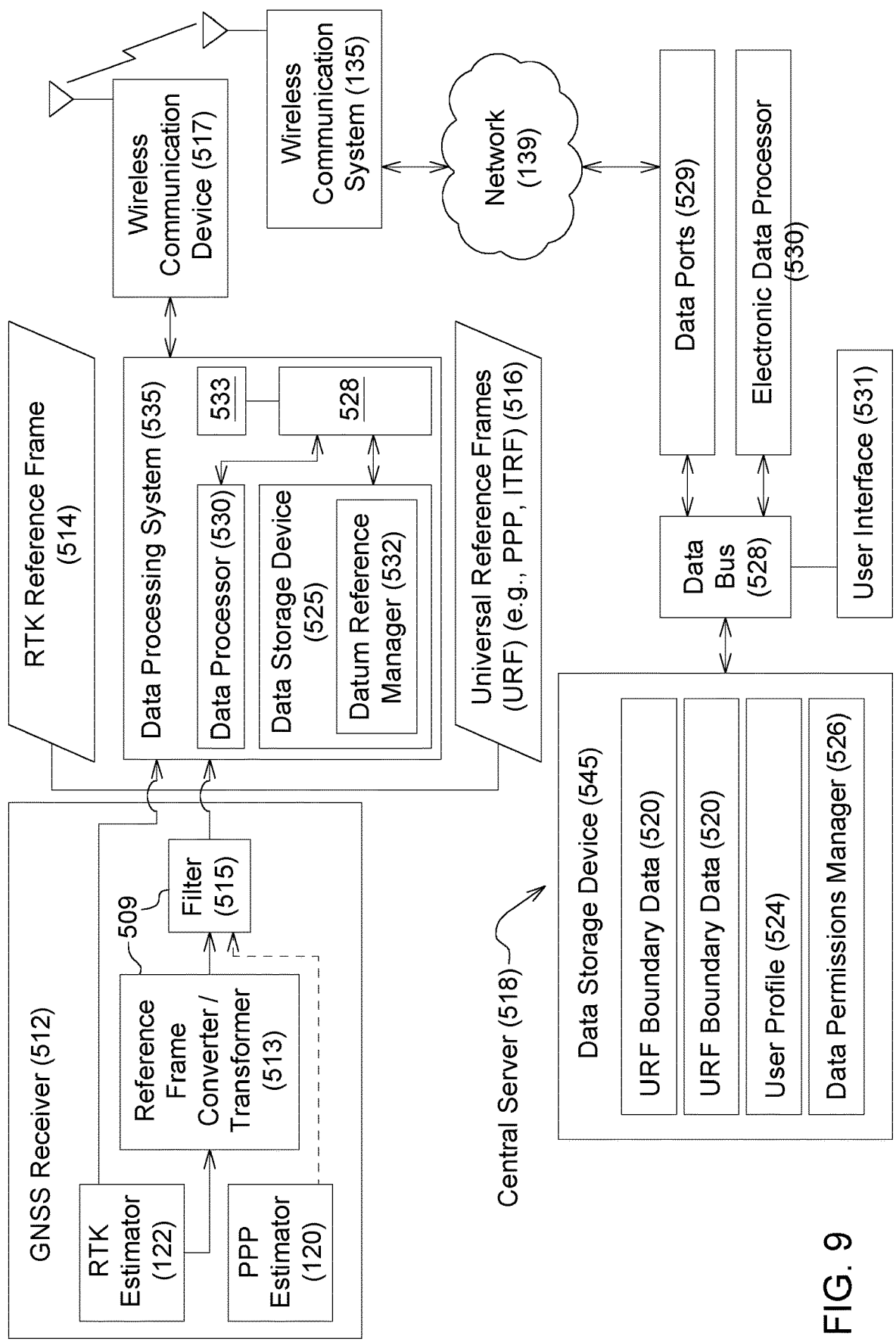
FIG. 9 is a block diagram of one embodiment of a system for supporting consistent alignment of position data collected during operations of a field or work site over time.

FIG. 9 is a block diagram of one embodiment of a system for supporting consistent alignment of position data collected during operations of a field or work site over time.

In FIG. 9, a location-determining receiver 512, such as GNSS receiver, comprises a mobile receiver or a reference receiver. The mobile receiver or rover receiver can be mounted in or on a vehicle that performs work tasks in a field or at a work site over time, such as over one or more growing seasons of a crop. The location-determining receiver 512 is coupled to or is in communication with a data processing system 535, such as a computer with an integral display that is installed on a vehicle. For example, the location-determining receiver 512 may have a data port that communicates (directly or indirectly) with respective data port of the data processing system 535 via a transmission line, twisted pairs, a coaxial cable, a fiber optic cable, a vehicle data bus (e.g., Controller Area Network), Ethernet, or via a wireless communications link. The electronic data processing system 535 is coupled directly or indirectly to the wireless communications device 517. In turn the wireless communications device 517 communicates with a wireless communications system 135 via an electromagnetic signal. The wireless communications system 135 can communicate with a central server 518 (and vice versa) via a communications network 139, such as the Internet, a wireless mesh network, a packet-switched network, or a fiber-optic network.

In FIG. 9, the location determining receiver 512 comprises an RTK estimator 122 and a PPP estimator 120. In one configuration, the RTK estimator 122 simultaneously provides position data, guidance paths, or boundaries (e.g., an RTK data stream) in an RTK reference frame 514 (e.g., which can be defined or referenced with respect to a local RTK base station or a regional RTK reference network of one or more RTK base stations): (a) to the electronic data processing system 535 and (b) to the reference frame converter or transformer 513.

Meanwhile, the PPP estimator 120 provides position data, guidance paths, or boundaries (e.g., a PPP data stream) in a PPP reference frame (e.g., PPP ITRF reference frame) to a filter 515 to average or smooth position estimates. Further, in one embodiment, the filter 515 may delay the PPP data stream, the RTK reference data stream or both to temporally align or temporally correlate the data streams. Individually or collectively, the reference frame converter/transformer 513 and the filter 515 may be referred to as navigation filtering system 509. As used throughout the document, guidance paths or the boundaries may comprise curved or straight line segments, or waypoints, points or geographic coordinates that define the curved or straight line segments.

The electronic data processing system 535 comprises an electronic data processor 530, a data storage device 525, and one or more data ports 533 coupled to a data bus 528. The data processor 530 may comprise a microcontroller, a microprocessor, a programmable logic array, an application specific integrated circuit (ASIC), a digital signal processor, or another device for processing data, manipulating, accessing, retrieving, and storing data. A data storage device 525 may comprise electronic member, non-volatile electronic memory, an optical storage device, a magnetic storage device, or another device for storing digital or analog data on a tangible storage medium, such as an optical disk, a magnetic disk, or electronic memory. Each data port 533 may comprise a buffer memory, a transceiver or both for interfacing with other network elements, such as a wireless communications device 517 or a terrestrial satellite station (e.g., uplink/downlink station).

In one embodiment, the data storage device 525 stores software instructions, such as a datum reference manager 532, that are executable by the electronic data processor 530. For example, the datum reference manager 532 may organize or manage storage and retrieval (e.g., on the on-board or local data storage device 525 of electronic data processing system 535, at the data storage device 545 associated with the central server 518, or both) of guidance paths and boundaries related to one or more respective fields and worksites, alone or together with dates or time-stamps associated with the guidance paths and boundaries, and description of the reference frame, or related specifications or capabilities for the location-determining receiver 512 and its operating mode or modes. Further, the capabilities for the modes may indicate whether the location-determining receiver 512 is configured to operate in one or more of the following modes: RTK, mobile real-time kinematic (m-RTK), PPP, PPP-RTK, differential GNSS (DGNSS), DGNSS-RTK modes. In some configurations, the datum reference manager 532 may organize or manage storage and retrieval on the on-board or local data storage device 525 of electronic data processing system 535, at the data storage device 545 associated with the central server 518, or both.

The central server 518 comprises an electronic data processor 530, a data storage device 545, a user interface 531, and one or more data ports 529 coupled to a data bus 528. The data processor 530 may comprise a microcontroller, a microprocessor, a programmable logic array, an application specific integrated circuit (ASIC), a digital signal processor, or another device for processing data, manipulating, accessing, retrieving, and storing data. A data storage device 545 may comprise electronic member, non-volatile electronic memory, an optical storage device, a magnetic storage device, or another device for storing digital or analog data on a tangible storage medium, such as an optical disk, a magnetic disk, or electronic memory. Each data port 529 may comprise a buffer memory, a transceiver or both for interfacing with other network elements, such as a wireless communications device 517 or a terrestrial satellite station (e.g., uplink/downlink station). A under interface 531 may comprise any of the following devices for input or output of data from the central server 518: a keypad, a keyboard, one or more switches, a pointing device (e.g., electronic mouse), an electronic display, and a touch-screen display.

In FIG. 9, the data storage device 525 of the central server 518 may store guidance lines, coordinates, positions, and boundaries as or in one or more of the following data bases, files (e.g., inverted files), records, or other data structures: universal reference frame boundary data 520, universal reference frame guidance data 522, user profile data 524 and data permissions manager 526, in which the data permissions manager 526 is configured to support and administer the appropriate data isolation by end user, data security, authentication, password and log-in identifier administration, for storage, retrieval and data management of multiple end users who subscribe to services for data management of universal reference frame boundary data 520, universal reference frame guidance data 522, and user profile data 524.

Figure 10:
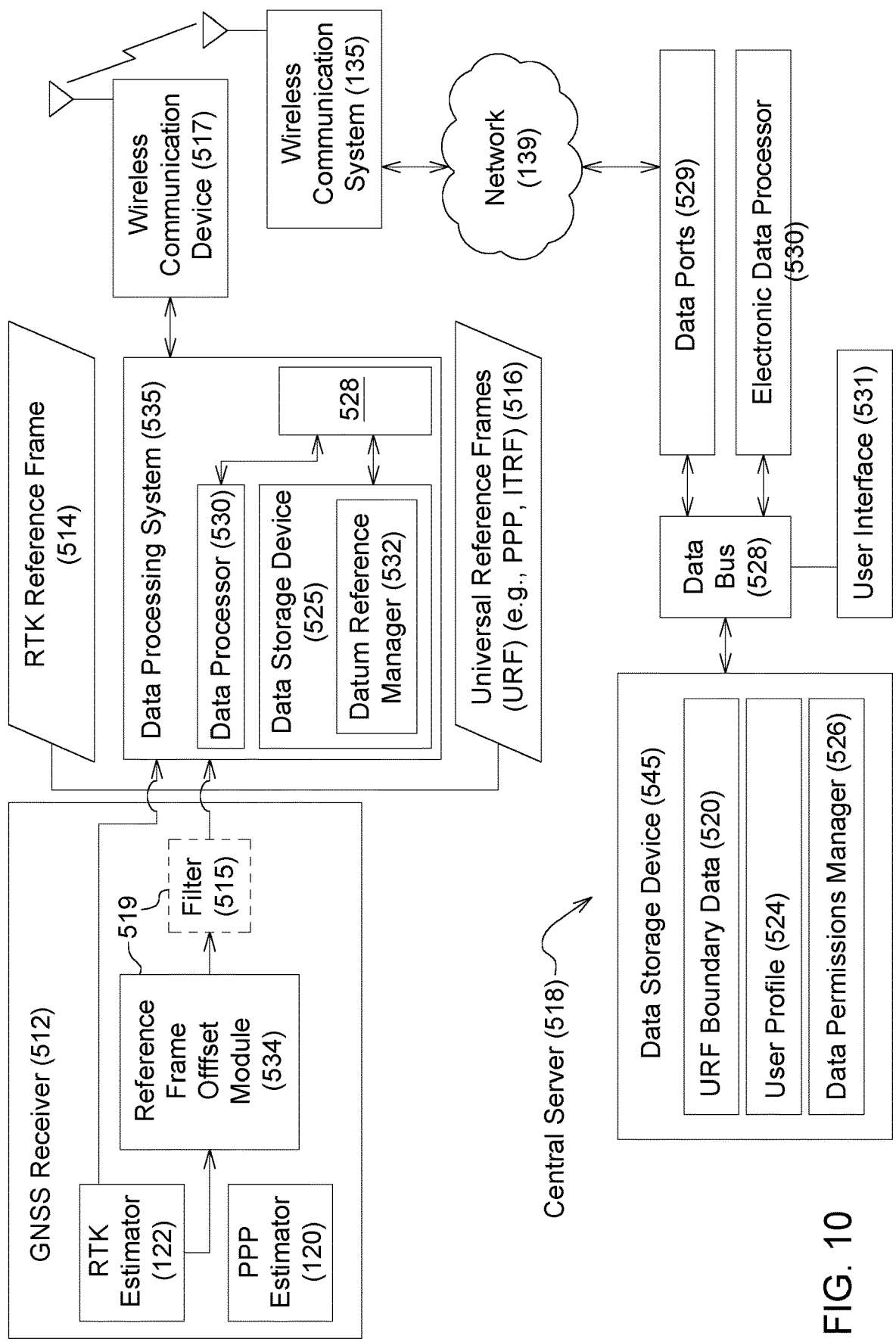
FIG. 10 is a block diagram of another embodiment of a system for supporting consistent alignment of position data collected during operations of the field or work site over time.

FIG. 10 is a block diagram of another embodiment of a system for supporting consistent alignment of position data collected during operations of the field or work site over time. The system of FIG. 10 is similar to the system of FIG. 9, except the system of FIG. 10 replaces the reference frame converter or transformer 513 with the reference frame offset module. Like reference numbers in FIG. 9 and FIG. 10 indicate like features or like elements.

In FIG. 10, the RTK estimator 122 and the PPP estimator 120 provide an RTK data stream and PPP data stream, respectively, to the reference frame offset module. The reference frame offset module receives simultaneously the RTK data stream and the PPP data stream for a one or observed positions of the location-determining receiver 512 and outputs a reference PPP data stream with one or more observed positions in accordance with a universal reference frame 516 (e.g., PPP ITRF). The reference offset module can output an reference PPP data stream or a reference PPP-RTK data stream that represents an average (e.g., mean) or weighted average between the RTK component (of the inputted RTK data stream) and the PPP component (of the inputted PPP data stream). Further, the PPP estimator 120 may provide a bypass PPP data stream, a PPP-RTK data stream, a DGNSS data stream, or a DGNSS-RTK data stream directly to a filter 515 (e.g., an integrator), which can then be combined, averaged or processed (e.g., smoothed in time) with the reference PPP or a reference PPP-RTK data stream.

Figure 11:
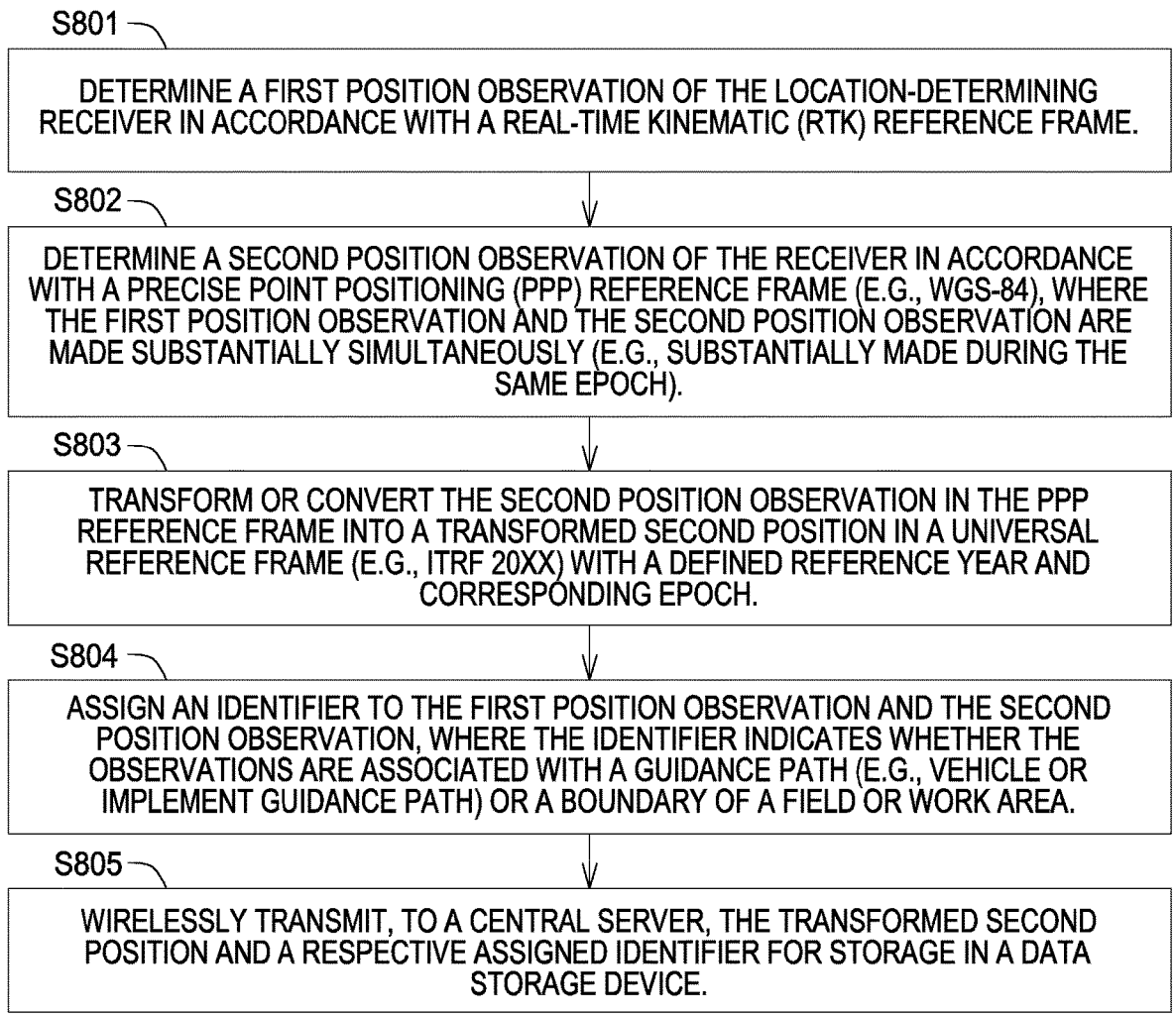
FIG. 11 is a flow chart of one embodiment of a method for supporting consistent alignment of position data collected during operations of a field or work site over time that supports reliable and consistent operation of a location-determining receiver comprising a real-time kinematic (RTK) estimator and a precise point positioning (PPP) estimator.

In accordance with one embodiment, as illustrated in FIG. 11, a method for supporting consistent alignment of position data collected during operations of a field or work site over time supports reliable and consistent operation of a location-determining receiver 512 comprising a real-time kinematic (RTK) estimator and a precise point positioning (PPP) estimator. The method of FIG. 11 begins in step S801.

In step S801, an RTK estimator 122 is configured to determine a first position observation of the receiver 512 in accordance with an RTK reference frame 514 (e.g., which can be defined or referenced with respect to a local RTK base station or a regional RTK reference network of one or more RTK base stations). The RTK estimator 122 may support the storage and data processing of raw measurements of pseudo-range signals and carrier phase signals for one or more satellites of a GNSS constellation of satellites, such as GPS, GLONASS, Galileo, and Beidou. RTCM provides a data format for communication differential GPS data or correction data from a RTK base station to a rover receiver 512.

In step S802, a PPP estimator 120 is configured to determine a second position observation of the receiver 512 in accordance with a PPP reference frame (e.g., WGS-84), where the first position observation and the second position observation are made substantially simultaneously (e.g., substantially made during the same epoch). WGS-84 defines an elliptical model of Earth that is used as a reference frame for GPS, which can be correlated to the International Terrestrial Reference System (ITRF).

In step S803, an electronic data processor 530, a reference frame converter, or a transformer 513 is configured to transform or converting the second position in the PPP reference frame into a transformed second position in a universal reference frame 516 (e.g., ITRF 20XX), which is indexed to a corresponding date (e.g., year) and corresponding epoch for the date (e.g., year).

In step S804, the electronic data processor 530 is configured to assign an identifier to the first position observation and the second position observation, where the identifier indicates whether the observations are associated with a guidance path (e.g., vehicle or implement guidance path) or a boundary of a field or work area.

In step S805, from the location-determining receiver 512, a wireless communications device 517 is configured to transmit wirelessly to a central server 518 the transformed second position and a respective assigned identifier for storage in a data storage device 545.

Figure 12:
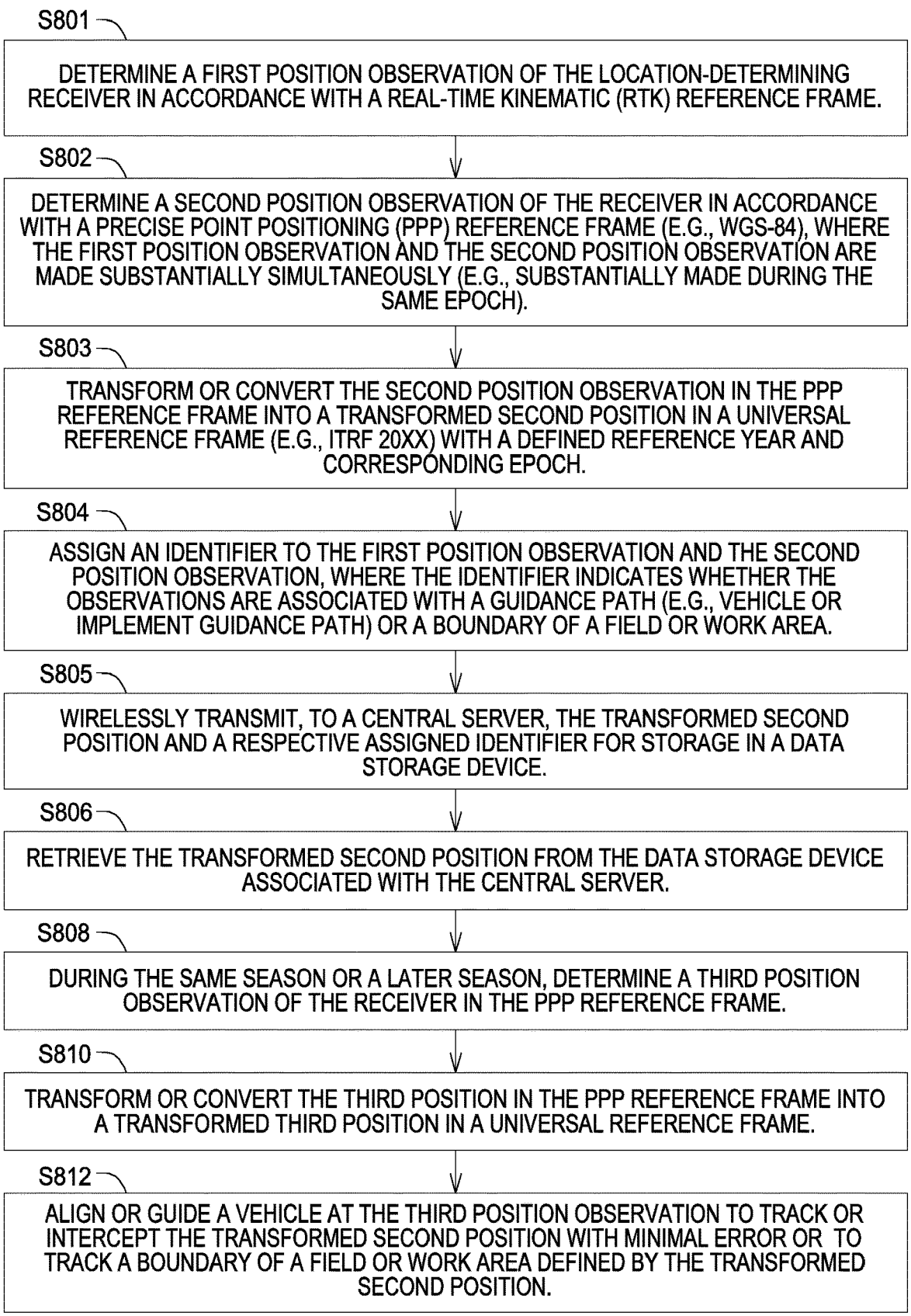
FIG. 12 is a flow chart of another embodiment of a method for supporting consistent alignment of position data collected during operations of a field or work site over time that supports reliable and consistent operation of a location-determining receiver comprising a real-time kinematic (RTK) estimator and a precise point positioning (PPP) estimator.

The method of FIG. 12 is similar to the method of FIG. 11, except the method of FIG. 12 comprises one or more additional steps. Like reference numbers in FIG. 11 and FIG. 12 indicate like steps, features or elements.

In step S806 in one embodiment, the electronic data processing system 535, the location-determining receiver 512, or both, are configured to retrieve the transformed second position from the data storage device 545 associated with the central server 518.

In step S808, during the same season (e.g., the same growing season for a crop) or a later season, a precise point positioning estimator or the location-determining receiver 512 is configured to determine a third position observation of the receiver 512.

In step S810, the location-determining receiver 512, the reference frame converter, reference frame offset module, or the transformer 513 is configured to transform or convert the third position in the PPP reference frame into a transformed third position in a universal reference frame 516 (e.g., ITRF reference frame defined by specific reference date (year) and reference epoch).

In an alternate embodiment, the location-determining receiver 512, the reference frame converter, reference frame offset module, or the transformer 513 is configured to transform or convert the first position in the RTK reference frame 514 (e.g., RTK reference frame, with reference to a local RTK base station or a network of one or more RTK base stations) into a transformed first position in a universal reference frame 516 (e.g., ITRF20XX) defined by specific reference date (year) and reference epoch. Further, the location-determining receiver 512 or a filter 515 is configured to filter or integrate the transformed first position and the transformed second position into an smoothed or averaged universal position in the universal reference frame 516.

In step S812, the vehicle is aligned or guided in accordance with one or more techniques, which may be applied separately or cumulatively. Under a first technique, the location-determining receiver 512, the data processing system 535 or both are configured to align or guide a vehicle at the third position observation (e.g., or series of position observations in two or three dimensional coordinates, such as along a guidance line) to track or intercept the transformed second position with minimal error.

Under a second technique for executing step S812, the location-determining receiver 512, the data processing system 535 or both are configured to align or guide a vehicle at the third position observation (e.g., or series of position observations in two or three dimensional coordinates, such as along or within a boundary of a field, work area, or work site) to track or intercept the transformed second position with minimal error. Further, a guidance system of vehicle and the location-determining receiver 512 may be coupled to a vehicle data bus 528 to communicate or exchange position data that can be used to adjust a steering actuator or an electrohydraulic controller associated with a steering system of the vehicle to direct or guide the vehicle along a path (e.g., planned path, guidance lines, guidance line segments, or waypoints defined by geographic coordinates in two or three dimensions).

Figure 13:
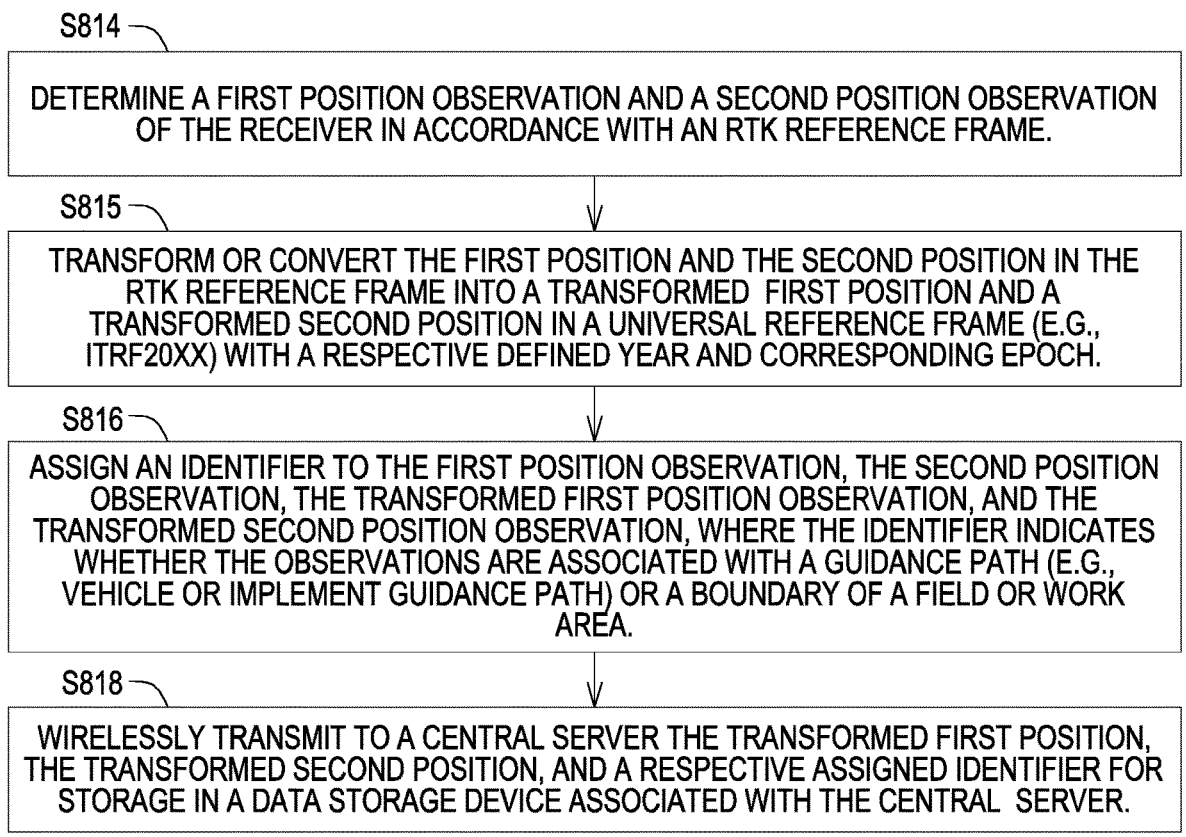
FIG. 13 illustrates a flow chart of yet another embodiment of a method for supporting consistent alignment of position data collected during operations of a field or work site over time to support reliable and consistent operation of a location-determining receiver comprising a real-time kinematic (RTK) estimator and a precise point positioning (PPP) estimator.

In accordance with one embodiment, FIG. 13 illustrates a flow chart of one embodiment of a method for supporting consistent alignment of position data collected during operations of a field or work site over time to support reliable and consistent operation of a location-determining receiver 512 comprising a real-time kinematic (RTK) estimator and a precise point positioning (PPP) estimator. The method of FIG. 13 begins in step S814.

In step S814, an RTK estimator 122 is configured to determine a first position observation and a second position observation of the receiver 512 in accordance with an RTK reference frame 514 (e.g., with reference to a local RTK base station or a network of one or more RTK base stations). The RTK estimator 122 of the location-determining receiver 512 may support the storage and data processing of raw measurements of pseudo-range signals and carrier phase signals for one or more satellites of a GNSS constellation of satellites, such as GPS, GLONASS, Galileo, and Beidou.

In step S815, a location-determining receiver 512, a transformer 513, a reference frame offset module, or a reference frame converter is configured to transform or convert, the first position and the second position in the RTK reference frame 514 into a transformed first position and a transformed second position in a universal reference frame 516 (e.g., ITRF20XX) with a corresponding reference year (or date) and a respective corresponding epoch (e.g., within the reference year).

In step S816, in one embodiment, an electronic data processing system 535 or electronic data processor 530 is configured to assign an identifier to the first position observation, the second position observation, the transformed first position observation, and the transformed second position observation. The first position observation and the second position observation are made substantially during the same epoch or during a series of successive epochs. Further, the identifier indicates whether the observations are associated with a guidance path (e.g., vehicle or implement guidance path) or a boundary of a field or work area.

In step S818, the wireless communications device 517 is configured to wirelessly transmit to a central server 518, the transformed first position, the transformed second position, and a respective assigned identifier for storage in a data storage device 545 of the central server 518, for instance. However, in an alternate embodiment, the electronic data processing system 535 onboard the vehicle is configured to provide or store the transformed first position, the transformed second position, and a respective assigned identifier for storage in a data storage device 525, which can be later retrieved during one or more later operations or tasks of the vehicle that is equipped with the electronic data processing system 535.

Figure 14:
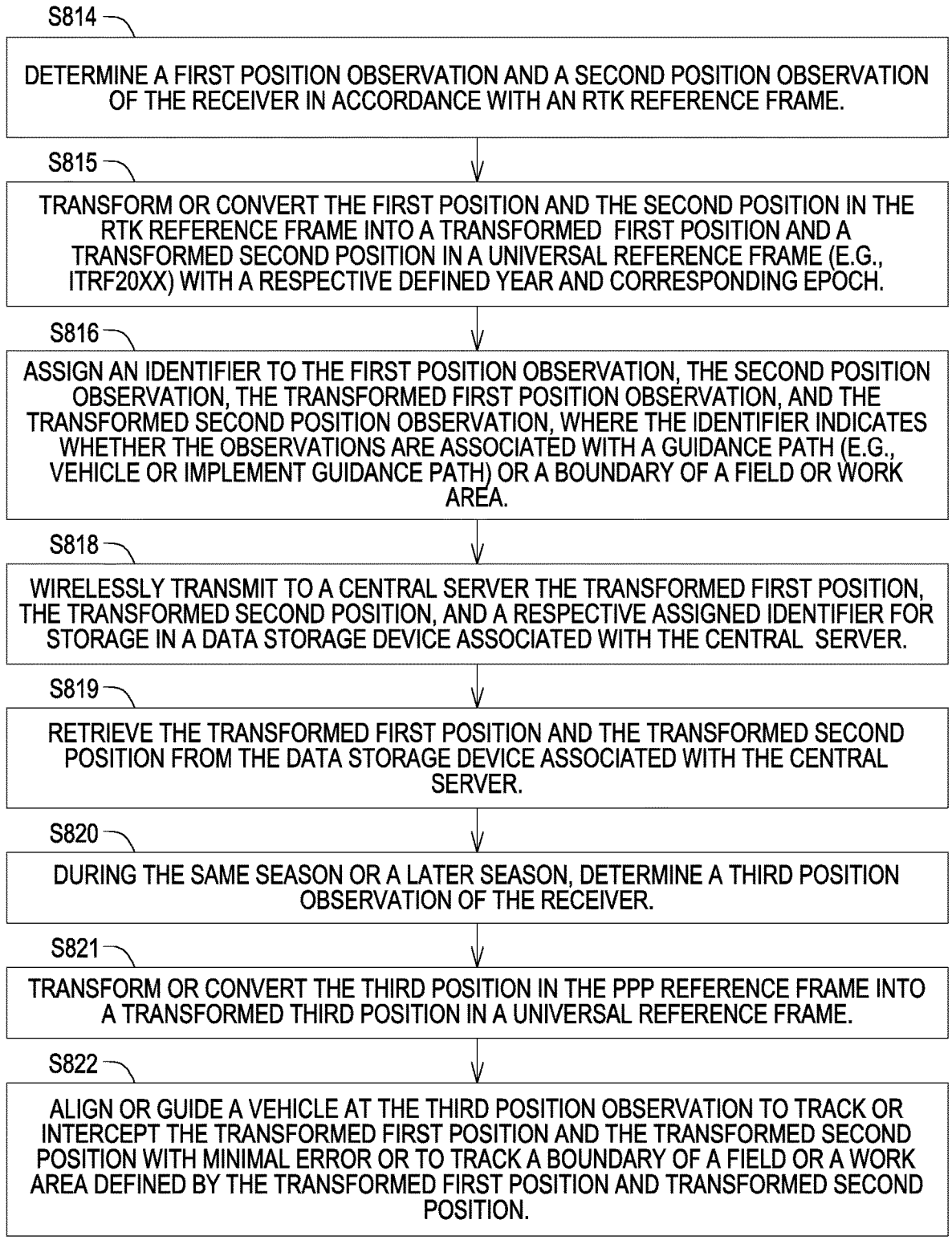
FIG. 14 illustrates a flow chart of still another embodiment of a method for supporting consistent alignment of position data collected during operations of a field or work site over time to support reliable and consistent operation of a location-determining receiver comprising a real-time kinematic (RTK) estimator and a precise point positioning (PPP) estimator.

The method of FIG. 14 is similar to the method of FIG. 13, except the method of FIG. 14 comprises one or more additional steps. Like reference numbers in FIG. 13 and FIG. 14 indicate like steps, features or elements.

In FIG. 14 in step S819, at the vehicle or on-board the vehicle, the electronic data processing system 535 or the electronic data processor 530 is configured to retrieve the transformed first position and the transformed second position from the data storage device 545 associated with the central server 518. For example, the electronic data processor 530 may trigger the retrieval of the transformed first position and the transformed second position based on the location-determining receiver 512 indicating that the vehicle has entered or is within boundaries of the field or the work area in which the first position and the second position were collected (e.g., during a period within the same season or the previous season.)

In step S820, in response to the retrieval of the first and second positions or the presence of the vehicle in the field or work area during the same season or a later season, the location-determining receiver 512 is configured to determine (e.g., by a precise point positioning estimator) a third position observation of the location-determining receiver 512.

In step S821, the electronic data processor 530, the reference frame converter, a transformer 513 or a reference frame offset module is configured transform or convert the third position in the PPP reference frame into a transformed third position in a universal reference frame 516, such as an ITRF reference frame indexed to a corresponding reference year and corresponding reference epoch (e.g., measurement time unit).

In step S822, the vehicle is aligned or guided in accordance with one or more examples, which may be applied separately or cumulatively. Under a first example of executing step S822, the location-determining receiver 512, the data processing system 535 or both are configured to align or guide a vehicle at the third position observation (e.g., or series of position observations in two or three dimensional coordinates, such as along a guidance line) to track or intercept the transformed first position and the transformed second position with minimal error.

In a second example of executing step S822, the location-determining receiver 512, the data processing system 535 or both are configured to align or guide a vehicle at the third position observation (e.g., or series of position observations in two or three dimensional coordinates, such as along or within a boundary of a field, work area, or work site) to track or intercept the transformed first position and the transformed second position with minimal error. Further, a guidance system of vehicle and the location-determining receiver 512 may be coupled to a vehicle data bus 528 to communicate or exchange position data that can be used to adjust a steering actuator or an electrohydraulic controller associated with a steering system of the vehicle to direct or guide the vehicle along a path (e.g., planned path, guidance lines, guidance line segments, or waypoints defined by geographic coordinates in two or three dimensions).

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. A method for supporting consistent alignment of position data collected during operations of a field or work site over time, the method comprising the steps of:
   at an earlier time, collecting, by a location-determining receiver associated with a first work vehicle, initial boundaries of a field or work area or one or more initial guidance lines in a first mode for storage as an initial file or an initial data structure in an RTK reference frame, where the first mode comprises a real-time kinematic (RTK) mode;
   uploading or storing the initial file or initial data structure in electronic data storage device in the RTK reference frame;
   transforming or converting the initial file or initial data structure to converted file or converted data structure of converted boundaries or converted guidance lines in accordance with a universal reference frame;
   planning one or more paths for a next work vehicle for the field or work area based on the converted file or converted data structure in accordance with the universal reference frame, wherein the next work vehicle comprises the first work vehicle or a second work vehicle;

adjusting or shifting the converted boundaries or converted guidance lines based on a data offset vector between the universal reference frame and RTK reference frame; and enabling the next work vehicle, with a location-determining receiver operating in a second mode, to navigate through the field or work area with the data offset vector or applicable data offsets applied to the initial field boundaries, the initial guidance lines, and the one or more paths, wherein the second mode comprises a precise point positioning (PPP) mode, a precise point positioning-real-time kinematic (PPP-RTK) mode, or a differential global navigation satellite system-real time kinematic (DGNSS-RTK) mode.

2. The method according to claim 1 wherein the uploading or storing the initial file or initial data structure comprises storing the initial file or the initial data structure in electronic data storage device of an electronic data processing system on-board a vehicle.

3. The method according to claim 1 wherein converted boundaries or converted guidance lines are derived from the initial boundaries and initial guidance lines in accordance with the following equation:

$$\vec{B}_{SF(t_0)}^{RTK} = \vec{R}_{RTK} - \vec{R}_{SF}(t_0)$$

where $\vec{B}_{SF(t_0)}^{RTK}$, is a datum offset vector between an RTK solution and a PPP solution, PPP-RTK solution or DGNSS-RTK solution, $\vec{R}_{RTK}$ is a solution by the location-determining receiver configured to operate in an RTK mode or mobile real-time kinematic (mRTK) mode; $\vec{R}_{SF}(t_0)$ is a PPP solution, PPP-RTK solution, or DGNSS-RTK solution by the location-determining receiver configured to operate in a PPP, PPP-RTK mode, or DGNSS-RTK mode.

4. The method according to claim 3 wherein the datum offset vector for the same growing season or a later growing season between the earlier time and the later time.

5. The method according to claim 3 further comprising:
at a later time, detecting the next work vehicle that is in the field or work area by comparison of one or more observed solutions or observed positions to reference estimated solutions or reference estimated positions in a known universal reference frame, where their respective data offset vectors cancel out.

6. The method according to claim 1 wherein the universal reference frame comprises an International Terrestrial Reference Frame (ITRF) associated with a specific epoch for a date and time.

7. The method according to claim 1 wherein:
in the PPP-RTK mode, switching between the PPP mode and the RTK mode, based upon availability, reliability, and target precision of the PPP mode and the RTK mode for one or more epochs of the location-determining receiver.

8. A method for supporting consistent alignment of position data collected during operations of a field or work site over time, the method comprising the steps of:

at an earlier time, collecting, by a location-determining receiver associated with a work vehicle, initial boundaries of a field or work area or one or more initial guidance lines in a second mode for storage as an initial file or an initial data structure in a universal reference frame, wherein the second mode comprises a precise-point-positioning (PPP) mode, a precise-point-positioning-real time kinematic (PPP-RTK) mode, or a dual-global-navigation-satellite-system-real-time-kinematic (DGNSS-RTK) mode;

uploading or storing the initial file or initial data structure in electronic data storage device in the universal reference frame;

transforming or converting the initial file or initial data structure to converted file or converted data structure of converted boundaries or converted guidance lines in accordance with a real-time-kinematic (RTK) reference frame;

planning one or more paths for a next work vehicle for the field or work area based on the converted file or converted data structure in accordance with the RTK reference frame;

adjusting or shifting the converted boundaries or converted guidance lines based on a data offset vector between the universal reference frame and RTK reference frame;

enabling the next work vehicle, with a location-determining receiver operating in a first mode to navigate through the field or work area with the data offset vector or applicable data offsets applied to the initial field boundaries, the initial guidance lines, and the one or more paths, wherein the first mode comprises an RTK mode.

9. The method according to claim 8 wherein the uploading or storing the initial file or initial data structure comprises storing the initial file or the initial data structure in electronic data storage device of an electronic data processing system on-board a vehicle.

10. The method according to claim 8 wherein converted boundaries or converted guidance lines are derived from the initial boundaries and initial guidance lines in accordance with the following equation:

$$\vec{R}_{RTK} = \vec{B}_{SF(t_0)}^{RTK} + \vec{R}_{SF}(t_0)$$

where $\vec{R}_{RTK}$ is a solution by the location-determining receiver configured to operate in an RTK mode or mobile real-time kinematic (mRTK) mode;

$\vec{B}_{SF(t_0)}^{RTK}$, is a datum offset vector between an RTK solution and a PPP solution, PPP-RTK solution or DGNSS-RTK solution; $\vec{R}_{SF}(t_0)$ is a proprietary PPP or PPP-RTK solution, or DGNSS-RTK solution by the location-determining receiver configured to operate in a PPP, PPP-RTK mode, or DGNSS-RTK mode.

11. The method according to claim 10 further comprising:
at a later time, detecting the next work vehicle that is in the field or work area by comparison of one or more observed solutions or observed positions to reference estimated solutions or reference estimated positions in a known universal reference frame, where their respective data offset vectors cancel out.

12. The method according to claim 8 wherein the datum offset vector for the same growing season or a later growing season between the earlier time and the later time.

13. The method according to claim 8 wherein the universal reference frame comprises an International Terrestrial Reference Frame (ITRF) associated with a specific epoch for a date and time.

14. The method according to claim 8 wherein:
in the PPP-RTK mode, switching between the PPP mode and the RTK mode, based upon availability, reliability, and target precision of the PPP mode and the RTK mode for one or more epochs of the location-determining receiver.

15. A method for supporting consistent alignment of position data collected during operations of a field or work site over time, the method comprising the steps of:
at a first time, collecting, by a location-determining receiver associated with a first work vehicle, initial boundaries of a field or work area or one or more initial guidance lines in a primary first mode for storage as a first file or a first data structure in a first RTK reference frame associated with an RTK reference station at a first position, where the primary first mode comprises a first real-time kinematic (RTK) mode;
uploading or storing the first file or the first data structure in electronic data storage device in the first RTK reference frame;
transforming or converting the first file or first data structure to converted file or converted data structure of converted boundaries or converted guidance lines in accordance with a universal reference frame;
determining a first datum offset based on a difference in the first position and a corresponding universal position of or in the universal reference frame;
planning one or more paths for a next work vehicle for the field or work area based on the converted file or the converted data structure in accordance the first RTK reference frame or the universal reference frame, wherein the next work vehicle comprises the first work vehicle or a second work vehicle;
at a second time, navigating, tracking or observing, by a location-determining receiver, associated with a next work vehicle the field or work area, the one or more planned paths in a secondary first mode in a second RTK reference frame associated with an RTK reference station at a second position, where the secondary first mode comprises a second real-time kinematic (RTK) mode;
determining a second datum offset based on a difference in the second position and a corresponding universal position of or in the universal reference frame;
adjusting or shifting positions observed with respect to second RTK reference frame, along the one or more planned paths, to be consistent with the first RTK reference frame or universal reference frame based on a first data offset vector and a second data offset vector; and
enabling the next work vehicle, with a location-determining receiver operating in a second RTK mode, to navigate through the field or work area with the applicable data offsets applied to the initial field boundaries, the initial guidance lines, and the one or more planned paths.

16. The method according to claim 15 wherein positions in the first RTK mode are aligned with positions in the second RTK mode in accordance with the following equation:

$$\vec{R}_{RTK(1)} = \vec{R}_{RTK(2)} - \vec{B}_{SF(t_0)}^{RTK(2)} + \vec{B}_{SF(t_0)}^{RTK(1)}, \text{ where } \vec{B}_{SF(C_0)}^{RTK(1)}$$

is the first datum offset between the first RTK reference frame and the universal reference frame or ITRF refence frame; where $$\vec{B}_{SF(t_0)}^{RTK(2)}$$

is the second datum offset between the second RTK reference frame and the universal reference frame or ITRF refence frame; $\vec{R}_{RTK(1)}$ are the first RTK or first mRTK fixed solution coordinates for a given base station site; $\vec{R}_{RTK(2)}$ are the second RTK or first mRTK fixed solution coordinates for a given base station site.

17. The method according to claim 16 wherein the aggregate datum Offset, $\vec{B}_{RTK(2)}^{RTK(1)}$, between the first RTK reference frame and the second RTK reference frame is provided in accordance with the following equation:

$$\vec{B}_{RTK(2)}^{RTK(1)} = -\vec{B}_{SF(t_0)}^{RTK(2)} + \vec{B}_{SF(t_0)}^{RTK(1)}, \text{ where } \vec{B}_{SF(t_0)}^{RTK(1)}$$

is the first datum offset between the first RTK reference frame and the universal reference frame or ITRF refence frame; where $$\vec{B}_{SF(t_0)}^{RTK(2)}$$

is the second datum offset between the second RTK reference frame and the universal reference frame or ITRF refence frame.

18. A method for supporting consistent alignment of position data collected during operations of a field or work site over time, the method comprising the steps of:
at a first time, collecting, by a location-determining receiver associated with a first work vehicle, initial boundaries of a field or work area or one or more initial guidance lines in a primary mode for storage as a first file or a first data structure in a first universal reference frame with a respective first date and at a first epoch with a corresponding first position, where a primary mode comprises a PPP mode, PPP-RTK mode, or a DGNSS-RTK mode;
uploading or storing the first file or the first data structure in electronic data storage device in the first universal reference frame;
transforming or converting the first file or first data structure to a converted file or converted data structure of converted boundaries or converted guidance lines in accordance with a second universal reference frame with a respective second date and at a second epoch with a corresponding second position;

determining an aggregate datum offset vector based on a first datum offset vector and a second datum offset vector, where the first datum offset vector is between the respective first position and a first reference position, where the first position is at the first epoch on the first date in a first universal reference frame, where the first reference position is at a reference epoch on a reference date in a common universal reference frame, where the second datum is between the respective second position and a second reference position, where the second position is at the second epoch on the second date in a second universal reference frame, where the second reference position is at a second reference epoch on a second reference date in the common universal reference frame;

planning one or more paths for a next work vehicle for the field or work area based on the converted file or the converted data structure in accordance with the first universal reference frame at the first epoch or in accordance with the second universal reference frame at the second epoch, wherein the next work vehicle comprises the first work vehicle or a second work vehicle;

at a second time, navigating, tracking or observing, by a location-determining receiver, associated with a next work vehicle the field or work area, the one or more planned paths in a secondary mode in the second universal reference frame associated with the second epoch and at the second date with the corresponding section position, where the secondary mode comprises a PPP mode, PPP-RTK mode, or a DGNSS-RTK mode;

adjusting or shifting positions observed with respect to second universal reference frame, along the one or more planned paths, to be consistent with the first universal reference frame based on the aggregate datum offset vector; and enabling the next work vehicle, with a location-determining receiver operating in a secondary mode, to navigate through the field or work area with the applicable aggregate datum offset vector applied to the initial field boundaries, the initial guidance lines, and the one or more planned paths.

19. The method according to claim 18 and further comprising:

detecting the next work vehicle that is in the field or work area by comparison of one or more observed solutions or observed positions to reference estimated solutions or reference estimated positions in a common universal reference frame, where their respective data offset vectors cancel out.

20. The method according to claim 18 determining an aggregate datum offset vector is determined in accordance with the following equation:

$$\vec{R}_{SF(1)} = \vec{R}_{SF(2)} - \vec{B}_{SF(t_0)}^{SF(2)} + \vec{B}_{SF(t_0)}^{SF(1)}, \text{ where } \vec{B}_{SF(t_0)}^{SF(1)}$$

is the first datum offset vector;

$$\vec{B}_{SF(t_0)}^{RTK(2)}$$

is the second datum offset vector; the aggregate datum offset vector is defined as $$-\vec{B}_{SF(t_0)}^{SF(2)} + \vec{B}_{SF(t_0)}^{SF(1)},$$

$\vec{R}_{SF(1)}$ is a first position in the primary mode relative to the first universal reference frame at the respective first epoch and on the first date; $\vec{R}_{SF(2)}$ is a second position in the secondary mode relative to the second universal reference frame at the respective second epoch and on the second date.

* * * * *